US012479933B2

(12) United States Patent
Furusako et al.

(10) Patent No.: US 12,479,933 B2
(45) Date of Patent: Nov. 25, 2025

(54) CROSSLINKED ALGINIC ACID STRUCTURE

(71) Applicant: MOCHIDA PHARMACEUTICAL CO., LTD., Tokyo (JP)

(72) Inventors: Shoji Furusako, Tokyo (JP); Tomohiro Narumi, Tokyo (JP); Tsutomu Satoh, Tokyo (JP)

(73) Assignee: MOCHIDA PHARMACEUTICAL CO., LTD., Tokyo (JP)

( * ) Notice: Subject to any disclaimer, the term of this patent is extended or adjusted under 35 U.S.C. 154(b) by 904 days.

(21) Appl. No.: 17/763,071

(22) PCT Filed: Sep. 24, 2020

(86) PCT No.: PCT/JP2020/035932
§ 371 (c)(1),
(2) Date: Mar. 23, 2022

(87) PCT Pub. No.: WO2021/060336
PCT Pub. Date: Apr. 1, 2021

(65) Prior Publication Data

US 2022/0396643 A1 Dec. 15, 2022

(30) Foreign Application Priority Data

Sep. 25, 2019 (JP) ................................ 2019-173882

(51) Int. Cl.
*C08B 37/00* (2006.01)
*A61L 27/20* (2006.01)

(52) U.S. Cl.
CPC .......... *C08B 37/0084* (2013.01); *A61L 27/20* (2013.01)

(58) Field of Classification Search
CPC .. C08B 37/0084; A61K 47/36; C08J 2305/04; C08J 2405/04
See application file for complete search history.

(56) References Cited

U.S. PATENT DOCUMENTS

| | | | |
|---|---|---|---|
| 7,928,069 | B2 | 4/2011 | Prestwich et al. |
| 8,124,757 | B2 | 2/2012 | Song |
| 8,324,184 | B2 | 12/2012 | Prestwich et al. |
| 8,575,332 | B2 | 11/2013 | Hahn et al. |
| 8,859,523 | B2 | 10/2014 | Prestwich et al. |
| 9,827,321 | B2 | 11/2017 | Burdick et al. |
| 10,821,208 | B2 | 11/2020 | Desai et al. |
| 12,053,561 | B2 | 8/2024 | Desai et al. |
| 2005/0176620 | A1 | 8/2005 | Prestwich et al. |
| 2007/0134334 | A1 | 6/2007 | Hahn et al. |
| 2009/0105193 | A1 | 4/2009 | Prestwich et al. |
| 2009/0117078 | A1 | 5/2009 | Prestwich et al. |
| 2009/0124540 | A1 | 5/2009 | Prestwich et al. |
| 2010/0152423 | A1 | 6/2010 | Song |
| 2010/0291171 | A1 | 11/2010 | Crescenzi et al. |
| 2011/0280914 | A1 | 11/2011 | Prestwich et al. |
| 2015/0064143 | A1 | 3/2015 | Lee et al. |
| 2015/0202299 | A1 | 7/2015 | Burdick et al. |
| 2016/0114046 | A1 | 4/2016 | Brudno et al. |
| 2016/0220686 | A1 | 8/2016 | Brudno et al. |
| 2017/0119892 | A1 | 5/2017 | Brudno et al. |
| 2017/0189681 | A1 | 7/2017 | Desai et al. |
| 2019/0367901 | A1 | 12/2019 | Ohsumi et al. |
| 2020/0197526 | A1 | 6/2020 | Brudno et al. |
| 2020/0262939 | A1 | 8/2020 | Zhu et al. |
| 2021/0024659 | A1 | 1/2021 | Furusako et al. |
| 2021/0128790 | A1 | 5/2021 | Desal et al. |

FOREIGN PATENT DOCUMENTS

| | | | |
|---|---|---|---|
| CN | 101200504 | A | 6/2008 |
| CN | 105770903 | A | 7/2016 |
| CN | 109666121 | A | 4/2019 |
| CN | 109776450 | A | 5/2019 |
| FR | 2 967 678 | A1 | 5/2012 |
| JP | 2003-516519 | A | 5/2003 |

(Continued)

OTHER PUBLICATIONS

Bernkop-Schnürch et al., Journal of Controlled Release, 71, 2001, 277-285. (Year: 2001).*

(Continued)

*Primary Examiner* — Layla D Berry
(74) *Attorney, Agent, or Firm* — Birch, Stewart, Kolasch & Birch, LLP

(57) ABSTRACT

Provided are a novel crosslinked alginic acid, a crosslinked alginic acid structure, etc., by performing a crosslinking reaction using alginic acid derivatives represented by formula (I) and formula (II). As a result, a novel crosslinked alginic acid, crosslinked alginic acid structure, etc., are provided.

[C143]

(I)

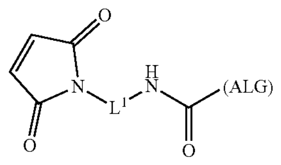

(II)

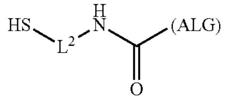

14 Claims, 11 Drawing Sheets

(56) References Cited

FOREIGN PATENT DOCUMENTS

| | | | |
|---|---|---|---|
| JP | 2007-99902 | A | 4/2007 |
| JP | 2010-502824 | A | 1/2010 |
| JP | 2010-512433 | A | 4/2010 |
| JP | 2010-209130 | A | 9/2010 |
| JP | 2015-502957 | A | 1/2015 |
| KR | 10-2015-0028198 | A | 3/2015 |
| WO | WO 00/65352 | A1 | 11/2000 |
| WO | WO 2004/037164 | A2 | 5/2004 |
| WO | WO 2004/099259 | A1 | 11/2004 |
| WO | WO 2005/000402 | A2 | 1/2005 |
| WO | WO 2010/087912 | A1 | 8/2010 |
| WO | WO 2013/086015 | A1 | 6/2013 |
| WO | WO 2014/028209 | A1 | 2/2014 |
| WO | WO 2014/058359 | A1 | 4/2014 |
| WO | WO 2015/154078 | A1 | 10/2015 |
| WO | WO 2018/151186 | A1 | 8/2018 |
| WO | WO 2019/172261 | A1 | 9/2019 |
| WO | WO 2019/189330 | A1 | 10/2019 |

OTHER PUBLICATIONS

International Search Report for PCT/JP2020/035932 mailed on Dec. 22, 2020.

Kafedjiiski et al., "Evaluation of In Vitro Enzymatic Degradation of Various Thiomers and Cross-Linked Thiomers", Drug Development and Industrial Pharmacy, 2007, vol. 33, pp. 199-208.

Kharkar et al., "Thiol-ene Click Hydrogels for Therapeutic Delivery", ACS Biomaterials Science & Engineering, 2016, vol. 2, pp. 165-179.

Kodiyan et al., "Surface Modification with Alginate-Derived Polymers for Stable, Protein-Repellent, Long-Circulating Gold Nanoparticles", ACS Nano, 2012, vol. 6, No. 6, pp. 4796-4805.

Madl et al., "Presentation of BMP-2 Mimicking Peptides in 3D Hydrogels Directs Cell Fate Commitment in Osteoblasts and Mesenchymal Stem Cells", Biomacromolecules, 2014, vol. 15, pp. 445-455.

Marcano et al., "Chemical Modification of Alginate With L-Cysteine to Extend its Use in Drug Delivery Systems", Cellulose Chemistry and Technology, 2018, vol. 52, No. 7-8, pp. 559-567.

Oki et al., "Switching of Cell Proliferation/Differentiation in Thiol-Maleimide Clickable Microcapsules Triggered by in Situ Conjugation of Biomimetic Peptides", Biomacromolecules, 2019, vol. 20, No. 6, pp. 2350-2359.

Shtenberg et al., "Alginate modified with maleimide-terminated PEG as drug carriers with enhanced mucoadhesion", Carbohydrate Polymers, 2017, vol. 175, pp. 337-346.

Written Opinion of the International Searching Authority for PCT/JP2020/035932 mailed on Dec. 22, 2020.

Chinese Office Action for Chinese Application No. 202080066960.1, dated May 11, 2024, with English translation.

Chinese Office Action for Chinese Application No. 202080066960.1, dated Oct. 21, 2024, with English translation.

Japanese Office Action for Japanese Application No. 2021-548963, dated Nov. 12, 2024, with English translation.

Ooi et al., "Thiol-Ene Alginate Hydrogels as Versatile Bioinks for Bioprinting," Biomacromolecules, vol. 19, Jun. 25, 2018, pp. 3390-3400.

Extended European Search Report for corresponding European Application No. 20870420.5, dated Sep. 20, 2023.

"Chinese Master's Theses Full-text Database Engineering Science and Technology," CPCH2163298P, Feb. 15, 2017, 15 pages total, with partial English translation.

Chinese Office Action and Search Report for Chinese Application No. 202080066960.1, dated Dec. 14, 2023, with English translation.

U.S. Appl. No. 17/041,036, filed Sep. 24, 2020.

European Communication pursuant to Article 94(3) EPC for European Application No. 20 870 420.5, dated May 21, 2025.

* cited by examiner

CROSSLINKED ALGINIC ACID STRUCTURE

TECHNICAL FIELD

The present invention relates to a novel crosslinked alginic acid, and to alginic acid derivatives for forming the crosslinked alginic acid, and the like.

BACKGROUND ART

Alginic acid, a bioabsorbable polysaccharide that is extracted from brown algae such as *Lessonia, Macrocystis, Laminaria, Ascophyllum, Durvillea, Ecklonia cava, Eisenia bicyclis*, and *Saccharina japonica*, is a linear heteropolymer of two kinds of uronic acid, D-mannuronate (M) and L-guluronate (G). Specifically, the alginic acid is a block copolymer including a homopolymer fraction of D-mannuronate (MM fraction), a homopolymer fraction of L-guluronate (GG fraction) and a fraction of randomly arranged D-mannuronate and L-guluronate (M/G fraction) in arbitrary combination. Alginic acid is widely used in such fields as foodstuffs, medicine, cosmetics, textiles and papermaking.

While monovalent alkali metal salts of alginic acid (such as sodium alginate, and the like) are water soluble, divalent alkali earth metal salts of alginic acid (such as calcium alginate, and the like) have the property of being gelled (insolubilized) when crosslinked by metal ions. That is, an alginic acid gel (ionically crosslinked alginic acid) with a three-dimensional mesh structure formed by ionic crosslinking can be obtained by adding an aqueous solution containing a divalent metal ion (such as a calcium ion, barium ion or the like) to an aqueous solution of alginic acid. Attempts have been made to modify or mold these into forms suitable for various applications using these properties (Patent Literature 1 to 3). It is also known that the gel structure of such an alginic acid gel is easily broken down and returned to alginic acid by including a chelating agent, such as ethylenediamine tetraacetic acid (EDTA) for example, to capture the divalent metal ion forming the ionic crosslinks in the gel.

Polysaccharide derivatives are also known involving maleimide groups and/or thiol groups as reactive groups forming chemical crosslinks (Patent Literature 4 to 10, Non Patent Literature 1 to 2).

CITATION LIST

Patent Literature

[Patent Literature 1] Japanese Patent Application Publication No. 2010-209130
[Patent Literature 2] Japanese Patent Application Publication No. 2007-99902
[Patent Literature 3] WO 2004/099259
[Patent Literature 4] Japanese Translation of PCT Application No. 2003-516519
[Patent Literature 5] Japanese Translation of PCT Application No. 2015-502957
[Patent Literature 6] FR 2967678
[Patent Literature 7] WO 2014/058359
[Patent Literature 8] Japanese Patent Application Publication No. 2010-512433
[Patent Literature 9] WO 2018/151186
[Patent Literature 10] WO 2019/189330

Non Patent Literature

[Non Patent Literature 1] ACS Nano (2012), 6(6), 4796-4805.
[Non Patent Literature 2] Biomacromolecules (2019), 20(6), 2350-2359.

SUMMARY OF INVENTION

Technical Problem

Under these circumstances, there is demand for a novel crosslinked alginic acid, alginic acid derivatives for forming the crosslinked alginic acid, a crosslinked alginic acid structure, and methods for manufacturing these.

Solution to Problem

The inventors has completed the present invention as a result of earnest research aimed at solving the above problems after discovering that using alginic acid derivatives having specific introduced crosslinking groups (alginic acid derivatives represented by formula (I) and formula (II) below) to form a crosslinked alginic acid and crosslinked alginic acid structure (beads/dye-containing beads) results in highly stable beads or a gel having material permeability or the like. That is, the present invention is as follows.

The alginic acid derivative represented by formula (I) and the alginic acid derivative represented by formula (II) shown in the following embodiments, a novel crosslinked alginic acid obtained by performing a Michael addition reaction using these, a crosslinked alginic acid structure obtained by dripping the alginic acid derivatives into a solution containing a divalent metal ion and subjecting the resulting gel to a Michael addition reaction, and methods for manufacturing the alginic acid derivatives, crosslinked alginic acid and crosslinked alginic acid structure are provided here.

That is, typical embodiments are shown in [1] to [27] below.

[1] A crosslinked alginic acid obtained by performing a crosslinking reaction using an alginic acid derivative represented by formula (I) below:

[C1]

(I)

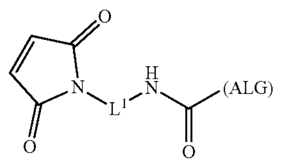

[in formula (I), $-L^1-$, —NHCO— and (ALG) are defined as in Embodiment 1 below] and the alginic acid derivative represented by formula (II) below:

[C2]

(II)

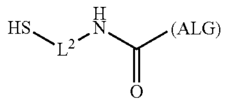

[in formula (II), $-L^2-$, —NHCO— and (ALG) are defined as in Embodiment 1 below].

[2] An alginic acid derivative represented by formula (I) below:

[C3]

(I)

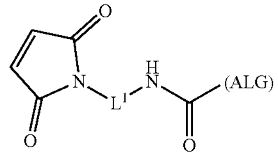

[in formula (I), -$L^1$-, —NHCO— and (ALG) are defined as in Embodiment 1 or Embodiment 2 below].

[3] The alginic acid derivative represented by formula (I) according to [1] or [2] above, wherein the introduction rate of a reactive group represented by formula (BR-1) below:

[C4]

(BR-1)

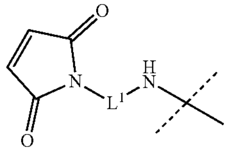

[in formula (BR-1), -$L^1$- is defined as in Embodiment 3 below] is from 0.5% to 30% or from 1% to 30%.

[4] The alginic acid derivative represented by formula (I) according to [1] or [2] above, wherein the weight-average molecular weight of the alginic acid derivative as measured by gel filtration chromatography is from 100,000 Da to 3,000,000 Da.

[5] An alginic acid derivative represented by formula (II-P) below:

[C5]

(II-P)

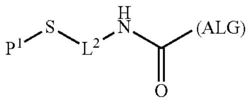

[in formula (II-P), $P^1$, -$L^2$-, —NHCO— and (ALG) are defined as in Embodiment 5 below].

[6-1] The alginic acid derivative represented by formula (II) according to [1] above, wherein the introduction rate of a reactive group represented by formula (BR-2) below:

[C6]

(BR-2)

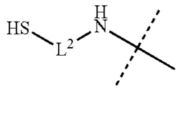

[in formula BR-2), -$L^2$- is defined as in Embodiment 6-1 below] is from 1.0% to 30%.

[6-2] The alginic acid derivative represented by formula (II-P) according to [5] above, wherein the introduction rate of a reactive group represented by formula (BR-2-P) below:

[C7]

(BR-2-P)

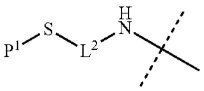

[in formula (BR-2-P), $P^1$ and -$L^2$- are defined as in Embodiment 6-2 below] is from 1.0% to 30%.

[7-1] The alginic acid derivative represented by formula (II) according to [1] above, wherein the weight-average molecular weight of the alginic acid derivative as measured by gel filtration chromatography is from 100,000 Da to 3,000,000 Da.

[7-2] The alginic acid derivative represented by formula (II-P) according to [5] above, wherein the weight-average molecular weight of the alginic acid derivative as measured by gel filtration chromatography is from 100,000 Da to 3,000,000 Da.

[8] The crosslinked alginic acid according to [1] above, wherein the chemical crosslink in the crosslinked alginic acid of [1] above is the structure of the following formula (LK-1):

[C8]

(LK-1)

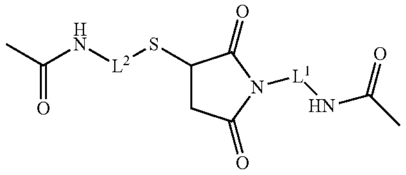

[in formula (LK-1), the —CONH— and —NHCO— at either end and -$L^1$- and -$L^2$- are defined as in Embodiment 8 below].

[8-1] A crosslinked alginic acid represented by the following formula (CAL-1):

[C9]

(CAL-1)

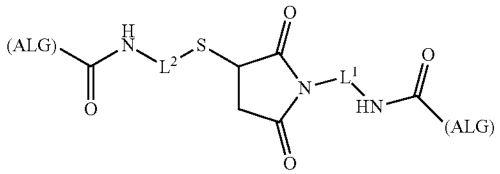

[in formula (CAL-1), (ALG), —CONH—, —NHCO—, -$L^1$- and -$L^2$- are defined as in [1] above].

[8-2] A crosslinked alginic acid represented by the following formula (CAL-1):

[C10]

(CAL-1)

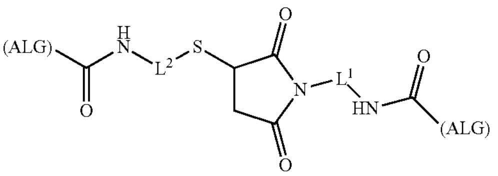

[in formula (CAL-1), (ALG), —CONH—, —NHCO—, -$L^1$- and -$L^2$- are defined as in [1] above], obtained by the crosslinking reaction according to [1] above.

[9] A method for manufacturing the crosslinked alginic acid according to [1] above, in which a solution of the alginic acid derivative represented by formula (I) is added to a solution of the alginic acid derivative represented by formula (II) to perform a crosslinking reaction.

[10] A method for manufacturing the crosslinked alginic acid according to [1] above, in which a solution of the alginic acid derivative represented by formula (II) is added to a solution of the alginic acid derivative represented by formula (I) to perform a crosslinking reaction.

[11] A method for manufacturing the crosslinked alginic acid according to [1] above, wherein the chemical crosslink formed by performing a Michael addition reaction using the alginic acid derivative represented by formula (I) and the alginic acid derivative represented by formula (II) is the structure of formula (LK-1) below:

[C11]

(LK-1)

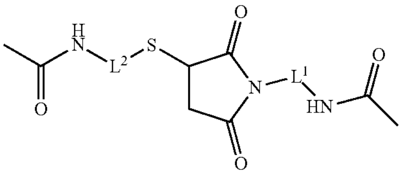

[in formula (LK-1), the —CONH— and —NHCO— at either end and -$L^1$- and -$L^2$- are defined as in Embodiment 11 below].

[12] A crosslinked alginic acid structure comprising as crosslinks both an ionic crosslink partially formed by a divalent metal ion and a chemical crosslink formed by a Michael addition reaction, obtained by dripping a solution of the alginic acid derivative represented by formula (I) into a solution containing a divalent metal ion to obtain a gel that is then subjected to a crosslinking reaction in a solution of the alginic acid derivative represented by formula (II).

[13] A crosslinked alginic acid structure comprising as crosslinks both an ionic crosslink partially formed by a divalent metal ion and a chemical crosslink formed by a Michael addition reaction, obtained by dripping a solution of the alginic acid derivative represented by formula (II) into a solution containing a divalent metal ion to obtain a gel that is then subjected to a crosslinking reaction in a solution of the alginic acid derivative represented by formula (I).

[14] A crosslinked alginic acid structure comprising as crosslinks both an ionic crosslink partially formed by a divalent metal ion and a chemical crosslink formed by a Michael addition reaction, obtained by dripping a solution of a composition comprising the alginic acid derivative represented by formula (I) and the alginic acid derivative represented by formula (II) into a solution containing a divalent metal ion.

[15] The crosslinked alginic acid structure according to any one of [12] to [14] above, wherein the chemical crosslink formed by performing a Michael addition reaction using the alginic acid derivative represented by formula (I) and the alginic acid derivative represented by formula (II) is the structure of the following formula (LK-1):

[C12]

(LK-1)

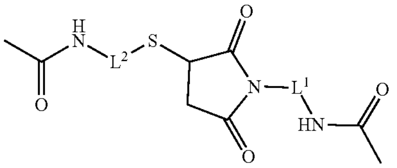

[in formula (LK-1), the —CONH— and —NHCO— at either end and -$L^1$- and -$L^2$- are defined as in Embodiment 15 below].

[16] The crosslinked alginic acid structure according to any one of [12] to [15] above, which is a fibrous structure, a fiber, beads, a gel or a substantially spherical gel.

[17] A medical material comprising the crosslinked alginic acid structure according to any one of [12] to [16] above.

[18] The medical material according to [17] above, which is a fibrous structure, a fiber, beads, a gel or a substantially spherical gel.

[19] A composition comprising the alginic acid derivative represented by formula (I) and the alginic acid derivative represented by formula (II).

[19-1] A composition comprising the alginic acid derivative represented by formula (I) and the alginic acid derivative represented by formula (II-P).

[19-2] A composition comprising an alginic acid derivative selected from the alginic acid derivative represented by formula (I), the alginic acid derivative represented by formula (II) or the alginic acid derivative represented by formula (II-P).

[20] A method for manufacturing a crosslinked alginic acid structure, in which a solution of a composition comprising the alginic acid derivative represented by formula (I) and the alginic acid derivative represented by formula (II) is dripped into a solution containing a divalent metal ion.

[21] A method for manufacturing a crosslinked alginic acid structure, in which a crosslinked alginic acid structure comprising as crosslinks both an ionic crosslink partially formed by a divalent metal ion and a chemical crosslink formed by a Michael addition reaction is obtained by dripping a solution of the alginic acid derivative represented by formula (I) into a solution containing a divalent metal ion to obtain a gel that is then subjected to a crosslinking reaction in a solution of the alginic acid derivative represented by formula (II).

[22] A method for manufacturing a crosslinked alginic acid structure, in which a crosslinked alginic acid structure comprising as crosslinks both an ionic crosslink partially formed by a divalent metal ion and a chemical crosslink formed by a Michael addition reaction is obtained by dripping a solution of the alginic acid derivative represented by formula (II) into a solution containing a divalent metal ion to obtain a gel that is then subjected to a crosslinking reaction in a solution of the alginic acid derivative represented by formula (I).

[23] The method for manufacturing the crosslinked alginic acid structure according to any one of [20] to [22] above, wherein the chemical crosslink formed by performing a Michael addition reaction using the alginic acid derivative represented by formula (I) and the alginic acid derivative represented by formula (II) is the structure of the following formula (LK-1):

[C13]

(LK-1)

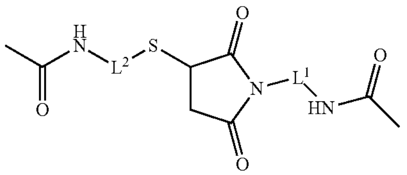

[in formula (LK-1), the —CONH— and —NHCO— at either end and $-L^1-$ and $-L^2-$ are defined as in Embodiment 23 below].

[24] A crosslinked alginic acid structure having the ability to hold contents, obtained by subjecting the alginic acid derivative represented by formula (I) and the alginic acid derivative represented by formula (II) to ionic crosslinking by a divalent metal ion and chemical crosslinking by a Michael addition reaction.

[25] The crosslinked alginic acid according to [1] or [8] above or a crosslinked alginic acid structure according to any one of [12] to [16] and [24] above, having biocompatibility.

[26a] The alginic acid derivative represented by formula (I) according to [2] above or the alginic acid derivative represented by (II-P) according to [5] above, having biocompatibility.

[27] An amino compound represented by the following formula (AM-2), or pharmaceutically acceptable salt thereof:

[C14]

(AM-2)

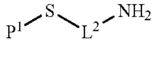

[in formula (AM-2), $P^1$ and $-L^2-$ are defined as in the Embodiment 27 below].

Advantageous Effects of Invention

The present invention provides a novel crosslinked alginic acid formed with chemical crosslinking, a crosslinked alginic acid structure, novel alginic acid derivatives that can be used for forming the crosslinked alginic acid and crosslinked alginic acid structure, and intermediates (amino compounds) for manufacturing the derivatives, and the like.

Preferably, the crosslinked alginic acid and the alginic acid derivatives used as raw materials are expected to be safe for living organisms.

The crosslinking reaction of the alginic acid derivatives of the invention can also be used safely and easily because it is completed under mild conditions by a Michael addition reaction.

A crosslinked alginic acid of certain embodiments is one that has been chemically crosslinked by a Michael addition reaction. The crosslinked alginic acid of the present invention may be crosslinked by a combination of chemical crosslinking with another crosslinking method such as crosslinking using a divalent metal ion such as a calcium ion, and its stability is improved in comparison with non-crosslinked alginic acids (such as monovalent sodium salts of alginic acid) or non-chemically crosslinked alginic acids (such as crosslinked alginic acid salts crosslinked by calcium ions) by adjusting the reaction conditions.

In certain embodiments it is possible to adjust the gel properties of the crosslinked body, and also to adjust the material permeability.

The present invention has at least one of these effects.

DESCRIPTION OF EMBODIMENTS

Specific Embodiments

Figure 1:
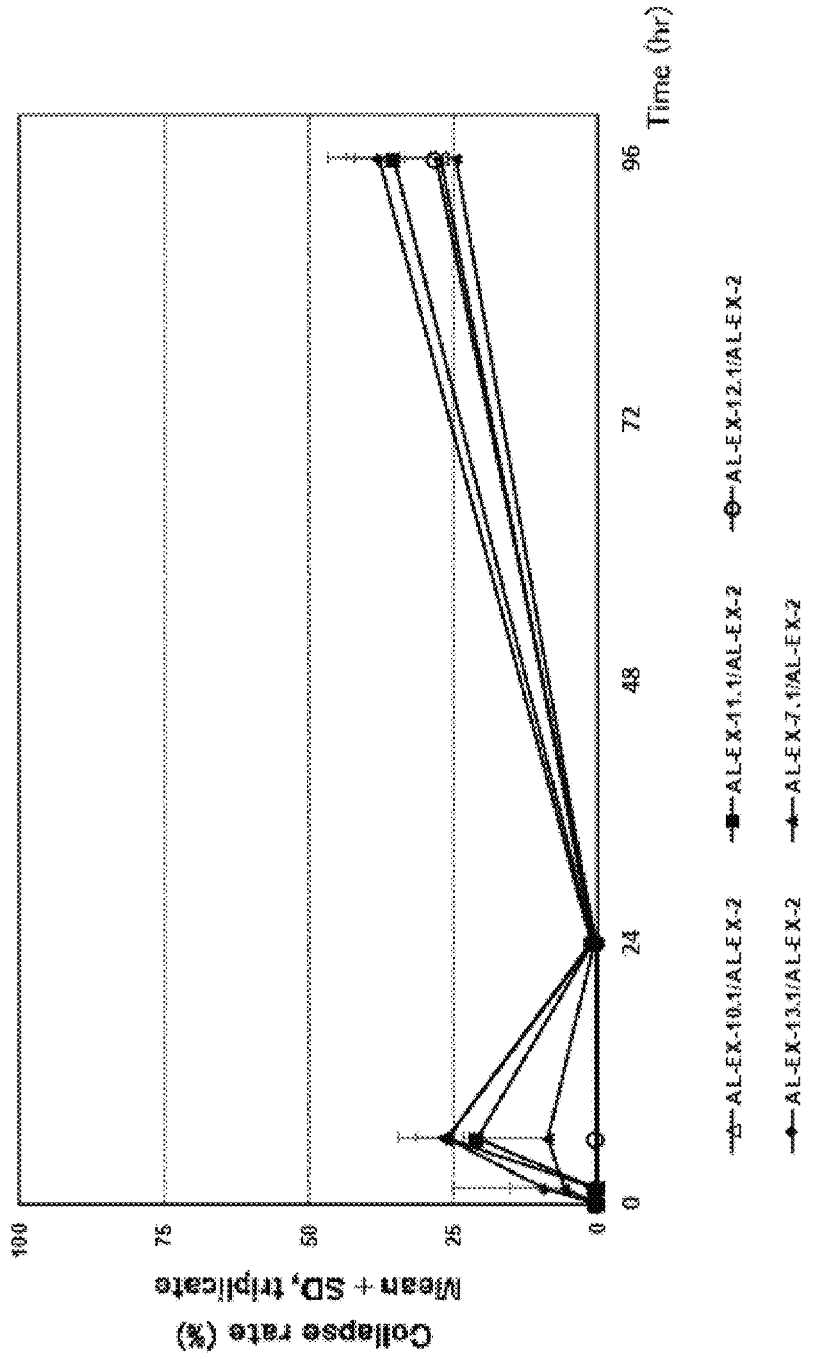
FIG. 1 shows an evaluation of the gel stability of a crosslinked alginic acid structure.

More specifically, the following Embodiments [1] to [24] may be included.

[1] Embodiment 1 is as follows. A crosslinked alginic acid obtained by performing a crosslinking reaction using the alginic acid derivative represented by formula (I) below and the alginic acid derivative represented by formula (II) below.

[Alginic Acid Derivative Represented by Formula (I)]

An alginic acid derivative represented by formula (I) below:

[C15]

(I)

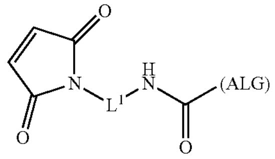

(in formula (I), (ALG) represents alginic acid; —NHCO— represents an amide bond via any carboxyl group of alginic acid; and -L[1]- represents a linker selected from the group consisting of the following partial structural formulae [excluding the parts outside broken lines at both ends of each formula]:

[C16]

(L1-1)

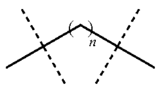

(L1-2)

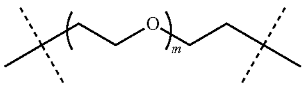

(L1-3)

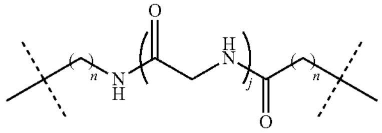

(L1-4)

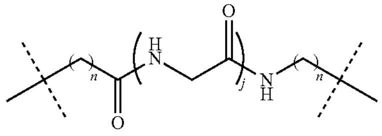

(where a hydrogen atom of a methylene group (—$CH_2$—) in formulae (L1-1) to (L1-4) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group (where M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (where each of $R^a$ and $R^b$ in the —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L1-1) to (L1-4) are both substituted with $C_{1-6}$ alkyl groups, the alkyl groups may bind together to form a $C_{3-8}$ cycloalkyl ring;

a —NH— group in formula (L1-3) and formula (L1-4) may form a non-aromatic heterocyclic ring with a substituent binding to an adjacent carbon atom; and n is an integer from 1 to 18;

m is an integer from 1 to 9; and j is an integer from 0 to 9).

[Alginic Acid Derivative Represented by Formula (II)]

An alginic acid derivative represented by formula (II) below:

[C17]

(II)

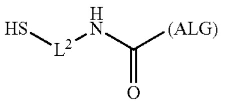

(in formula (II), (ALG) represents alginic acid; —NHCO— represents an amide bond via any carboxyl group of alginic acid; and -L[2]- represents a linker selected from the group consisting of the following partial structural formulae [excluding the parts outside broken lines at both ends of each formula]:

[C18]

(L2-1)

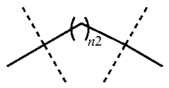

(L2-2)

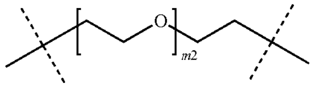

(L2-3)

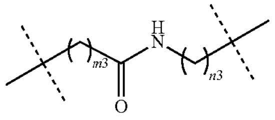

(L2-4)

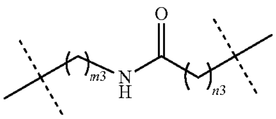

(L2-5)

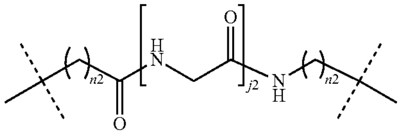

(L2-6)

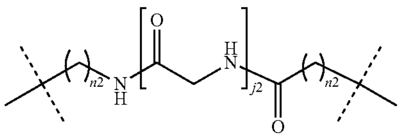

(where a hydrogen atom of a methylene group (—$CH_2$—) in formulae (L2-1) to (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$alkyl group, a —COOH group, a —COOM group (where M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (where each of $R^a$ and $R^b$ in the above —$NR^aR^b$ group, ($R^aR^b$N)—$C_{1-6}$ alkyl group or $(R^aR^bN)C(=O)$—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L2-1) to (L2-6) are both substituted with $C_{1-6}$ alkyl groups, the alkyl groups may bind together to form a $C_{3-8}$ cycloalkyl ring;

a —NH— group in formula (L2-3) to formula (L2-6) may form a non-aromatic heterocyclic ring with a substituent binding to an adjacent carbon atom; and m2 is an integer from 1 to 9;

n2 is an integer from 1 to 18;

m3 is an integer from 1 to 10;

n3 is an integer from 1 to 10; and j2 is an integer from 0 to 9).

In this Description, when the same symbol is used more than once as a symbol representing an integer in the structural formula of a linker ($-L^1$, $-L^2$-), the integers may be the same or different.

In this Description, the —CO— of an amide bond (—NH—CO— or —CO—NH—) binding to (ALG) in the formula (I), the formula (II), the formula (II-P) and the formula (CAL-1) is a carbonyl group derived from a carboxyl of alginic acid.

The groups in the formula (I) and formula (II) in the Embodiment [1] are explained in detail below. In explanations of compounds, for example, "$C_{1-6}$" means that there are from 1 to 6 constituent carbon atoms, and unless otherwise specified, this represents the total number of carbon atoms in a linear, branched, or cyclic group. In groups that contain both chain groups and cyclic groups, it means the total number of carbon atoms in the chain and the ring.

Unless otherwise specified, moreover, the groups in subordinate embodiments of the Embodiment [1] are defined in the same way as the groups in the Embodiment [1].

Unless otherwise specified a "$C_{6-10}$ aryl group" as used herein may be, for example, a phenyl, 1-naphthyl, 2-naphthyl, indanyl, indenyl, or 1,2,3,4-tetrahydronaphthyl group, or the like.

Unless otherwise specified a "heterocyclic group" as used herein may be, for example, a "heteroaryl group", a "non-aromatic heterocyclic group", or the like.

Unless otherwise specified a "heteroaryl group" as used herein means a monocyclic, polycyclic or fused cyclic (which may be partially hydrogenated if polycyclic or fused cyclic) 5- to 14-membered, or preferably 5- to 8-membered, or more preferably 5- to 7-membered heteroaryl ring containing 1 to 5 or preferably 1 to 3 hetero atoms selected from the group consisting of the nitrogen, sulfur and oxygen atoms.

Unless otherwise specified, examples of the "heteroaryl group" as used herein include "monocyclic heteroaryl groups", "fused cyclic heteroaryl groups", "partially hydrogenated fused cyclic heteroaryl groups", and the like for example.

Unless otherwise specified the "monocyclic heteroaryl groups" as used herein means monocyclic examples of the heteroaryl ring as defined above, in which the ring has preferably 5 to 8, or more preferably 5 to 6 membered ("5- or 6-membered heteroaryl group").

Unless otherwise specified a "5- or 6-membered heteroaryl group" as used herein means a 5- or 6-membered heteroaryl ring containing 1 to 4 hetero atoms selected from the group consisting of the nitrogen, sulfur and oxygen atoms, and unless otherwise specified the "5- or 6-membered heteroaryl group" is a monovalent group obtained by removing any hydrogen atom from this heteroaryl ring.

Unless otherwise specified, examples of the "5- or 6-membered heteroaryl group" as used herein include pyrrolyl, furyl, thienyl, imidazolyl, pyrazolyl, oxazolyl, isoxazolyl, thiazolyl, isothiazolyl, 1,2,3-triazolyl, 1,2,4-triazolyl, 1,2,3-oxadiazolyl, 1,2,4-oxadiazolyl, 1,3,4-oxadiazolyl, furazanyl, 1,2,3-thiadiazolyl, 1,2,4-thiadiazolyl, 1,3,4-thiadiazolyl, tetrazolyl, pyridyl, pyridazinyl, pyrimidinyl, pyrazinyl, 1,2,3-triazinyl, 1,2,4-triazinyl, 1,3,5-triazinyl, 2H-1,2,3-thiadiazinyl, 4H-1,2,4-thiadiazinyl, 6H-1,3,4-thiadiazinyl, pyridazin-3(2H)-one, pyrimidin-2(1H)-one, pyrazin-2(1H)-one, or pyridin-2(1H)-one groups, and the like.

Unless otherwise specified a "5-membered heteroaryl group" as used herein means a 5-membered heteroaryl ring containing 1 to 4 hetero atoms selected from the group consisting of the nitrogen, sulfur, and oxygen atoms, and unless otherwise specified the "5-membered heteroaryl group" is a monovalent group obtained by removing any hydrogen atom from this heteroaryl ring. Examples include pyrrolyl, furyl, thienyl, imidazolyl, pyrazolyl, oxazolyl, isoxazolyl, thiazolyl, isothiazolyl, 1,2,3-triazolyl, 1,2,4-triazolyl, 1,2,3-oxadiazolyl, 1,2,4-oxadizolyl, 1,3,4-oxadizolyl, furazanyl, 1,2,3-thiadiazolyl, 1,2,4-thiadiazolyl, 1,3,4-thiadiazolyl, or tetrazolyl groups, and the like.

Unless otherwise specified a "6-membered heteroaryl group" as used herein means a 6-membered heteroaryl ring containing 1 to 4 hetero atoms selected from the group consisting of the nitrogen, sulfur, and oxygen atoms, and unless otherwise specified the "6-membered heteroaryl group" is a monovalent group obtained by removing any hydrogen atom from this heteroaryl ring. Examples include pyridyl (pyridinyl), pyridazinyl, pyrimidinyl, pyrazinyl, 1,2,3-triazinyl, 1,2,4-triazinyl, 1,3,5-triazinyl, 2H-1,2,3-thiadiazinyl, 4H-1,2,4-thiadiazinyl, 6H-1,3,4-thiadiazinyl, pyridazin-3(2H)-one, pyrimidin-2(1H)-one, pyrazin-2(1H)-one, or pyridin-2(1H)-one groups, and the like.

Unless otherwise specified the "5- or 6-membered heteroaryl group" in a "5- or 6-membered heteroaryl $C_{1-6}$ alkyl group" as used herein means a group substituted on the "$C_{1-6}$ alkyl group", and examples include pyrolylmethyl, furylmethyl, thienylmethyl, imidazolylmethyl, pyrazolylmethyl, oxazolylmethyl, isoxazolylmethyl, thiazolylmethyl, isothiazolylmethyl, 1,2,3-triazolylmethyl, 1,2,4-triazolylmethyl, 1,2,3-oxadiazolylmethyl, 1,2,4-oxadiazolylmethyl, 1,3,4-oxadiazolylmethyl, furazanylmethyl, 1,2,3-thiadiazolylmethyl, 1,2,4-thiadiazolylmethyl, 1,3,4-thiadiazolylmethyl, tetrazolylmethyl, pyridylmethyl, pyridazinylmethyl, pyrimidinylmethyl, pyrazinylmethyl, 1,2,3-triazinylmethyl, 1,2,4-triazinylmethyl, 1,3,5-triazinylmethyl, 2H-1,2,3-thiadiazinylmethyl, 4H-1,2,4-thiadiazinylmethyl, or 6H-1,3,4-thiadiazinylmethyl groups, and the like.

A "partially hydrogenated fused cyclic heteroaryl group" is a monovalent group produced by removing any hydrogen atom from the partially hydrogenated fused ring in a fused ring formed by condensing a "heterocyclic group" with an "aryl group" or a "heterocyclic group" with a "heteroaryl group". The "any hydrogen atom" may be a hydrogen atom removed from either the "heterocyclic group", "aryl group" or "heteroaryl group" ring part in the fused ring, or a hydrogen atom removed from the hydrogenated ring part, and in the case of tetrahydroquinolyl in which the quinoline is partially hydrogenated for example, examples include 5,6,7,8-tetrahydroquinolyl, or 1,2,3,4-tetrahydroquinolyl, and the like. Depending on the position from which the "any hydrogen atom" is removed, examples of 5,6,7,8-tetrahydroquinolyl include -2-yl, -3-yl, -4-yl, -5-yl, -6-yl, -7-yl and, -8-yl, and the like, while in the case of 1,2,3,4-tetrahydroquinolyl, examples include -1-yl, -2-yl, -3-yl, -4-yl, -5-yl, -6-yl, -7-yl, -8-yl, and the like.

The "partially hydrogenated fused cyclic heteroaryl group" preferably has a 8- to 12-membered ring, or in other words is a "partially hydrogenated 8- to 12-membered fused cyclic heteroaryl group", and examples include indolinyl, 2,3-dihydrobenzofuranyl, 4,5,6,7-tetrahydro-benzofuranyl, 2,3-dihydrobenzo[d]oxazolyl, 2,3-dihydrobenzo[d]thiazolyl, 4,5,6,7-tetrahydrobenzo[d]oxazolyl, 4,5,6,7-tetrahydrobenzo[d]thiazolyl, 4,5,6,7-tetrahydro-1H-benzo[d]imidazolyl, benzo[d][1,3]dioxonyl, 2,3-dihydrobenzo[b][1,4]dioxinyl, 2,3-dihydrobenzo[b][1,4]oxathiinyl, 3,4-dihydro-2H-benzo[b][1,4]oxazinyl, 3,4-dihydro-2H-benzo[b][1,4]thiazinyl, 1,2,3,4-tetrahydroquinoxalinyl, 3,4-dihydro-2H-benzo[b][1,4]dioxepin, 2,3,4,5-tetrahydrobenzo[b][1,4]dioxocinyl, N-acetyl-2,3-dihydrobenzo[d]oxazolyl, N-acetyl-3,4-dihydro-2H-benzo[b][1,4]oxazinyl, N-acetyl-2,3,4,5-tetrahydrobenzo[b][1,4]-oxazepinyl, N-acetyl-3,4,5,6-tetrahydro-2H-benzo[b][1,4]oxazocinyl, N-methanesulfonyl-2,3-dihydrobenzo[d]oxazolyl, N-methanesulfonyl-3,4-dihydro-2H-benzo[b][1,4]oxazinyl, N-methanesulfonyl-2,3,4,5-tetrahydrobenzo[b][1,4]oxazepinyl, N-methanesulfonyl-3,4,5,6-tetrahydro-2H-benzo[b][1,4]oxazocinyl, and the like.

Unless otherwise specified a "non-aromatic heterocyclic group" as used herein means a "3- to 14-membered saturated or unsaturated non-aromatic heterocyclic group".

Unless otherwise specified a "3- to 14-membered saturated or unsaturated non-aromatic heterocyclic group" as used herein means a monovalent group obtained by removing any hydrogen atom from a 3- to 14-membered saturated or unsaturated heterocycle containing 1 to 4 hetero atoms selected from the oxygen, sulfur, and nitrogen atoms.

Unless otherwise specified a "non-aromatic heterocyclic group" as used herein may be an aziridinyl, azetidinyl, oxiranyl, thiiranyl, oxetanyl, thietanyl, pyrrolidinyl, tetrahydrofuryl, dihydrofuryl, thioranyl, pyrazolinyl, pyrazolidinyl, imidazolidinyl, piperidinyl, dihydropyranyl, tetrahydropyranyl (2-tetrahydro-2H-pyranyl, 3-tetrahydro-2H-pyranyl, 4-tetrahydro-2H-pyranyl (4-tetrahydro-2H-pyran-4-yl group)), tetrahydrothiopyranyl, piperazinyl, dioxanyl, oxazolidinyl, isoxazolinyl, 1,3-oxazolidinyl, isoxazolidinyl, thiazolinyl, isothiazolinyl, 1,3-thiazolidinyl, isothiazolidinyl, oxadiazolinyl, 1,3,4-oxadiazolidinyl, morpholinyl, thiomorpholinyl, quinuclidinyl, azepanyl, diazepinyl, or oxepanyl group or the like.

Unless otherwise specified a "halogen atom" as used herein may be, for example, a fluorine atom, chlorine atom, bromine atom, iodine atom, or the like.

Unless otherwise specified, "halogenated" in a "halogenated $C_{1-6}$ alkyl group" or the like as used herein means that multiple or preferably 1 to 5 such halogen atoms are present as substituents.

Unless otherwise specified a "$C_{1-6}$ alkyl group" as used herein may be, for example, a methyl, ethyl, propyl, isopropyl, butyl, isobutyl, sec-butyl, tert-butyl, pentyl, isopentyl, neopentyl or hexyl group, and the like.

Unless otherwise specified a "halogenated $C_{1-6}$ alkyl group" as used herein means a group obtained by substituting multiple or preferably 1 to 5 halogen atoms arbitrarily in the above "$C_{1-6}$ alkyl", and examples include fluoromethyl, difluoromethyl, trifluoromethyl, 2,2,2-trifluoroethyl, 1,1,2,2-tetrafluoroethyl, or pentafluoroethyl groups, and the like.

Unless otherwise specified a "$C_{1-6}$ alkoxy group" as used herein means an alkoxy including the above "$C_{1-6}$ alkyl group" bound to an oxygen atom, and examples include methoxy, ethoxy, propoxy, isopropoxy, butoxy, isobutoxy, sec-butoxy, tert-butoxy, pentyloxy, or hexyloxy groups, and the like.

Unless otherwise specified a "—$NR^aR^b$ group" as used herein means a group including —$R^a$ and —$R^b$ substituted for the two hydrogen atoms on the nitrogen atom of an "amino group".

Unless otherwise specified, each of $R^a$ and $R^b$ as used herein may each independently mean a group selected from a hydrogen atom, a $C_{1-6}$alkyl group, a $C_{2-7}$ alkanoyl group, or a $C_{1-6}$ alkylsulfonyl group, and examples include amino, N-methylamino, N-ethylamino, N,N-dimethylamino, N-acetylamino, N-methanesulfonylamino, or N-acetyl-N-methylamino groups, and the like.

Unless otherwise specified a "$C_{2-7}$ alkanoyl group" as used herein means a "$C_{1-6}$ alkylcarbonyl group" including a carbonyl group bound to a "$C_{1-6}$ alkyl group", and examples include acetyl, propionyl, butyryl, isobutyryl, valeryl, isovaleryl, pivaloyl, hexanoyl, heptanoyl, cyclopropylcarbonyl, cyclobutylcarbonyl, cyclopentylcarbonyl, cyclohexylcarbonyl, cyclopropylmethylcarbonyl, or 2-methylcyclopropylcarbonyl groups, and the like.

Unless otherwise specified a "$C_{1-6}$ alkylsulfonyl group" as used herein means a group including the above "$C_{1-6}$ alkyl group" substituted on a "sulfonyl (—$SO_2$—) group", and examples include methylsulfonyl, ethylsulfonyl, propylsulfonyl, or isopropylsulfonyl groups, and the like.

Unless otherwise specified a "cyclic ether" as used herein means an ether having a structure including an oxygen substituted for a carbon of a cyclic hydrocarbon (such as cyclopropane, cyclobutane, cyclopentene, cyclohexane, cyclopentane, and cyclooctane, which are $C_{3-8}$ cyclic hydrocarbons ($C_{3-8}$ cycloalkyl rings) out of the monocyclic or polycyclic saturated hydrocarbon ring groups), and examples include cyclic ethers such as epoxide, oxetane, tetrahydrofuran, tetrahydropyran, 1,3-dioxolane, 1,3-dioxane, 1,4-dioxane, 1,3-dioxepane, 1,4-dioxepane, 1,4-dioxocane, or 1,5-dioxocane, and the like.

Unless otherwise specified a "3-N—($C_{2-7}$ alkanoyl) oxazolidine ring" as used herein means a ring obtained by substituting the above "$C_{2-7}$ alkanoyl group" for the hydrogen atom of the NH group of an oxazolidine ring, and examples include 3-N-acetyl-oxazolidine, 3-N-ethylcarbonyl-oxazolidine rings, and the like.

Unless otherwise specified a "4-N—($C_{2-7}$ alkanoyl)morpholine ring" as used herein means a ring obtained by substituting the above "$C_{2-7}$ alkanoyl group" for the hydrogen atom of the NH group of a morpholine ring, and examples include 4-N-acetyl-morpholine, 4-N-ethylcarbonyl-morpholine rings, and the like.

Unless otherwise specified a "4-N—($C_{2-7}$ alkanoyl)-1,4-oxazepan ring" as used herein means a ring obtained by substituting the above "$C_{2-7}$ alkanoyl group" for the hydrogen atom of the NH group of a 1,4-oxazepan ring, and examples include 4-N-acetyl-1,4-oxazepan, 4-N-ethylcarbonyl-1,4-oxazepan rings, and the like.

Unless otherwise specified a "3-N—($C_{1-6}$ alkylsulfonyl) oxazolidine ring" as used herein means a ring obtained by substituting the above "$C_{1-6}$ alkylsulfonyl group" for the hydrogen atom of the NH group of an oxazolidine ring, and examples include 3-N-methanesulfonyl-oxazolidine, 3-N-ethylsulfonyl-oxazolidine rings, and the like.

Unless otherwise specified a "4-N—($C_{1-6}$ alkylsulfonyl) morpholine ring" as used herein means a ring obtained by substituting the above "$C_{1-6}$ alkylsulfonyl group" for the hydrogen atom of the NH group of a morpholine ring, and examples include 4-N-methanesulfonyl-morpholine, 4-N-ethylsulfonyl-morpholine rings, and the like.

Unless otherwise specified a "4-N—($C_{2-7}$ alkanoyl)-1,4-oxazepan ring" as used herein means a ring obtained by substituting the above "$C_{1-6}$ alkylsulfonyl group" for the hydrogen atom of the NH group of a 1,4-oxazepan ring, and examples include 4-N-methanesulfonyl-1,4-oxazepan, 4-N-ethylsulfonyl-1,4-oxazepan rings, and the like.

Unless otherwise specified a "hydroxy $C_{1-6}$ alkyl group" as used herein means a group including preferably 1 to 5 hydroxyl groups arbitrarily substituted for any hydrogen atom of the above "$C_{1-6}$ alkyl group", and examples include hydroxymethyl, 2-hydroxyethyl, 3-hydroxypropyl and 2,2-dimethyl-2-hydroxyethyl (=2-hydroxy-2-methylpropyl) groups, and the like.

Unless otherwise specified a "thiol $C_{1-6}$alkyl group" as used herein means a group including the above "$C_{1-6}$ alkyl group" arbitrarily substituted with multiple or preferably 1 to 5 thiol (—SH) groups, and examples include thiolmethyl, 2-thiolethyl or 3-thiolpropyl groups, and the like.

Unless otherwise specified a "$C_{1-6}$ alkylthio $C_{1-6}$ alkyl group" as used herein means a group including the above "thiol $C_{1-6}$alkyl group" with a "$C_{1-6}$ alkyl group" substituted for the hydrogen atom of the thiol (—SH) group, and examples include methylthiomethyl, methylthioethyl, ethylthiomethyl, or ethylthioethyl groups, and the like.

Unless otherwise specified, in this Description a "—COO ($C_{1-6}$ alkyl) group" is a group having a hydrogen atom of the "carboxy group" substituted with a $C_{1-6}$ alkyl group, such as for example a carboxymethyl, carboxyethyl or carboxypropyl group or the like.

Unless otherwise specified a "($R^aR^bN$)—$C_{1-6}$ alkyl group" as used herein means a group including a "—$NR^aR^b$ group" (each of $R^a$ and $R^b$ as used herein may each independently mean a group selected from a hydrogen atom, $C_{1-6}$alkyl group, $C_{2-7}$ alkanoyl group, or $C_{1-6}$ alkylsulfonyl group) arbitrarily substituted for any hydrogen atom of the above "$C_{1-6}$ alkyl group", and examples include aminomethyl, aminoethyl, aminopropyl, aminobutyl, N-methylaminomethyl, N-acetylaminomethyl, or N-methanesulfonylaminomethyl groups, and the like.

Unless otherwise specified a "($R^aR^bN$)C(═O)—$C_{1-6}$ alkyl group" as used herein means a group including a "($R^aR^bN$)C(═O)— group" (each of $R^a$ and $R^b$ as used herein may each independently mean a group selected from a hydrogen atom, $C_{1-6}$alkyl group, $C_{2-7}$ alkanoyl group, and $C_{1-6}$ alkylsulfonyl group) arbitrarily substituted for any hydrogen atom of the above "$C_{1-6}$ alkyl group", and examples include aminocarbonylmethyl, aminocarbonylethyl, N-methylaminocarbonylmethyl, N-acetylaminocarbonylethyl, or N-methanesulfonylaminocarbonylethyl groups, and the like.

Unless otherwise specified a "guanidino $C_{1-6}$ alkyl group" as used herein means a group including a guanidino group (—NH—C(═NH)—$NH_2$) substituted for any hydrogen atom of the above "$C_{1-6}$alkyl group", and examples include guanidinomethyl, guanidinoethyl, or guanidinopropyl groups, and the like.

Unless otherwise specified a "$C_{7-16}$ aralkyl group" as used herein means a group including the above "$C_{6-10}$ aryl group" substituted for any carbon atom of the above "$C_{1-6}$ alkyl group", and examples include benzyl, phenethyl, diphenylmethyl, trityl, biphenylmethyl, naphthylmethyl, indanylmethyl, or 1,2,3,4-tetrahydronaphthlene-1-ylmethyl groups, and the like.

Unless otherwise specified a "hydroxy $C_{6-10}$ aryl $C_{1-6}$alkyl group" as used herein means a group including multiple or preferably 1 to 5 hydroxyl groups arbitrarily substituted for a hydrogen atom in the "$C_{6-10}$ aryl group" of the above "$C_{7-16}$ aralkyl group", and examples include 2-hydroxybenzyl, 3-hydroxybenzyl, or 4-hydroxybenzyl groups, and the like.

Unless otherwise specified a "heteroaryl $C_{1-6}$ alkyl group" as used herein means a group including the above "$C_{1-6}$ alkyl group" substituted for any hydrogen atom of the above "heteroaryl group", and examples include 2-pyridylmethyl, 4-imidazoylmethyl, or 3-indolylmethyl groups, and the like.

Unless otherwise specified a "non-aromatic heterocyclic ring" as used herein means a "3- to 14-membered saturated or unsaturated non-aromatic heterocyclic ring".

Unless otherwise specified a "3- to 14-membered saturated or unsaturated non-aromatic heterocyclic ring" as used herein means a 3- to 14-membered saturated or unsaturated heterocyclic ring containing 1 to 4 hetero atoms selected from the oxygen, sulfur, and nitrogen atoms.

Unless otherwise specified a "non-aromatic heterocyclic ring" as used herein may be for example an aziridine, azetidine, pyrrolidine, pyrazolidine, oxazolidine, thiazolidine, isoxazolidine, isothiazolidine, imidazolidine, piperidine, piperazine, morpholine, thiomorpholine, oxazepan, diazepan, thiazepan, oxazocan, diazocan, thiazocan, or oxadine group, and the like.

Unless otherwise specified a "$C_{3-8}$ cycloalkyl group" as used herein means a cyclic saturated hydrocarbon ring (including monocyclic and polycyclic rings) with 3 to 8 carbon atoms, and examples include cyclopropane, cyclobutane, cyclopentane, cyclohexane, cyclopentane, or cyclooctane groups, and the like.

[1-1] In formula (I) of the Embodiment [1], -$L^1$- is preferably a linker selected from the group consisting of the following partial structural formulae [excluding the parts outside broken lines at both ends of each formula]:

[C19]

(L1-1)

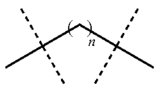

(L1-2)

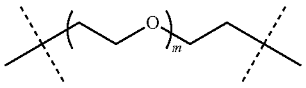

(L1-3)

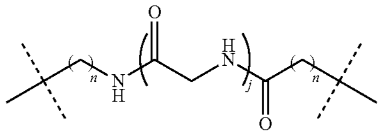

(in which a hydrogen atom of a methylene group (—$CH_2$—) in formulae (L1-1) to (L1-3) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$ alkyl group, a $C_{1-6}$alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^bN$)—$C_{1-6}$ alkyl group or ($R^aR^bN$)C(═O)—$C_{1-6}$ alkyl group (in which each of $R^a$ and $R^b$ in the above —$NR^aR^b$ group, ($R^aR^bN$)—$C_{1-6}$ alkyl group or ($R^aR^bN$)C(═O)—$C_{1-6}$ alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formulae (L1-1) to (L1-3) are both substituted with $C_{1-6}$alkyl groups, the alkyl groups may bind together to form a $C_{3-8}$ cycloalkyl ring;

a —NH— group in formula (L1-3) may form a non-aromatic heterocyclic ring with a substituent binding to an adjacent carbon atom; and n is an integer from 1 to 18;

m is an integer from 1 to 9; and j is an integer from 0 to 9);

More preferably -$L^1$- is a linker selected from the group consisting of the following partial structural formulae [excluding the parts outside broken lines at both ends of each formula]:

[C20]

(L1-1)

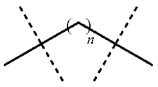

(L1-2)

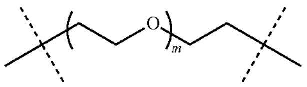

(L1-3)

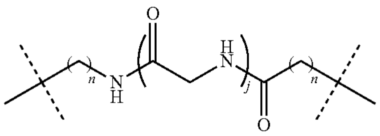

(in which a hydrogen atom of a methylene group (—$CH_2$—) in formulae (L1-1) to (L1-3) may be substituted with multiple (such as 1 to 5) groups selected from an oxo group (═O), a halogen atom, a hydroxyl group, a $C_{1-6}$ alkyl group, a hydroxy $C_{1-6}$alkyl group, a thiol $C_{1-6}$ alkyl group, a $C_{1-6}$ alkylthio $C_{1-6}$alkyl group, a —COOH group, a —COOM group (in which M is $L^1$, Na, K or ½ Ca), a —COO ($C_{1-6}$ alkyl) group, a —$NR^aR^b$ group, ($R^aR^bN$)—$C_{1-6}$ alkyl group or ($R^aR^bN$)C(═O)—$C_{1-6}$ alkyl group (in which each of $R^a$ and $R^b$ in the above —$NR^aR^b$ group, ($R^aR^bN$)—$C_{1-6}$ alkyl group or ($R^aR^bN$)C(═O)—$C_{1-6}$ alkyl group is independently a group selected from a hydrogen atom, a $C_{1-6}$ alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group; and n is an integer from 1 to 9;

m is an integer from 1 to 5; and j is an integer from 0 to 5);

Still more preferably -$L^1$- is a linker selected from the group consisting of the following partial structural formulae [excluding the parts outside broken lines at both ends of each formula]:

[C21]

(L1-1)

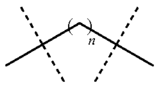

(L1-2)

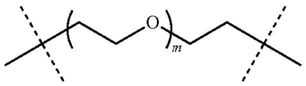

(L1-3)

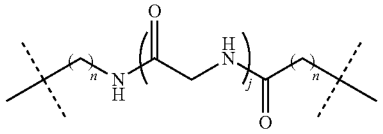

(in which a hydrogen atom of a methylene group (—$CH_2$—) in formulae (L1-1) to (L1-3) may be substituted with multiple (such as 1 to 3) groups selected from a halogen atom, a hydroxyl group, a $C_{1-6}$ alkyl group, a hydroxy $C_{1-6}$alkyl group, a —COOH group, a —COOM group (in which M is Li, Na, K or ½ Ca), a —COO ($C_{1-6}$ alkyl) group or a $C_{7-16}$ aralkyl group; and n is an integer from 1 to 3;

m is an integer from 1 to 3; and j is an integer from 0 to 2);

Particularly preferably, -$L^1$- is a linker selected from the group consisting of the following partial structural formulae [excluding the parts outside broken lines at both ends of each formula]:

[C22]

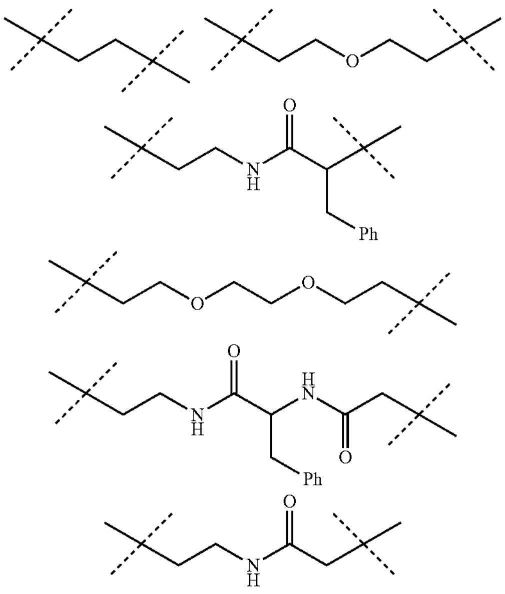

Most preferably, -$L^1$- is a linker selected from the group consisting of the following partial structural formulae [excluding the parts outside broken lines at both ends of each formula]:

[C23]

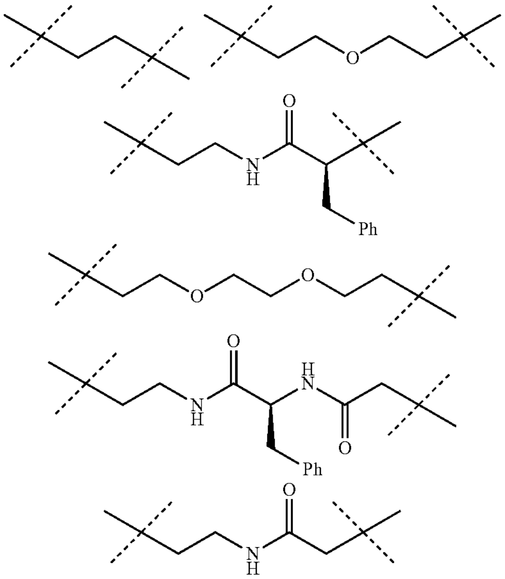

[1-2] In formula (II) of the Embodiment [1], $-L^2-$ is preferably a linker selected from the group consisting of the following partial structural formulae [excluding the parts outside broken lines at both ends of each formula]:

[C24]

(L2-3)

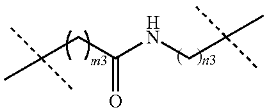

(L2-5)

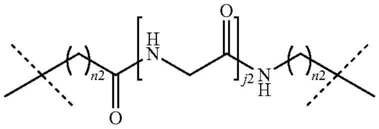

(L2-6)

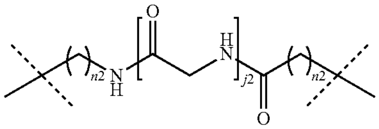

(in which a hydrogen atom of a methylene group (—$CH_2$—) in formula (L2-3), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formula (L2-3), formula (L2-5) and formula (L2-6) are both substituted with $C_{1-6}$alkyl groups, the alkyl groups may bind together to form a $C_{3-8}$ cycloalkyl ring;

a —NH— group in formula (L2-3), formula (L2-5) and formula (L2-6) may form a non-aromatic heterocyclic ring with a substituent binding to an adjacent carbon atom; and n2 is an integer from 1 to 18;

m3 is an integer from 1 to 10;

n3 is an integer from 1 to 10; and j2 is an integer from 0 to 9);

More preferably $-L^2-$ is a linker selected from the group consisting of the following partial structural formulae [excluding the parts outside broken lines at both ends of each formula]:

[C25]

(L2-3)

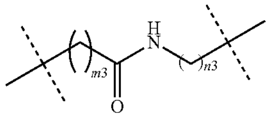

(L2-5)

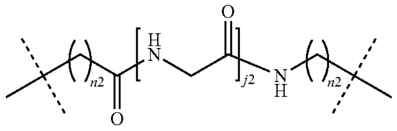

(L2-6)

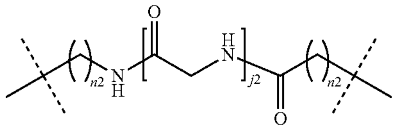

(in which a hydrogen atom of a methylene group (—$CH_2$—) in formula (L2-3), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group; and n2 is an integer from 1 to 9;

m3 is an integer from 1 to 6;

n3 is an integer from 1 to 6; and j2 is an integer from 0 to 6);

Still more preferably $-L^2-$ is a linker selected from the group consisting of the following partial structural formulae [excluding the parts outside broken lines at both ends of each formula]:

[C26]

(L2-3)

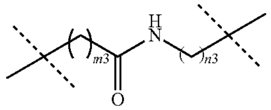

(L2-5-1)

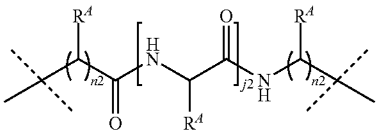

(L2-6-1)

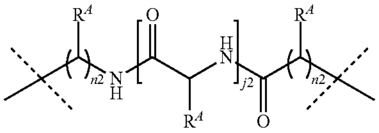

(in which each $R^A$ group in formula (L2-5-1) and formula (L2-6-1) independently represents a group selected from a hydrogen atom, a halogen atom, a hydroxyl group, a $C_{1-6}$ alkyl group, a hydroxy $C_{1-6}$ alkyl group, a —COOH group, a —COOM group (in which M is Li, Na, K or ½ Ca), a —COO ($C_{1-6}$ alkyl) group or a $C_{7-16}$ aralkyl group; and n2 is an integer from 1 to 5;

m3 is an integer from 1 to 3;

n3 is an integer from 1 to 4; and j2 is an integer from 0 to 3);

Particularly preferably, $-L^2-$ is a linker selected from the group consisting of the following partial structural formulae [excluding the parts outside broken lines at both ends of each formula]:

[C27]

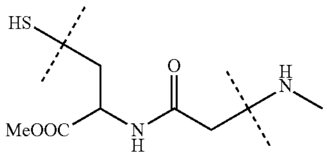

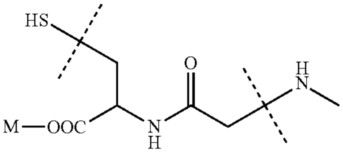

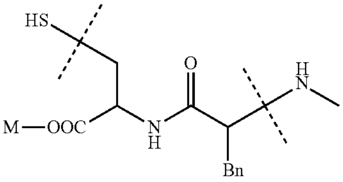

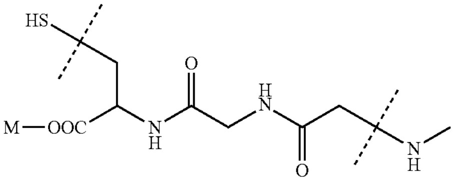

-continued

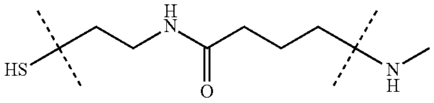

(in which M is a hydrogen atom or Na);

Most preferably, $-L^2-$ is the following partial structural formulae [excluding the parts outside broken lines at both ends of each formula]:

[C28]

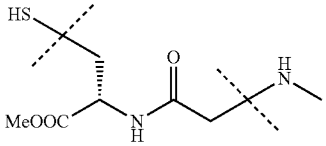

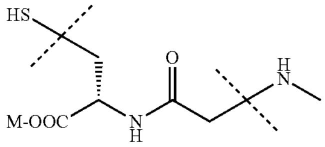

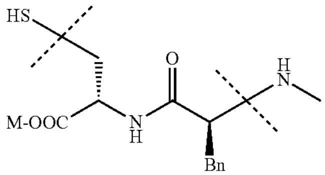

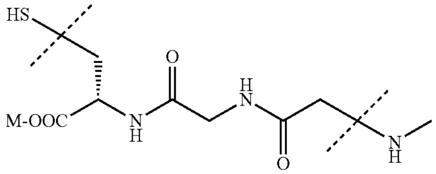

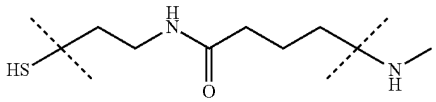

(in which M is a hydrogen atom or Na).

[1-2a] In formula (II) of the Embodiment [1], $-L^2-$ is preferably a linker selected from the group consisting of the following partial structural formulae [excluding the parts outside broken lines at both ends of each formula]:

[C29]

(L2-3)

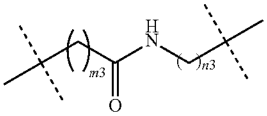

(L2-4)

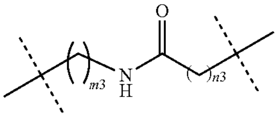

-continued (L2-5)

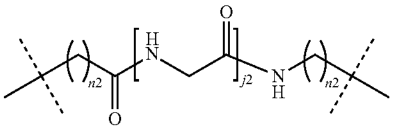

(L2-6)

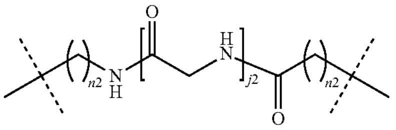

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (=O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(=O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(=O)—$C_{1-6}$alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formula (L2-3), formula (L2-4), formula (L2-5) and formula (L2-6) are both substituted with $C_{1-6}$alkyl groups, the alkyl groups may bind together to form a $C_{3-8}$ cycloalkyl ring;

a —NH— group in formula (L2-3), formula (L2-4), formula (L2-5) and formula (L2-6) may form a non-aromatic heterocyclic ring with a substituent binding to an adjacent carbon atom; and n2 is an integer from 1 to 18;

m3 is an integer from 1 to 10;

n3 is an integer from 1 to 10; and j2 is an integer from 0 to 9);

More preferably -$L^2$- is a linker selected from the group consisting of the following partial structural formulae [excluding the parts outside broken lines at both ends of each formula]:

[C30]

(L2-4)

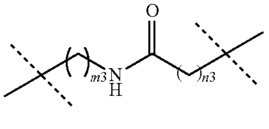

(L2-6)

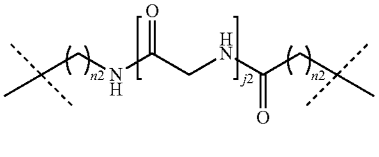

(in which a hydrogen atom of a methylene group (—$CH_2$—) in formula (L2-4) and formula (L2-6) may be substituted with multiple (such as 1 to 10, or 1 to 5) groups selected from an oxo group (=O), a halogen atom, a hydroxyl group, a $C_{1-6}$ alkyl group, a hydroxy $C_{1-6}$alkyl group, a thiol $C_{1-6}$ alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(=O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(=O)—$C_{1-6}$ alkyl group is independently a group selected from a hydrogen atom, a $C_{1-6}$ alkyl group, a $C_{2-7}$ alkanoyl group and a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group; and n2 is an integer from 1 to 9;

m3 is an integer from 1 to 6;

n3 is an integer from 1 to 6; and j2 is an integer from 0 to 6);

Still more preferably, -$L^2$- is a linker selected from the group consisting of the following partial structural formulae [excluding the parts outside broken lines at both ends of each formula]:

[C31]

(L2-4-1)

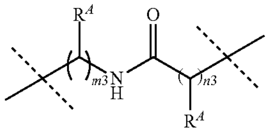

(L2-6-1)

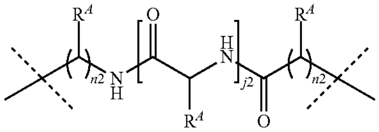

(in which each $R^A$ group in formula (L2-4-1) and formula (L2-6-1) independently represents a group selected from a hydrogen atom, a halogen atom, a hydroxyl group, a $C_{1-6}$ alkyl group, a hydroxy $C_{1-6}$ alkyl group, a —COOH group, a —COOM group (in which M is Li, Na, K or ½ Ca), a —COO ($C_{1-6}$ alkyl) group or a $C_{7-16}$ aralkyl group; and n2 is an integer from 1 to 5;

m3 is an integer from 1 to 3;

n3 is an integer from 1 to 4; and j2 is an integer from 0 to 3);

Particularly preferably, -$L^2$- is a linker selected from the group consisting of the following partial structural formulae [excluding the parts outside broken lines at both ends of each formula]:

[C32]

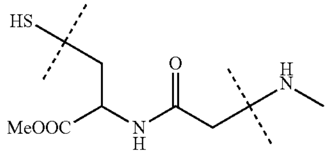

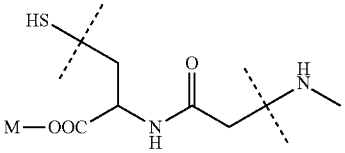

-continued

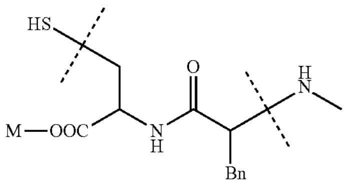

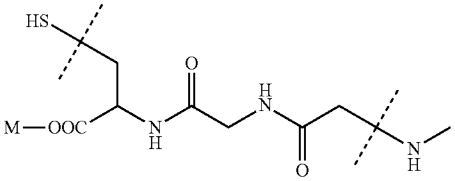

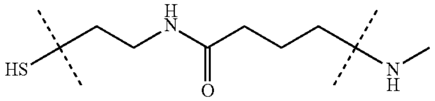

(in which M is a hydrogen atom or Na);

Most preferably, -$L^2$- is a linker selected from the group consisting of the following partial structural formulae [excluding the parts outside broken lines at both ends of each formula]:

[C33]

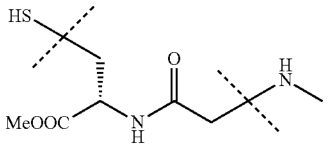

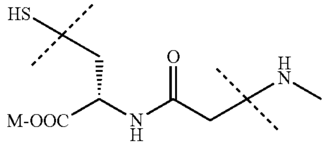

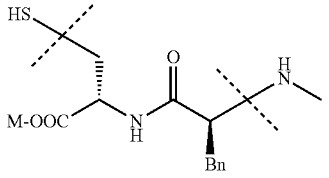

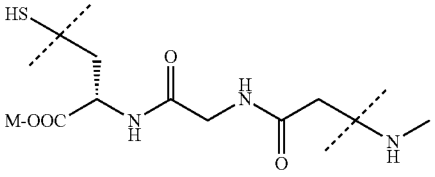

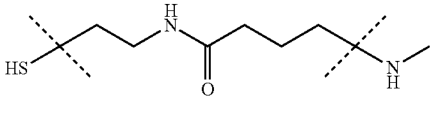

(in which M is a hydrogen atom or Na).

[1-2b] In formula (II) of the Embodiment [1], -$L^2$- is preferably a linker selected from the group consisting of the following partial structural formulae [excluding the parts outside broken lines at both ends of each formula]:

[C34]

(L2-3)

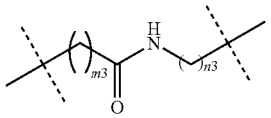

(L2-4)

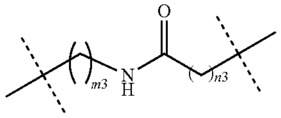

(L2-5)

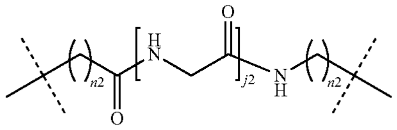

(L2-6)

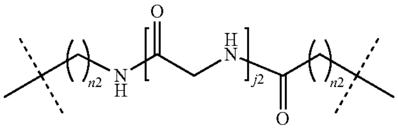

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (=O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(=O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(=O)—$C_{1-6}$alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formula (L2-3), formula (L2-4), formula (L2-5) and formula (L2-6) are both substituted with $C_{1-6}$alkyl groups, the alkyl groups may bind together to form a $C_{3-8}$ cycloalkyl ring;

a —NH— group in formula (L2-3), formula (L2-4), formula (L2-5) or formula (L2-6) may form a non-aromatic heterocyclic ring with a substituent binding to an adjacent carbon atom; and n2 is an integer from 1 to 18;

m3 is an integer from 1 to 10;

n3 is an integer from 1 to 10; and j2 is an integer from 0 to 9);

More preferably -$L^2$- is a linker selected from the group consisting of the following partial structural formulae [excluding the parts outside broken lines at both ends of each formula]:

[C35]

(L2-3)

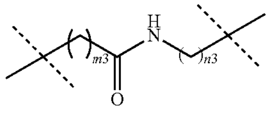

-continued (L2-4)

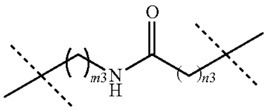

(L2-5)

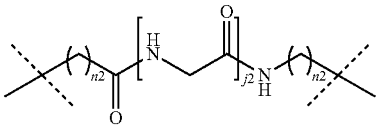

(L2-6)

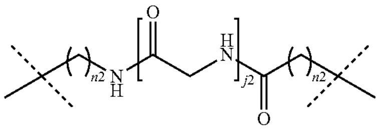

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

a —NH— group in formula (L2-3), formula (L2-4), formula (L2-5) and formula (L2-6) may form a non-aromatic heterocyclic ring with a substituent binding to an adjacent carbon atom; and n2 is an integer from 1 to 9;

m3 is an integer from 1 to 6;

n3 is an integer from 1 to 6; and j2 is an integer from 0 to 6);

Still more preferably -$L^2$- is a linker selected from the group consisting of the following partial structural formulae [excluding the parts outside broken lines at both ends of each formula]:

[C36]

(L2-3-1)

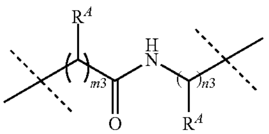

(L2-4-1)

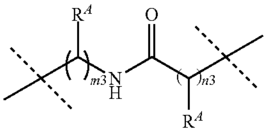

-continued (L2-5-1)

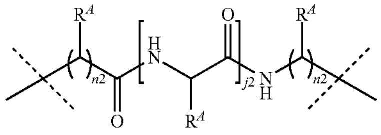

(L2-6-1)

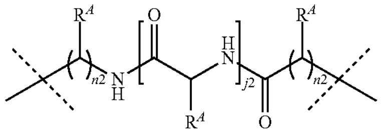

(in which each $R^A$ group in formula (L2-3-1), formula (L2-4-1), formula (L2-5-1) and formula (L2-6-1) independently represents a group selected from a hydrogen atom, a halogen atom, a hydroxyl group, a $C_{1-6}$ alkyl group, a hydroxy $C_{1-6}$ alkyl group, a —COOH group, a —COOM group (in which M is Li, Na, K or ½ Ca), a —COO ($C_{1-6}$ alkyl) group or a $C_{7-16}$ aralkyl group;

a —NH— group in formula (L2-3-1), formula (L2-4-1), formula (L2-5-1) and formula (L2-6-1) may form a non-aromatic heterocyclic ring with a substituent binding to an adjacent carbon atom; and n2 is an integer from 1 to 5;

m3 is an integer from 1 to 3;

n3 is an integer from 1 to 4; and j2 is an integer from 0 to 3);

Particularly preferably, this is a linker selected from the group consisting of the following:

[C37]

(L2-4-1)

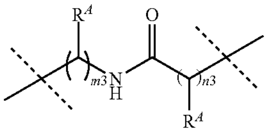

(L2-6-1)

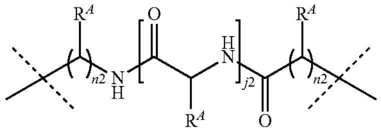

(L2-6-1-a)

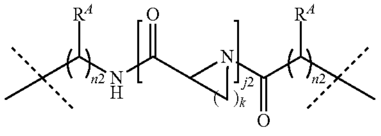

(in which each $R^A$ group in formula (L2-4-1), formula (L2-6-1) and formula (L2-6-1-a) independently represents a group selected from a hydrogen atom, a halogen atom, a hydroxyl group, a $C_{1-6}$ alkyl group, a hydroxy $C_{1-6}$alkyl group, a —COOH group, a —COOM group (in which M is Li, Na, K or ½ Ca), a —COO ($C_{1-6}$ alkyl) group or a $C_{7-16}$ aralkyl group; and n2 is an integer from 1 to 5;

m3 is an integer from 1 to 3;

n3 is an integer from 1 to 4;

j2 is an integer from 0 to 3; and k is an integer from 1 to 4);

Even more preferably, -L²- is a linker selected from the group consisting of the following partial structural formulae [excluding the parts outside broken lines at both ends of each formula]:

[C38]

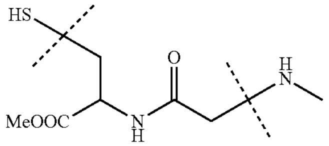

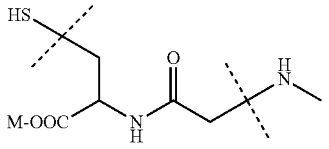

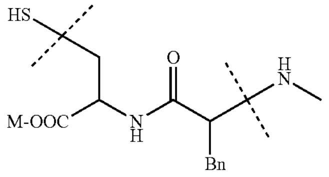

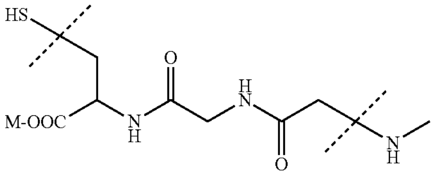

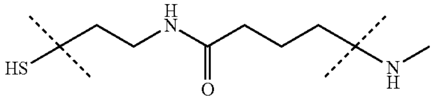

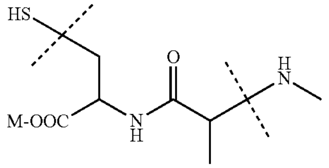

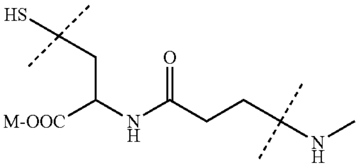

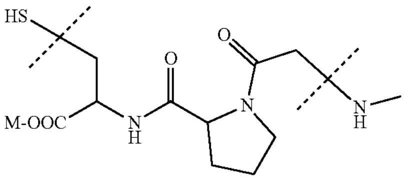

(in which M is a hydrogen atom or Na);

Most preferably, -L²- is a linker selected from the group consisting of the following partial structural formulae [excluding the parts outside broken lines at both ends of each formula]:

[C39]

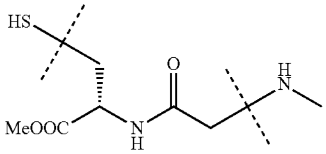

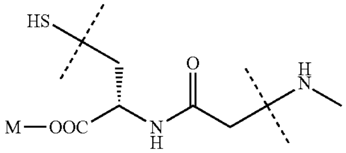

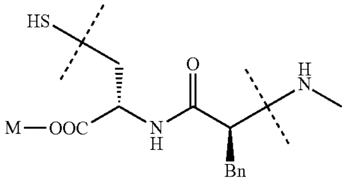

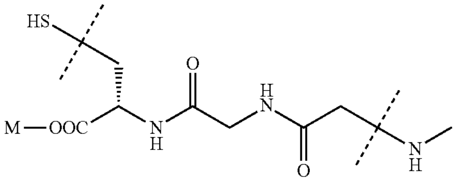

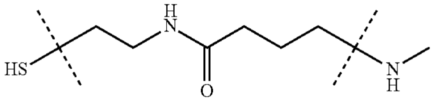

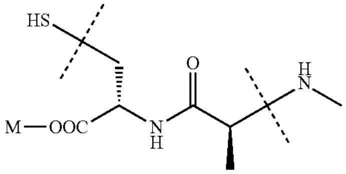

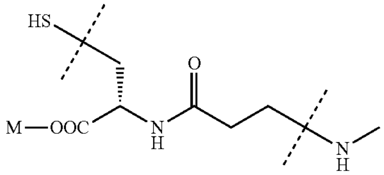

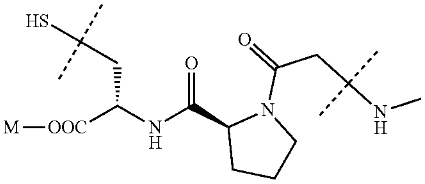

(in which M is a hydrogen atom or Na).

[2] Embodiment 2 is as follows. An alginic acid derivative represented by formula (I) below:

[C40]

(I)

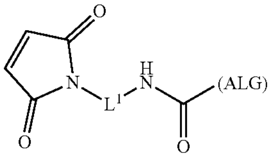

(in formula (I), (ALG) represents alginic acid; —NHCO— represents an amide bond via any carboxyl group of alginic acid; and $-L^1-$ represents a linker selected from the group consisting of the following partial structural formulae [excluding the parts outside broken lines at both ends of each formula]:

[C41]

(L1-1)

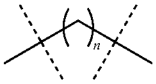

(L1-2)

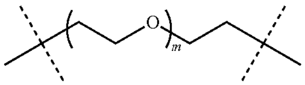

(L1-3)

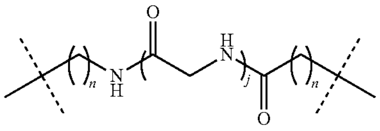

(L1-4)

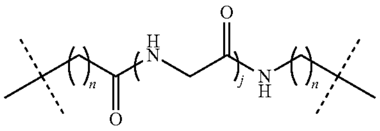

(in which a hydrogen atom of a methylene group ($—CH_2—$) in formulae (L1-1) to (L1-4) may be substituted with multiple (such as 1 to 10, or 1 to 5) groups selected from an oxo group (=O), a halogen atom, a hydroxyl group, a $C_{1-6}$ alkyl group, a hydroxy $C_{1-6}$alkyl group, a thiol $C_{1-6}$ alkyl group, a $C_{1-6}$alkylthio $C_{1-6}$alkyl group, a —COOH group, a —COOM group (in which M is Li, Na, K or ½ Ca), a —COO ($C_{1-6}$ alkyl) group, a $—NR^aR^b$ group, $(R^aR^bN)—C_{1-6}$ alkyl group or $(R^aR^bN)C(=O)—C_{1-6}$ alkyl group (in which each of $R^a$ and $R^b$ in the $—NR^aR^b$ group, $(R^aR^bN)—C_{1-6}$ alkyl group or $(R^aR^bN)C(=O)—C_{1-6}$ alkyl group is independently a group selected from a hydrogen atom, $C_{1-6}$alkyl group, $C_{2-7}$ alkanoyl group or a $C_{1-6}$ alkylsulfonyl group), a guanidino $C_{1-6}$ alkyl group, a $C_{7-16}$ aralkyl group, a hydroxy $C_6$-10 aryl $C_{1-6}$alkyl group or a heteroaryl $C_{1-6}$alkyl group;

when two hydrogen atoms of the same methylene group ($—CH_2—$) in formulae (L1-1) to (L1-4) are both substituted with $C_{1-6}$ alkyl groups, the alkyl groups may bind together to form a $C_{3-8}$ cycloalkyl ring;

a —NH— group in formula (L1-3) and formula (L1-4) may form a non-aromatic heterocyclic ring with a substituent binding to an adjacent carbon atom; and n is an integer from 1 to 18;

m is an integer from 1 to 9; and j is an integer from 0 to 9).

[2-1] In formula (I) of the Embodiment [2], $-L^1-$ is preferably a linker selected from the group consisting of the following partial structural formulae [excluding the parts outside broken lines at both ends of each formula]:

[C42]

(L1-1)

(L1-2)

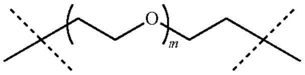

(L1-3)

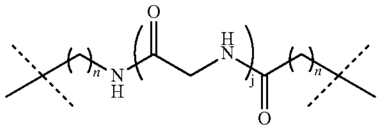

(in which a hydrogen atom of a methylene group ($—CH_2—$) in formulae (L1-1) to (L1-3) may be substituted with multiple (such as 1 to 10, or 1 to 5) groups selected from an oxo group (=O), a halogen atom, a hydroxyl group, a $C_{1-6}$ alkyl group, a hydroxy $C_{1-6}$alkyl group, a thiol $C_{1-6}$ alkyl group, a $C_{1-6}$alkylthio $C_{1-6}$alkyl group, a —COOH group, a —COOM group (in which M is Li, Na, K or ½ Ca), a —COO ($C_{1-6}$ alkyl) group, a $—NR^aR^b$ group, $(R^aR^bN)—C_{1-6}$ alkyl group or $(R^aR^bN)C(=O)—C_{1-6}$ alkyl group (in which each of $R^a$ and $R^b$ in the $—NR^aR^b$ group, $(R^aR^bN)—C_{1-6}$ alkyl group or $(R^aR^bN)C(=O)—C_{1-6}$ alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group ($—CH_2—$) in formulae (L1-1) to (L1-3) are both substituted with $C_{1-6}$alkyl groups, the alkyl groups may bind together to form a $C_{3-8}$ cycloalkyl ring;

a —NH— group in formula (L1-3) may form a non-aromatic heterocyclic ring with a substituent binding to an adjacent carbon atom; and n is an integer from 1 to 18;

m is an integer from 1 to 9; and j is an integer from 0 to 9);

More preferably $-L^1-$ is a linker selected from the group consisting of the following partial structural formulae [excluding the parts outside broken lines at both ends of each formula]:

[C43]

(L1-1)

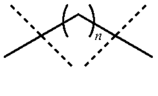

(L1-2)

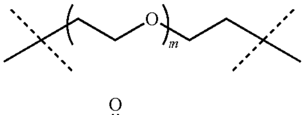

(L1-3)

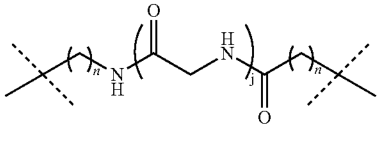

(in which a hydrogen atom of a methylene group ($—CH_2—$) in formulae (L1-1) to (L1-3) may be substituted with multiple (such as 1 to 5) groups selected from an oxo group (=O), a halogen atom, a hydroxyl group, a $C_{1-6}$ alkyl group, a hydroxy $C_{1-6}$alkyl group, a thiol $C_{1-6}$ alkyl group, a $C_{1-6}$ alkylthio $C_{1-6}$alkyl group, a —COOH group, a —COOM group (in which M is $L^1$, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(=O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(=O)—$C_{1-6}$ alkyl group is independently a group selected from a hydrogen atom, a $C_{1-6}$ alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group; and n is an integer from 1 to 9;

m is an integer from 1 to 5; and j is an integer from 0 to 5);

Still more preferably -$L^1$- is a linker selected from the group consisting of the following partial structural formulae [excluding the parts outside broken lines at both ends of each formula]:

[C44]

(L1-1)

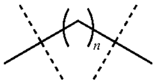

(L1-2)

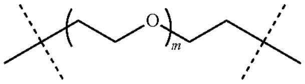

(L1-3)

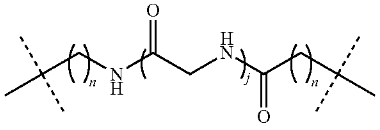

(in which a hydrogen atom of a methylene group (—$CH_2$—) in formulae (L1-1) to (L1-3) may be substituted with multiple (such as 1 to 3) groups selected from a halogen atom, a hydroxyl group, a $C_{1-6}$ alkyl group, a hydroxy $C_{1-6}$alkyl group, a —COOH group, a —COOM group (in which M is Li, Na, K or ½ Ca), a —COO ($C_{1-6}$ alkyl) group or a $C_{7-16}$ aralkyl group; and n is an integer from 1 to 3;

m is an integer from 1 to 3; and j is an integer from 0 to 2);

Particularly preferably, -$L^1$- is a linker selected from the group consisting of the following partial structural formulae [excluding the parts outside broken lines at both ends of each formula]:

[C45]

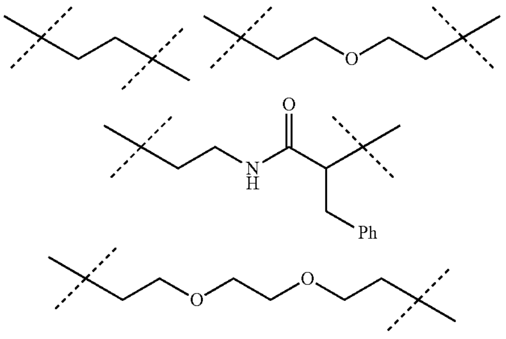

-continued

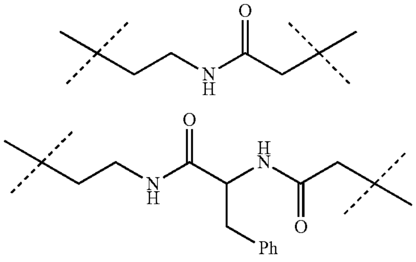

Most preferably, -$L^1$- is a linker selected from the group consisting of the following partial structural formulae [excluding the parts outside broken lines at both ends of each formula]:

[C46]

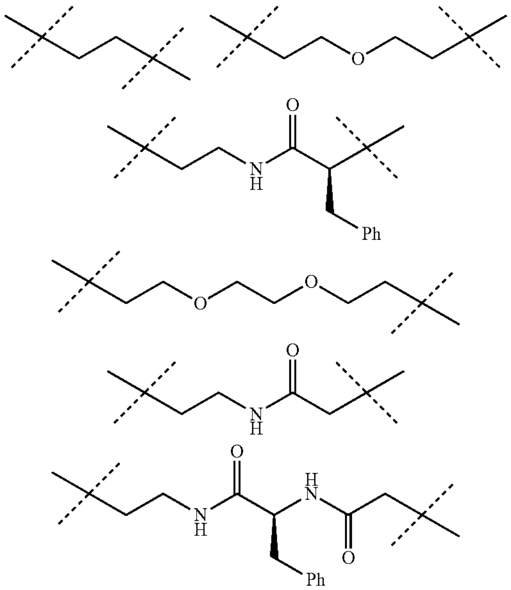

[3] Embodiment 3 is as follows. The alginic acid derivative according to [2] above, wherein the introduction rate of a group represented by formula (BR-1):

[C47]

(BR-1)

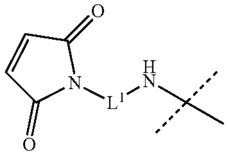

(in formula (BR-1), -$L^1$- is defined as in the Embodiment [1] or [2]) is from 1% to 30%.

[4] Embodiment 4 is as follows. The alginic acid derivative according to [2] above, wherein the weight-average molecular weight of the alginic acid derivative represented by formula (I) as measured by gel filtration chromatography is from 100,000 Da to 3,000,000 Da.

[5] Embodiment 5 is as follows. An alginic acid derivative represented by formula (II-P) below:

[C48]

(II-P)

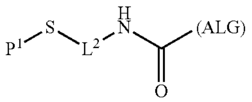

(in formula (II-P), (ALG) represents alginic acid; —NHCO— represents an amide bond via any carboxyl group of alginic acid; $P^1$ is a hydrogen atom or a thiol group (—SH group) protecting group; and $-L^2-$ represents a linker selected from the group consisting of the following partial structural formulae [excluding the parts outside broken lines at both ends of each formula]:

[C49]

(L2-1)

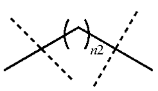

(L2-2)

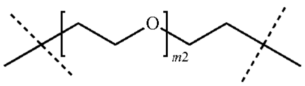

(L2-3)

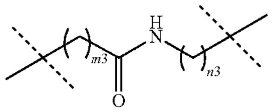

(L2-4)

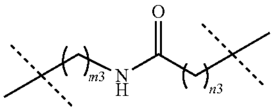

(L2-5)

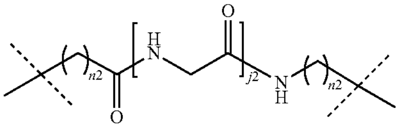

(L2-6)

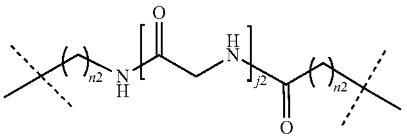

(in which a hydrogen atom of a methylene group (—$CH_2$—) in formulae (L2-1) to (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$alkyl group, $C_{2-7}$ alkanoyl group or $C_{1-6}$alkylsulfonyl group), a guanidino $C_{1-6}$ alkyl group, a $C_{7-16}$ aralkyl group, a hydroxy $C_6$-10 aryl $C_{1-6}$alkyl group or a heteroaryl $C_{1-6}$alkyl group;

when two hydrogen atoms of the same methylene group (—$CH_2$—) in formula (L2-1) to formula (L2-6) are both substituted with $C_{1-6}$alkyl groups, the alkyl groups may bind together to form a $C_{3-8}$ cycloalkyl ring;

a —NH— group in formula (L2-3) to formula (L2-6) may form a non-aromatic heterocyclic ring with a substituent binding to an adjacent carbon atom; and m2 is an integer from 1 to 9;

n2 is an integer from 1 to 18;

m3 is an integer from 1 to 10 n3 is an integer from 1 to 10; and j2 is an integer from 0 to 9).

[5-1] In formula (II-P) of the Embodiment [5], $-L^2-$ is preferably a linker selected from the group consisting of the following partial structural formulae [excluding the parts outside broken lines at both ends of each formula]:

[C50]

(L2-3)

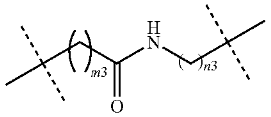

(L2-5)

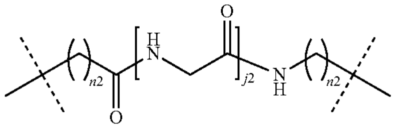

(L2-6)

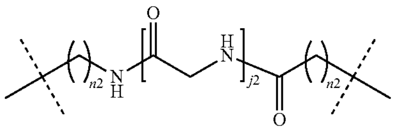

(in which a hydrogen atom of a methylene group (—$CH_2$—) in formula (L2-3), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formula (L2-3), formula (L2-5) and formula (L2-6) are both substituted with $C_{1-6}$alkyl groups, the alkyl groups may bind together to form a $C_{3-8}$ cycloalkyl ring;

a —NH— group in formula (L2-3), formula (L2-5) and formula (L2-6) may form a non-aromatic heterocyclic ring with a substituent binding to an adjacent carbon atom; and n2 is an integer from 1 to 18;

m3 is an integer from 1 to 10;

n3 is an integer from 1 to 10; and j2 is an integer from 0 to 9);

More preferably $-L^2-$ is a linker selected from the group consisting of the following partial structural formulae [excluding the parts outside broken lines at both ends of each formula]:

[C51]

(L2-3)

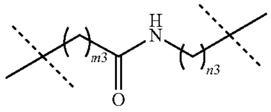

(L2-5)

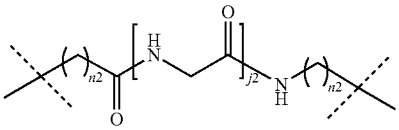

(L2-6)

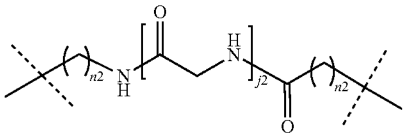

(in which a hydrogen atom of a methylene group ($—CH_2—$) in formula (L2-3), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$alkylthio $C_{1-6}$alkyl group, a —COOH group, a —COOM group (in which M is Li, Na, K or ½ Ca), a —COO ($C_{1-6}$ alkyl) group, a $—NR^aR^b$ group, $(R^aR^bN)—C_{1-6}$ alkyl group or $(R^aR^bN)C(═O)—C_{1-6}$ alkyl group (in which each of $R^a$ and $R^b$ in the $—NR^aR^b$ group, $(R^aR^bN)—C_{1-6}$ alkyl group or $(R^aR^bN)C(═O)—C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group; and n2 is an integer from 1 to 9;

m3 is an integer from 1 to 6;

n3 is an integer from 1 to 6; and j2 is an integer from 0 to 6);

Still more preferably $-L^2-$ is a linker selected from the group consisting of the following partial structural formulae [excluding the parts outside broken lines at both ends of each formula]:

[C52]

(L2-3)

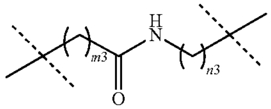

-continued (L2-5-1)

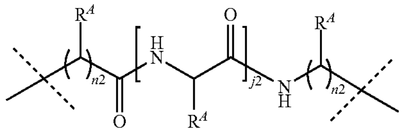

(L2-6-1)

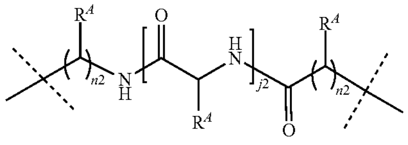

(in which each $R^A$ group in formula (L2-5-1) and formula (L2-6-1) independently represents a group selected from a hydrogen atom, a halogen atom, a hydroxyl group, a $C_{1-6}$ alkyl group, a hydroxy $C_{1-6}$ alkyl group, a —COOH group, a —COOM group (in which M is Li, Na, K or ½ Ca), a —COO ($C_{1-6}$ alkyl) group or a $C_{7-16}$ aralkyl group; and n2 is an integer from 1 to 5;

m3 is an integer from 1 to 3;

n3 is an integer from 1 to 4; and j2 is an integer from 0 to 3);

Particularly preferably, $-L^2-$ is a linker selected from the group consisting of the following partial structural formulae [excluding the parts outside broken lines at both ends of each formula]:

[C53]

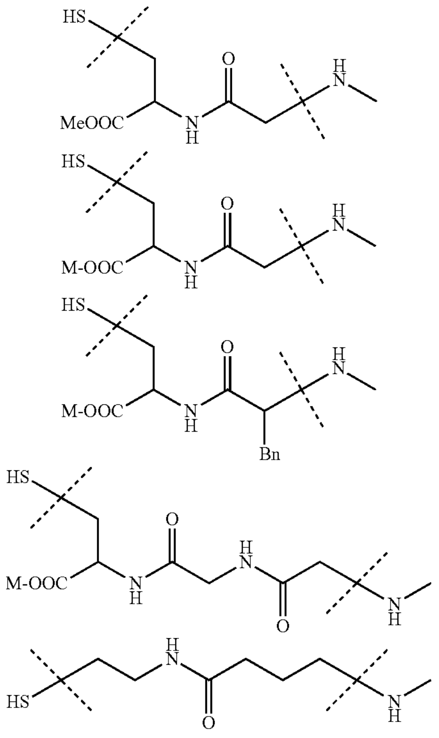

(in which M is a hydrogen atom or Na);

Most preferably -L2- is a linker selected from the group consisting of the following partial structural formulae [excluding the parts outside broken lines at both ends of each formula]:

[C54]

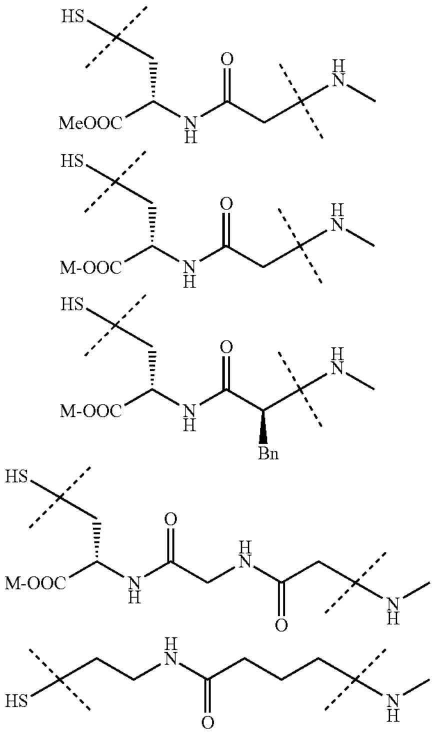

(in which M is a hydrogen atom or Na).

[5-1a] In formula (II-P) of the Embodiment [5], $-L^2-$ is preferably a linker selected from the group consisting of the following partial structural formulae [excluding the parts outside broken lines at both ends of each formula]:

[C55]

(L2-3)

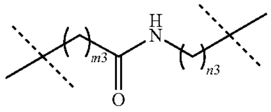

(L2-4)

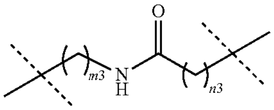

(L2-5)

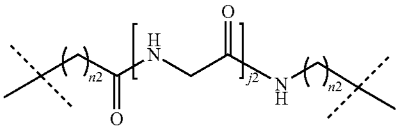

(L2-6)

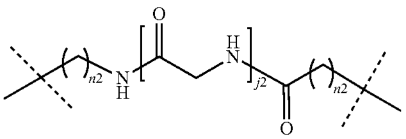

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formula (L2-3), formula (L2-4), formula (L2-5) and formula (L2-6) are both substituted with $C_{1-6}$alkyl groups, the alkyl groups may bind together to form a $C_{3-8}$ cycloalkyl ring;

a —NH— group in formula (L2-3), formula (L2-4), formula (L2-5) and formula (L2-6) may form a non-aromatic heterocyclic ring with a substituent binding to an adjacent carbon atom; and n2 is an integer from 1 to 18;

m3 is an integer from 1 to 10;

n3 is an integer from 1 to 10; and j2 is an integer from 0 to 9);

More preferably $-L^2-$ is a linker selected from the group consisting of the following partial structural formulae [excluding the parts outside broken lines at both ends of each formula]:

[C56]

(L2-4)

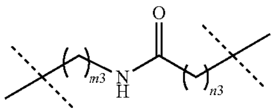

(L2-6)

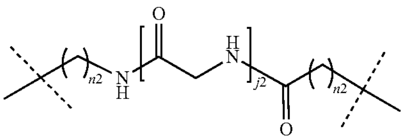

(in which a hydrogen atom of a methylene group (—$CH_2$—) in formula (L2-4) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$ alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, a $C_{1-6}$ alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group; and n2 is an integer from 1 to 9;

m3 is an integer from 1 to 6;

n3 is an integer from 1 to 6; and j2 is an integer from 0 to 6);

Still more preferably $-L^2-$ is a linker selected from the group consisting of the following partial structural formulae [excluding the parts outside broken lines at both ends of each formula]:

[C57]

(L2-4-1)

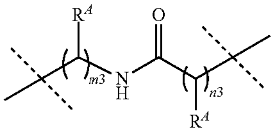

(L2-6-1)

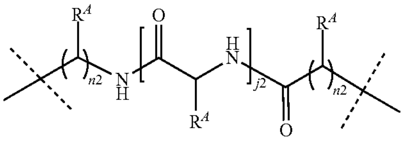

(in which each $R^A$ group in formula (L2-4-1) and formula (L2-6-1) independently represents a group selected from a hydrogen atom, a halogen atom, a hydroxyl group, a $C_{1-6}$ alkyl group, a hydroxy $C_{1-6}$ alkyl group, a —COOH group, a —COOM group (in which M is Li, Na, K or ½ Ca), a —COO ($C_{1-6}$ alkyl) group or a $C_{7-16}$ aralkyl group; and n2 is an integer from 1 to 5;

m3 is an integer from 1 to 3;

n3 is an integer from 1 to 4; and j2 is an integer from 0 to 3);

Particularly preferably, $-L^2-$ is a linker selected from the group consisting of the following partial structural formulae [excluding the parts outside broken lines at both ends of each formula]:

[C58]

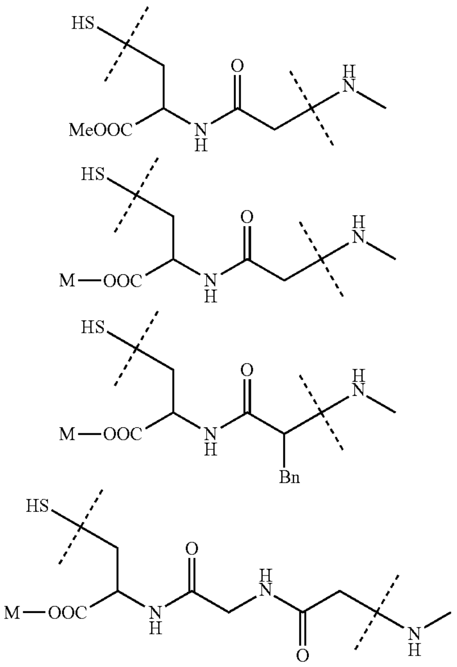

-continued

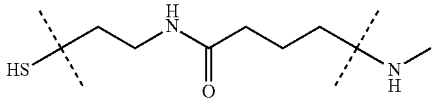

(in which M is a hydrogen atom or Na);

Most preferably, $-L^2-$ is a linker selected from the group consisting of the following partial structural formulae [excluding the parts outside broken lines at both ends of each formula]:

[C59]

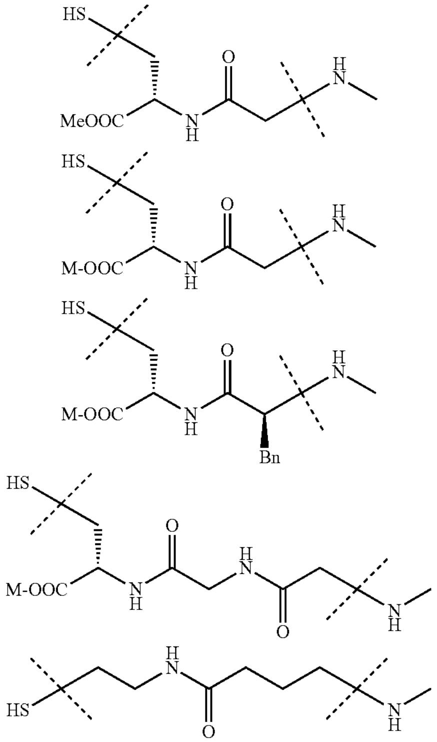

(in which M is a hydrogen atom or Na).

[5-1b] In formula (II-P) of the Embodiment [5], $-L^2-$ is preferably a linker selected from the group consisting of the following partial structural formulae [excluding the parts outside broken lines at both ends of each formula]:

[C60]

(L2-3)

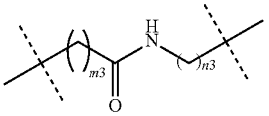

(L2-4)

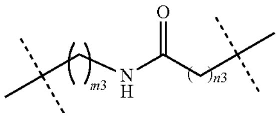

-continued (L2-5)

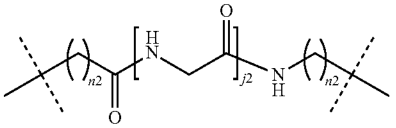

(L2-6)

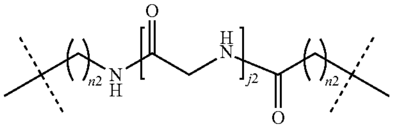

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formula (L2-3), formula (L2-4), formula (L2-5) and formula (L2-6) are both substituted with $C_{1-6}$alkyl groups, the alkyl groups may bind together to form a $C_{3-8}$ cycloalkyl ring;

a —NH— group in formula (L2-3), formula (L2-4), formula (L2-5) or formula (L2-6) may form a non-aromatic heterocyclic ring with a substituent binding to an adjacent carbon atom; and n2 is an integer from 1 to 18;

m3 is an integer from 1 to 10;

n3 is an integer from 1 to 10; and j2 is an integer from 0 to 9);

More preferably -$L^2$- is a linker selected from the group consisting of the following partial structural formulae [excluding the parts outside broken lines at both ends of each formula]:

[C61]

(L2-3)

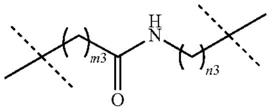

(L2-4)

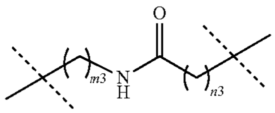

(L2-5)

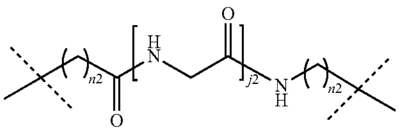

-continued (L2-6)

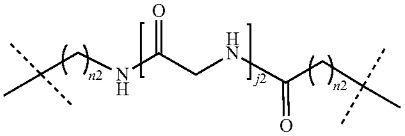

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the —$NR^aR^b$ group, ($R^aR^b$N)—$C_{1-6}$ alkyl group or ($R^aR^b$N)C(═O)—$C_{1-6}$alkyl group is independently a group selected from a hydrogen atom, a $C_{1-6}$alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

a —NH— group in formula (L2-3), formula (L2-4), formula (L2-5) or formula (L2-6) may form a non-aromatic heterocyclic ring with a substituent binding to an adjacent carbon atom; and n2 is an integer from 1 to 9;

m3 is an integer from 1 to 6;

n3 is an integer from 1 to 6; and j2 is an integer from 0 to 6);

Still more preferably -$L^2$- is a linker selected from the group consisting of the following partial structural formulae [excluding the parts outside broken lines at both ends of each formula]:

[C62]

(L-3-1)

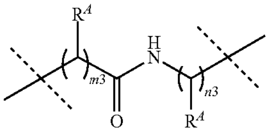

(L-4-1)

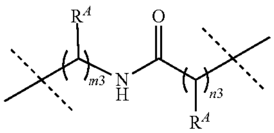

(L-5-1)

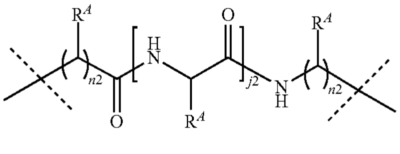

(L-6-1)

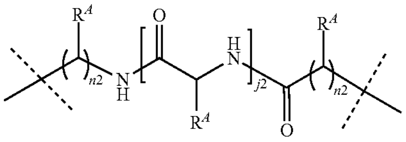

(in which each $R^A$ group in formula (L2-3-1), formula (L2-4-1), formula (L2-5-1) and formula (L2-6-1) independently represents a group selected from a hydrogen atom, a halogen atom, a hydroxyl group, a $C_{1-6}$ alkyl group, a hydroxy $C_{1-6}$ alkyl group, a —COOH group, a —COOM group (in which M is Li, Na, K or ½ Ca), a —COO ($C_{1-6}$ alkyl) group or a $C_{7-16}$ aralkyl group;

a —NH— group in formula (L2-3-1), formula (L2-4-1), formula (L2-5-1) and formula (L2-6-1) may form a non-aromatic heterocyclic ring with a substituent binding to an adjacent carbon atom; and n2 is an integer from 1 to 5;

m3 is an integer from 1 to 3;

n3 is an integer from 1 to 4; and j2 is an integer from 0 to 3);

Particularly preferably, this is a linker selected from the group consisting of the following:

[C63]

(L@-4-1)

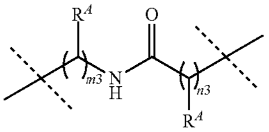

(L2-6-1)

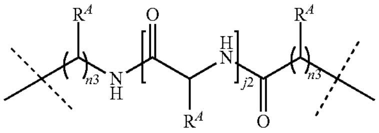

(L26-1-a)

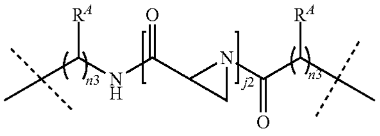

(in which each $R^A$ group in formula (L2-4-1), formula (L2-6-1) and formula (L2-6-1-a) is independently a group selected from a hydrogen atom, a halogen atom, a hydroxyl group, a $C_{1-6}$ alkyl group, a hydroxy $C_{1-6}$ alkyl group, a —COOH group, a —COOM group (in which M is $L^1$, Na, K or ½ Ca), a —COO ($C_{1-6}$ alkyl) group or a $C_{7-16}$ aralkyl group; and n2 is an integer from 1 to 5;

m3 is an integer from 1 to 3;

n3 is an integer from 1 to 4;

j2 is an integer from 0 to 3; and k is an integer from 1 to 4);

Even more preferably, $-L^2-$ is a linker selected from the group consisting of the following partial structural formulae [excluding the parts outside broken lines at both ends of each formula]:

[C64]

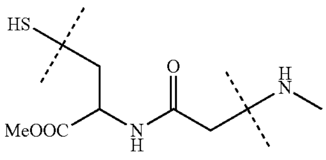

-continued

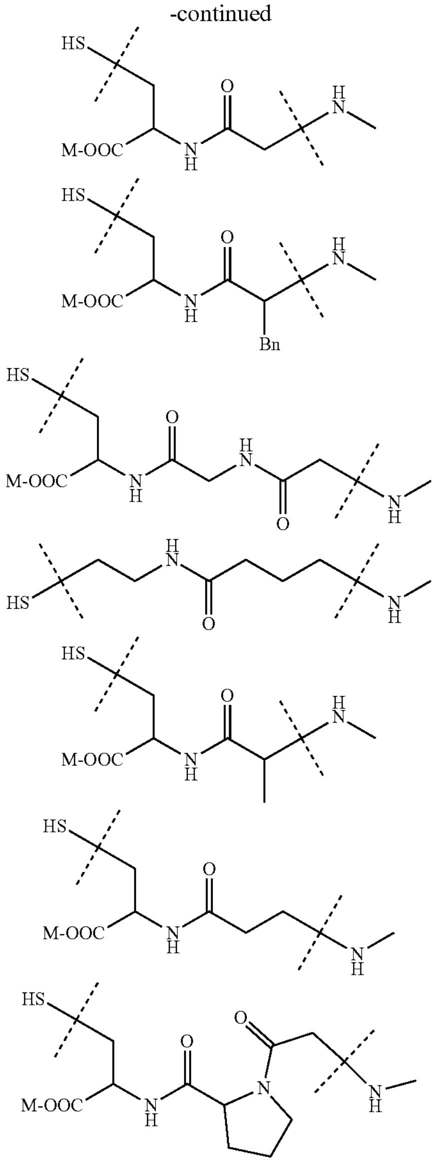

(in which M is a hydrogen atom or Na);

Most preferably, $-L^2-$ is a linker selected from the group consisting of the following partial structural formulae [excluding the parts outside broken lines at both ends of each formula]:

[C65]

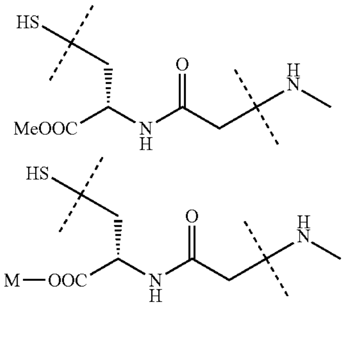

-continued

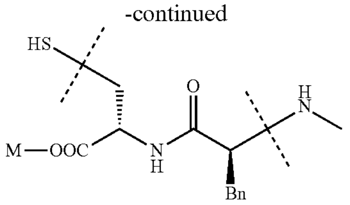

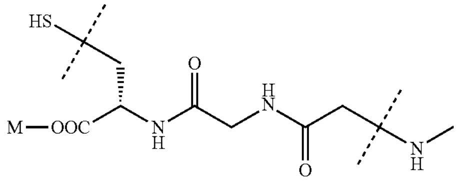

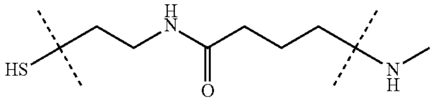

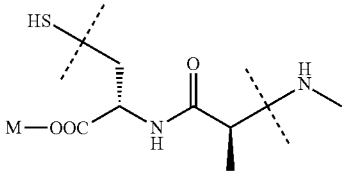

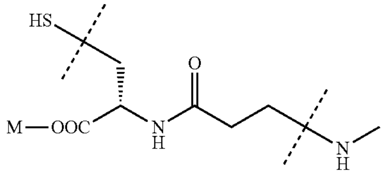

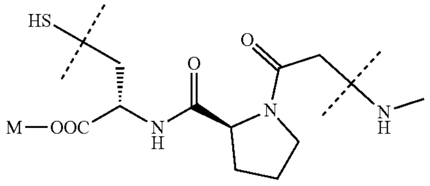

(in which M is a hydrogen atom or Na).

[5-2] In formula (II-P) of the Embodiment [5], $P^1$ is preferably a hydrogen atom, an acetyl group or a benzoyl group.

[5-2a] In formula (II-P) of the Embodiment [5], $P^1$ is preferably a hydrogen atom, an acetyl group or a benzoyl group, and more preferably a hydrogen atom or benzoyl group.

[6-1] Embodiment 6-1 is as follows. The alginic acid derivative represented for formula (II) according to the Embodiment [1], wherein the introduction rate of a reactive group represented by formula (BR-2) below.

[C66]

(BR-2)

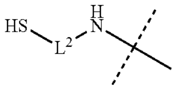

(in formula BR-2), $-L^2-$ is defined as in the Embodiment [1] or [5]]) is from 1% to 30%.

[6-2] Embodiment 6-2 is as follows: the alginic acid derivative represented by formula (II-P) according to the Embodiment [5], wherein the introduction rate of a reactive group represented by formula (BR-2-P) below:

[C67]

(BR-2-P)

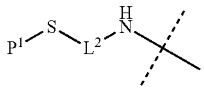

(in formula (BR-2-P), $P^1$ and $-L^2-$ are defined as in the Embodiment [1] or [5]) is from 1% to 30%.

[7-1] Embodiment 7-1 is as follows. The alginic acid derivative represented by formula (II) according to the Embodiment [1], wherein the weight-average molecular weight of the alginic acid derivative as measured by gel filtration chromatography is from 100,000 Da to 3,000,000 Da.

[7-2] Embodiment 7-2 is as follows. The alginic acid derivative represented by formula (II-P) according to the Embodiment [5], wherein the weight-average molecular weight of the alginic acid derivative as measured by gel filtration chromatography is from 100,000 Da to 3,000,000 Da.

[8] Embodiment 8 is as follows. The crosslinked alginic acid according to [1] above, wherein the chemical crosslink in the crosslinked alginic acid of the Embodiment [1] is the structure of the following formula (LK-1):

[C68]

(LK-1)

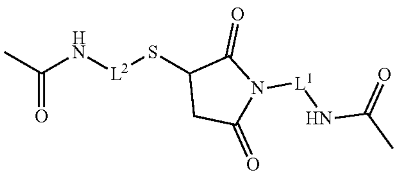

[in formula (LK-1), the —CONH— and —NHCO— at either end represents amide bonds via any carboxyl group of alginic acid; and $-L^1-$ and $-L^2-$ are defined as in the Embodiment [1]].

[8-1] Embodiment 8-1 is as follows. The preferred, more preferred, still more preferred, particularly preferred and most preferred linkers $-L^1-$ in the Embodiment [8] are defined as in the Embodiment [2-1].

[8-2] Embodiment 8-2 is as follows. The preferred, more preferred, still more preferred, particularly preferred and most preferred linkers $-L^2-$ in the Embodiment [8] are defined as in the Embodiment [5-1].

[8-3] Embodiment 8-3 is as follows. The preferred, more preferred, still more preferred, particularly preferred and most preferred linkers $-L^2-$ in the Embodiment [8] are defined as in the Embodiment [5-1a].

[8-4] Embodiment 8-4 is as follows. The preferred, more preferred, still more preferred, particularly preferred, even more preferred and most preferred linkers $-L^2-$ in the Embodiment [8] are defined as in the Embodiment [5-1b].

[8a] Embodiment 8a is as follows. A crosslinked alginic acid represented by the following formula (CAL-1):

[C69]

(CAL-1)

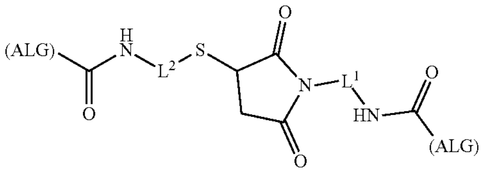

[in formula (CAL-1), the —CONH— and —NHCO— at either end represents amide bonds via any carboxyl group of alginic acid; (ALG), -$L^1$- and -$L^2$- are defined as in the Embodiment [1]; and the two (ALG)s in formula (CAL-1) are alginates derived from the alginic acid derivative of the formula (I) and the alginic acid derivative of the formula (II)].

[8a-1] Embodiment 8a-1 is as follows. A crosslinked alginic acid represented by the following formula (CAL-1), obtained by the crosslinking reaction described in the Embodiment [1]:

[C70]

(CAL-1)

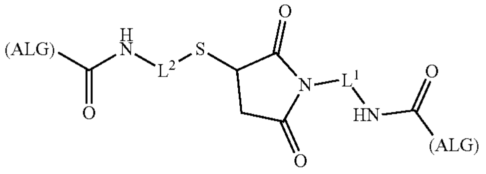

[in formula (CAL-1), the —CONH— and —NHCO— at either end represents amide bonds via any carboxyl group of alginic acid; (ALG), -$L^1$- and -$L^2$- are defined as in the Embodiment [1]; and the two (ALG)s in formula (CAL-1) are alginates derived from the alginic acid derivative of the formula (I) and the alginic acid derivative of the formula (II)].

[8a-2] Embodiment 8a-2 is as follows. The preferred, more preferred, still more preferred, particularly preferred and most preferred linkers -$L^1$- in the Embodiment [8a] or [8a-1] are defined as in the Embodiment [2-1].

[8a-3] Embodiment 8a-3 is as follows. The preferred, more preferred, still more preferred, particularly preferred and most preferred linkers -$L^2$- in the Embodiment [8a] or [8a-1] are defined as in the Embodiment [5-1].

[8a-4] Embodiment 8a-4 is as follows. The preferred, more preferred, still more preferred, particularly preferred and most preferred linkers -$L^2$- in the Embodiment [8a] or [8a-1] are defined as in the Embodiment [5-1a].

[8a-5] Embodiment 8a-5 is as follows. The preferred, more preferred, still more preferred, particularly preferred, even more preferred and most preferred linkers -$L^2$- in the Embodiment [8a] or [8a-1] are defined as in the Embodiment [5-1b].

[9] Embodiment 9 is as follows. A method for manufacturing the crosslinked alginic acid according to the Embodiment [1], in which a solution of the alginic acid derivative represented by formula (I) is subjected to a crosslinking reaction in a solution of the alginic acid derivative represented by formula (II).

[10] Embodiment 10 is as follows. A method for manufacturing the crosslinked alginic acid according to the Embodiment [1], in which a solution of the alginic acid derivative represented by formula (II) is subjected to a crosslinking reaction in a solution of the alginic acid derivative represented by formula (I).

[11] Embodiment 11 is as follows. A method for manufacturing the crosslinked alginic acid according to [1] above, wherein the chemical crosslink formed by performing a Michael addition reaction using the alginic acid derivative represented by formula (I) and the alginic acid derivative represented by formula (II) is the structure of formula (LK-1) below:

[C71]

(LK-1)

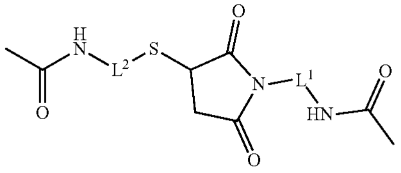

[in formula (LK-1), the —CONH— and —NHCO— at either end represents amide bonds via any carboxyl group of alginic acid; and -$L^1$- and -$L^2$- are defined as in the Embodiment [1]].

[11-1] Embodiment 11-1 is as follows. The preferred, more preferred, still more preferred, particularly preferred and most preferred linkers -$L^1$- in the Embodiment [11] are as defined in the Embodiment [2-1].

[11-2] Embodiment 11-2 is as follows. The preferred, more preferred, still more preferred, particularly preferred and most preferred linkers -$L^2$- in the Embodiment [11] are as defined in the Embodiment [5-1].

[11-3] Embodiment 11-3 is as follows. The preferred, more preferred, still more preferred, particularly preferred and most preferred linkers -$L^2$- in the Embodiment [11] are defined as in the Embodiment [5-1a].

[11-4] Embodiment 11-4 is as follows. The preferred, more preferred, still more preferred, particularly preferred, even more preferred and most preferred linkers -$L^2$- in the Embodiment [11] are defined as in the Embodiment [5-1b].

[12] Embodiment 12 is as follows. A crosslinked alginic acid structure comprising as crosslinks both an ionic crosslink partially formed by a divalent metal ion and a chemical crosslink formed by a Michael addition reaction, obtained by dripping a solution of the alginic acid derivative represented by formula (I) into a solution containing a divalent metal ion to obtain a gel that is then subjected to a crosslinking reaction in a solution of the alginic acid derivative represented by formula (II).

[13] Embodiment 13 is as follows. A crosslinked alginic acid structure comprising as crosslinks both an ionic crosslink partially formed by a divalent metal ion and a chemical crosslink formed by a Michael addition reaction, obtained by dripping a solution of the alginic acid derivative represented by formula (II) into a solution containing a divalent metal ion to obtain a gel that is then subjected to a crosslinking reaction in a solution of the alginic acid derivative represented by formula (I).

[14] Embodiment 14 is as follows. A crosslinked alginic acid structure comprising as crosslinks both an ionic crosslink partially formed by a divalent metal ion and a chemical crosslink formed by a Michael addition reaction, obtained by dripping a solution of a composition comprising the alginic acid derivative represented by formula (I) and the alginic acid derivative represented by formula (II) into a solution containing a divalent metal ion.

[15] Embodiment 15 is as follows. The crosslinked alginic acid structure according to any one of [12] to [14] above, wherein the chemical crosslink formed by performing a Michael addition reaction using the alginic acid derivative represented by formula (I) and the alginic acid derivative represented by formula (II) is the structure of the following formula (LK-1):

[C72]

(LK-1)

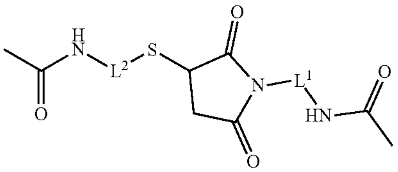

[in formula (LK-1), the —CONH— and —NHCO— at either end represents amide bonds via any carboxyl group of alginic acid; and $-L^1-$ and $-L^2-$ are defined as in the Embodiment [1]].

[15-1] Embodiment 15-1 is as follows. The preferred, more preferred, still more preferred, particularly preferred and most preferred linkers $-L^1-$ in the Embodiment [15] are defined as in the Embodiment [2-1].

[15-2] Embodiment 15-2 is as follows. The preferred, more preferred, still more preferred, particularly preferred and most preferred linkers $-L^2-$ in the Embodiment [15] are defined as in the Embodiment [5-1].

[15-3] Embodiment 15-3 is as follows. The preferred, more preferred, still more preferred, particularly preferred and most preferred linkers $-L^2-$ in the Embodiment [15] are defined as in the Embodiment [5-1a].

[15-4] Embodiment 15-4 is as follows. The preferred, more preferred, still more preferred, particularly preferred, even more preferred and most preferred linkers $-L^2-$ in the Embodiment [15] are defined as in the Embodiment [5-1b].

[16] Embodiment 16 is as follows. The crosslinked alginic acid structure according to any one of the Embodiments [12] to [15], which is a fibrous structure, a fiber, beads, a gel or a substantially spherical gel.

[17] Embodiment 17 is as follows. A medical material comprising a crosslinked alginic acid structure according to any one of the Embodiments [12] to [16].

[18] Embodiment 18 is as follows. The medical material according to the Embodiment [17], which is a fibrous structure, a fiber, beads, a gel or a substantially spherical gel.

[19] Embodiment 19 is as follows. A composition comprising the alginic acid derivative represented by formula (I) and the alginic acid derivative represented by formula (II).

[19-1] Embodiment 19-1 is as follows. A composition comprising the alginic acid derivative represented by formula (I) and the alginic acid derivative represented by formula (II-P).

[19-2] Embodiment 19-2 is as follows. A composition comprising an alginic acid derivative selected from any one of the alginic acid derivative represented by formula (I) and the alginic acid derivative represented by formula (II) or the alginic acid derivative represented by formula (II-P).

[20] Embodiment 20 is as follows. A method for manufacturing a crosslinked alginic acid structure, wherein a solution of a composition comprising the alginic acid derivative represented by formula (I) and the alginic acid derivative represented by formula (II) is dripped into a solution containing a divalent metal ion.

[21] Embodiment 21 is as follows. A method for manufacturing a crosslinked alginic acid structure, wherein a crosslinked alginic acid structure comprising as crosslinks both an ionic crosslink partially formed by a divalent metal ion and a chemical crosslink formed by a Michael addition reaction is obtained by dripping a solution of the alginic acid derivative represented by formula (I) into a solution containing a divalent metal ion to obtain a gel that is then subjected to a crosslinking reaction in a solution of the alginic acid derivative represented by formula (II).

[22] Embodiment 22 is as follows. A method for manufacturing a crosslinked alginic acid structure, wherein a crosslinked alginic acid structure comprising as crosslinks both an ionic crosslink partially formed by a divalent metal ion and a chemical crosslink formed by a Michael addition reaction is obtained by dripping a solution of the alginic acid derivative represented by formula (II) into a solution containing a divalent metal ion to obtain a gel that is then subjected to a crosslinking reaction in a solution of the alginic acid derivative represented by formula (I).

[23] Embodiment 23 is as follows. The method for manufacturing a crosslinked alginic acid structure according to any one of the Embodiments [20] to [22], wherein the chemical crosslink formed by performing a Michael addition reaction using the alginic acid derivative represented by formula (I) and the alginic acid derivative represented by formula (II) is the structure of the following formula (LK-1):

[C73]

(LK-1)

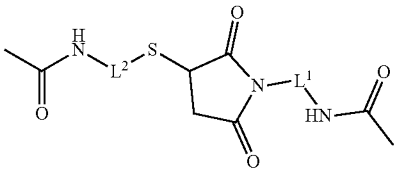

[in formula (LK-1), the —CONH— and —NHCO— at either end represents amide bonds via any carboxyl group of alginic acid; and $-L^1-$ and $-L^2-$ are defined as in the Embodiment [1]].

[23-1] Embodiment 23-1 is as follows. The preferred, more preferred, still more preferred, particularly preferred and most preferred linkers $-L^1-$ in the Embodiment [23] are defined as in the Embodiment [2-1].

[23-2] Embodiment 23-2 is as follows. The preferred, more preferred, still more preferred, particularly preferred and most preferred linkers $-L^2-$ in the Embodiment [23] are defined as in the Embodiment [5-1].

[23-3] Embodiment 23-3 is as follows. The preferred, more preferred, still more preferred, particularly preferred and most preferred linkers $-L^2-$ in the Embodiment [23] are defined as in the Embodiment [5-1a].

[23-4] Embodiment 23-4 is as follows. The preferred, more preferred, still more preferred, particularly preferred, even more preferred and most preferred linkers $-L^2-$ in the Embodiment [23] are defined as in the Embodiment [5-1b].

[24] Embodiment 24 is as follows. A crosslinked alginic acid structure having the ability to hold contents, obtained by subjecting the alginic acid derivative represented by formula (I) and the alginic acid derivative represented by formula (II) to ionic crosslinking by a divalent metal ion and chemical crosslinking by a Michael addition reaction.

[25] Embodiment 25 is as follows. The crosslinked alginic acid according to the Embodiment [1] or [8] or a crosslinked alginic acid structure according to any one of the Embodiments[12] to [16] and [24], having biocompatibility.

[26a] Embodiment 26a is as follows. The alginic acid derivative represented by formula (I) according to the Embodiment [2] or the alginic acid derivative represented by (II-P) according to the Embodiment [5], having biocompatibility.

[27] Embodiment 27 is as follows. An amino compound represented by the following formula (AM-2), or pharmaceutically acceptable salt thereof:

[C72]

(AM-2)

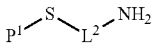

(in formula (AM-2), $P^1$ and $-L^2-$ are defined as in the Embodiment [5]).

[27-1] In the formula (AM-2) of the Embodiment [27], $-L^2-$ is preferably a linker selected from the group consisting of the following partial structural formulae [excluding the parts outside broken lines at both ends of each formula]:

[C72]

(L@-3)

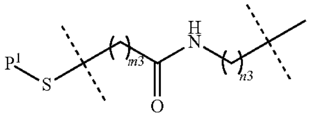

(L2-4)

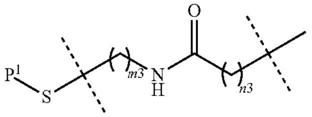

-continued (L2-5)

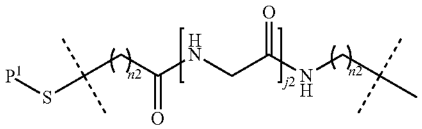

(L2-6)

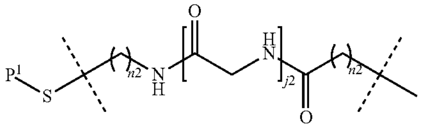

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, a $C_{1-6}$ alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group;

when two hydrogen atoms of the same methylene group (—$CH_2$—) in formula (L2-3), formula (L2-4), formula (L2-5) and formula (L2-6) are both substituted with $C_{1-6}$alkyl groups, the alkyl groups may bind together to form a $C_{3-8}$ cycloalkyl ring;

a —NH— group in formula (L2-3), formula (L2-4), formula (L2-5) and formula (L2-6) may form a non-aromatic heterocyclic ring with a substituent binding to an adjacent carbon atom; and n2 is an integer from 1 to 18;

m3 is an integer from 1 to 10;

n3 is an integer from 1 to 10; and j2 is an integer from 0 to 9);

More preferably $-L^2-$ is a linker selected from the group consisting of the following partial structural formulae [excluding the parts outside broken lines at both ends of each formula]:

[C76]

(L2-3)

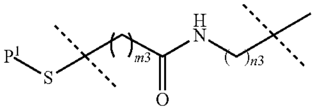

(L2-4)

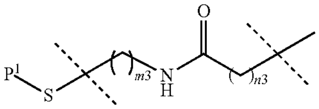

(L2-5)

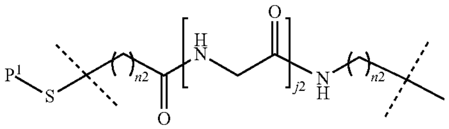

-continued (L2-6)

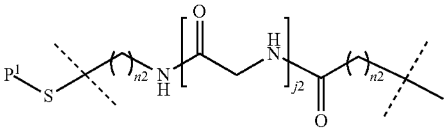

(in which a hydrogen atom of a methylene group (—$CH_2$—) in formula (L2-3), formula (L2-4), formula (L2-5) and formula (L2-6) may be substituted with multiple (such as 1 to 10, or 1 to 5) groups selected from an oxo group (═O), a halogen atom, a hydroxyl group, a $C_{1-6}$ alkyl group, a hydroxy $C_{1-6}$alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —$NR^aR^b$ group, ($R^aR^b$N)—$C_{1-6}$ alkyl group or ($R^aR^b$N)C(═O)—$C_{1-6}$ alkyl group (in which each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, a $C_{1-6}$ alkyl group, a $C_{2-7}$ alkanoyl group or a $C_{1-6}$ alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group; a —NH— group in formula (L2-3), formula (L2-4), formula (L2-5) and formula (L2-6) may form a non-aromatic heterocyclic ring with a substituent binding to an adjacent carbon atom; and n2 is an integer from 1 to 9;

m3 is an integer from 1 to 6;

n3 is an integer from 1 to 6; and j2 is an integer from 0 to 6);

Still more preferably -$L^2$- is a linker selected from the group consisting of the following partial structural formulae [excluding the parts outside broken lines at both ends of each formula]:

[C77]

(L2-3-1)

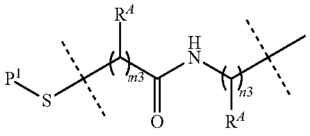

(L2-4-1)

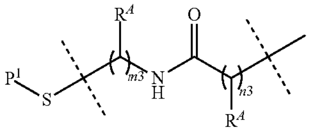

(L2-5-1)

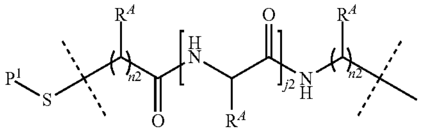

(L2-6-1)

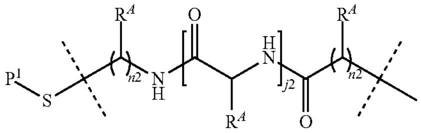

(in which each $R^A$ group in formula (L2-3-1), formula (L2-4-1), formula (L2-5-1) and formula (L2-6-1) independently represents a group selected from a hydrogen atom, a halogen atom, a hydroxyl group, a $C_{1-6}$ alkyl group, a hydroxy $C_{1-6}$ alkyl group, a —COOH group, a —COOM group (in which M is Li, Na, K or ½ Ca) or a $C_{7-16}$ aralkyl group;

a —NH— group in formula (L2-3-1), formula (L2-4-1), formula (L2-5-1) and formula (L2-6-1) may form a non-aromatic heterocyclic ring with a substituent binding to an adjacent carbon atom; and n2 is an integer from 1 to 5;

m3 is an integer from 1 to 3;

n3 is an integer from 1 to 4; and j2 is an integer from 0 to 3);

Particularly preferably, this is a linker selected from the group consisting of the following:

[C77]

(L2-4-1)

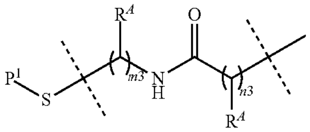

(L2-6-1)

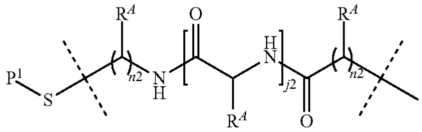

(L2-6-1-a)

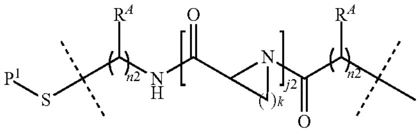

(in which each $R^A$ group in formula (L2-4-1), formula (L2-6-1) and formula (L2-6-1-a) independently represents a group selected from a hydrogen atom, a halogen atom, a hydroxyl group, a $C_{1-6}$ alkyl group, a hydroxy $C_{1-6}$alkyl group, a —COOH group, a —COOM group (in which M is Li, Na, K or ½ Ca) or a $C_{7-16}$ aralkyl group; and n2 is an integer from 1 to 5;

m3 is an integer from 1 to 3;

n3 is an integer from 1 to 4;

j2 is an integer from 0 to 3; and k is an integer from 1 to 4).

[27-2] In the formula (AM-2) of the Embodiment 27, $P^1$ is preferably an acetyl group or benzoyl group, and more preferably a benzoyl group.

[28] Embodiment 28 is as follows. An amino compound represented by the following formula (AM-2), or pharmaceutically acceptable salt thereof:

[C79]

(AM-2)

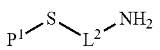

[in formula (AM-2), -$L^2$- is a linker selected from the group consisting of the following partial structural formulae [excluding the parts outside broken lines at both ends of each formula]:

[C80]

(L2-a)

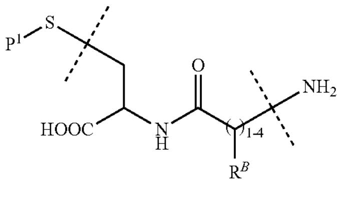

(L2-c)

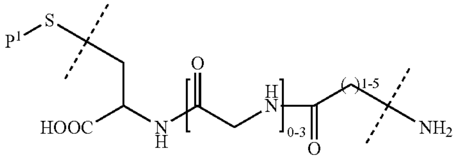

(L2-b)

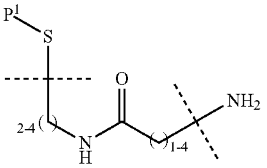

(L2-d)

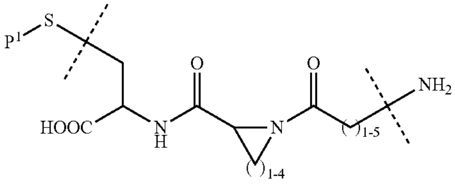

(in formula (L2-a), $R^B$ is a group selected from a hydrogen atom, a halogen atom, a hydroxyl group, a $C_{1-6}$ alkyl group, a hydroxy $C_{1-6}$alkyl group or a $C_{7-16}$ aralkyl group), and $P^1$ is a benzoyl group or acetyl group (Provided that when $-L^2-$ is formula (L2-b), $P^1$ is a benzoyl group)].

[28-1] In formula (AM-2) of the embodiment [28], $L^2$- is preferably a linker selected from the group consisting of the following partial structural formulae [excluding the parts outside broken lines at both ends of each formula]:

[C81]

(L2-a)

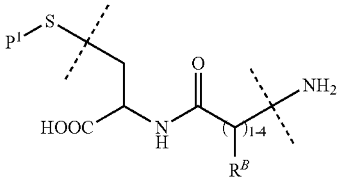

(L2-b)

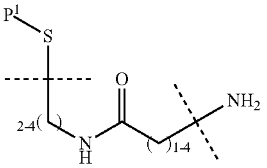

-continued (L2-c)

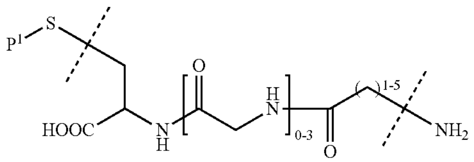

(L2-d)

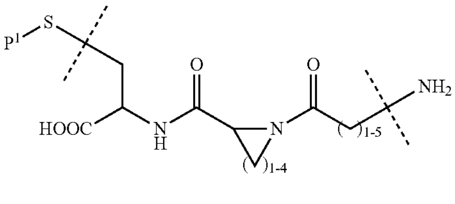

(in formula (L2-a), $R^B$ is a group selected from a hydrogen atom, a $C_{1-6}$ alkyl group or a $C_{7-16}$ aralkyl group);

or more preferably a linker selected from the group consisting of the following partial structural formulae [excluding the parts outside broken lines at both ends of each formula]:

[C82]

(L2-a-1)

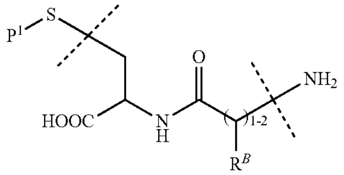

(L2-c-1)

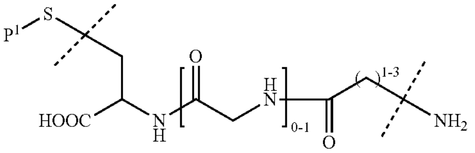

(L2-b-1)

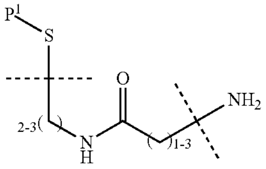

(L2-d-1)

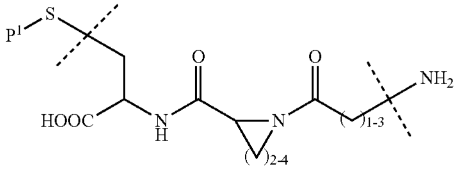

(in formula (L2-a-1), $R^B$ is a group selected from a hydrogen atom, a $C_{1-6}$ alkyl group or a $C_7$-16 aralkyl group);

or still more preferably a linker selected from the group consisting of the following partial structural formulae [excluding the parts outside broken lines at both ends of each formula]:

[C83]

(L2-a-1)

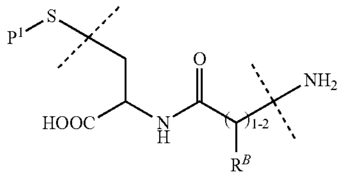

(L2-c-2)

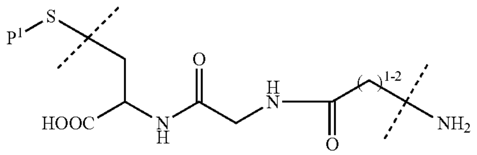

(L2-b-2)

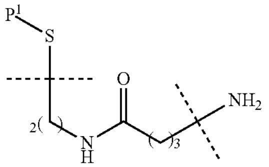

(L2-d-2)

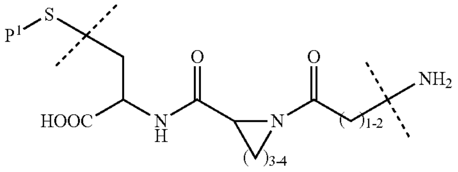

(in formula (L2-a-1), $R^B$ is a group selected from a hydrogen atom, a $C_{1-6}$alkyl group or a $C_{7-16}$ aralkyl group);

or particularly preferably a linker selected from the group consisting of the following partial structural formulae [excluding the parts outside broken lines at both ends of each formula]:

[C84]

(L2-a-2)

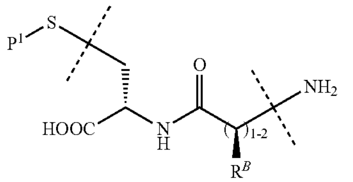

(L2-b-2)

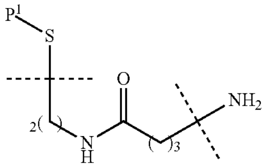

(L2-c-3)

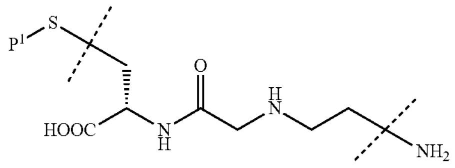

-continued (L2-d-3)

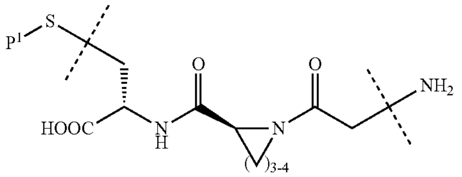

(in formula (L2-a-2), $R^B$ is a group selected from a hydrogen atom, a $C_{1-6}$ alkyl group or a $C_{7-16}$ aralkyl group);

or especially preferably a linker selected from the group consisting of the following partial structural formulae [excluding the parts outside broken lines at both ends of each formula]:

[C85]

(L2-a-2-1)

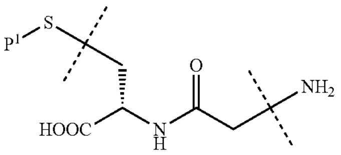

(L2-a-2-2)

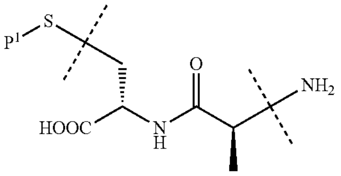

(L2-a-2-3)

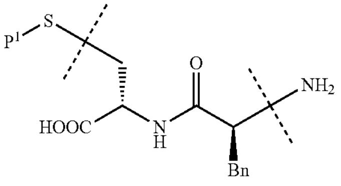

(L2-a-2-4)

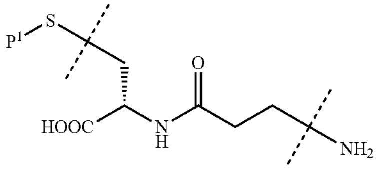

(L2-b-2)

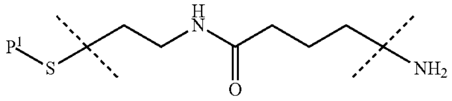

(L2-c-3-1)

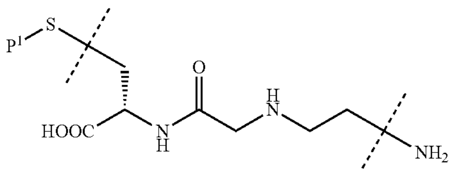

-continued (L2-d-3-1)

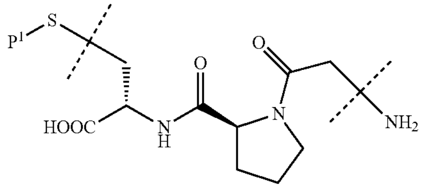

[28-2] In formula (AM-2) of the Embodiment [28], $P^1$ is preferably a benzoyl group.

[29] Embodiment 29 is as follows. An amino compound selected from the following formulae, or pharmaceutically acceptable salt thereof:

[C86]

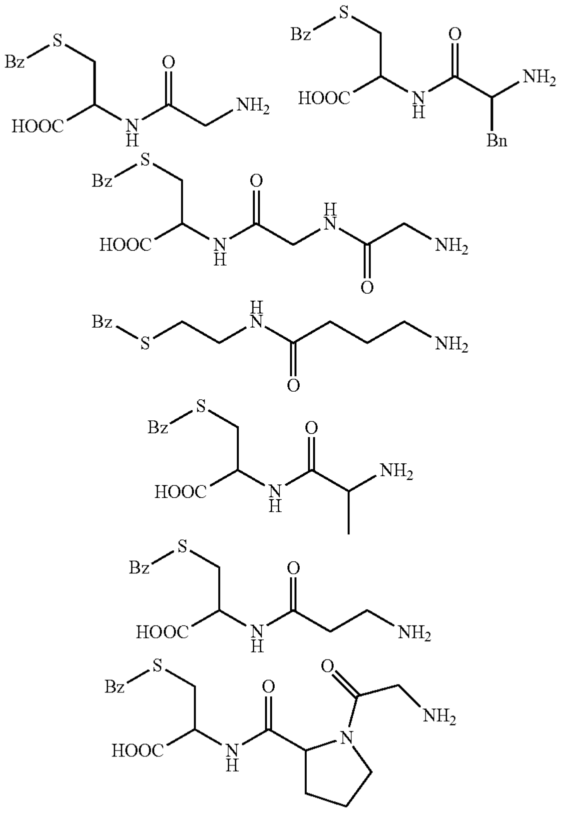

(in each formula, Bz is a benzoyl group).

[29-1] In the amino compound or pharmaceutically acceptable salt thereof of the Embodiment [29], the amino compound is preferably an amino compound selected from the following formulae:

[C87]

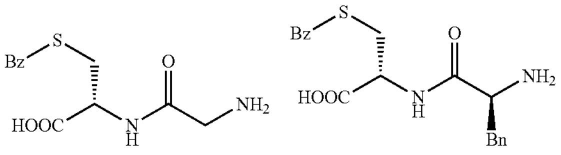

-continued

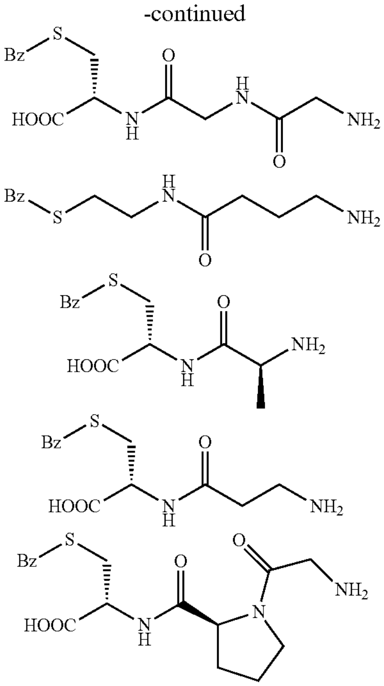

(in each formula, Bz is a benzoyl group).

1. Alginic Acid

In the present Description, references to alginic acid refer to at least one kind of alginic acid selected from the group consisting of alginic acid, alginic acid esters and salts thereof (such as sodium alginate). The alginic acid used may be either naturally derived or synthetic, but a naturally derived alginic acid is preferred. A preferred alginic acid is a bioabsorbable polysaccharide that is extracted from natural brown algae such as *Lessonia, Macrocystis, Laminaria, Ascophyllum, Durvillea, Ecklonia cava, Eisenia bicyclis* and *Saccharina japonica*, and is a polymer obtained by linear polymerization of two kinds of uronic acid, D-mannuronic acid (M) and L-guluronic acid (G). More specifically, this is a block copolymer including a homopolymer fraction of D-mannuronic acid (MM fraction), a homopolymer fraction of L-guluronic acid (GG fraction), and a fraction of randomly arranged D-mannuronic acid and L-guluronic acid (M/G fraction) in arbitrary combination. In this Description, the molecular weights of alginic acids, alginic acid derivatives, crosslinked alginic acids and crosslinked alginates may be represented in units of Da (daltons).

Alginic acid as used herein may be designated as (ALG)-COOH, wherein (ALG) is alginic acid and —COOH is any one carboxyl group of alginic acid.

In some embodiments, the alginic acid is sodium alginate. Commercial sodium alginate may be used as the sodium alginate. For example, an alginic acid having the physical property values shown in Table 1 may be used. In the Examples 10 to 12 below, the sodium alginate of A-2 in Table 1 (sold by MOCHIDA PHARMACEUTICAL CO., LTD.) is used as the sodium alginate. Table 1 shows the viscosity, weight-average molecular weight and M/G ratio of a 1 w/w % aqueous solution of each sodium alginate. In the Examples 1 to 9 below, ALG-2 (sold by KIMICA Corporation) is used as the sodium alginate and has the weight-average molecular weight described under "Molecular weight measurement" below.

TABLE 1

| Sodium alginate | 1 w/w % viscosity (mPa · s) | Weight-average molecular weight GPC | Weight-average molecular weight GPC-MALS | M/G ratio |
|---|---|---|---|---|
| A-1 | 10 to 40 | 300,000 to 700,000 | 60,000 to 130,000 | 0.5 to 1.8 |
| A-2 | 50 to 150 | 700,000 to 1,400,000 | 130,000 to 200,000 | |
| A-3 | 300 to 600 | 1,400,000 to 2,000,000 | 200,000 to 400,000 | |
| B-1 | 10 to 40 | 150,000 to 800,000 | 60,000 to 130,000 | 0.1 to 0.5 |
| B-2 | 70 to 150 | 800,000 to 1,500,000 | 130,000 to 200,000 | |
| B-3 | 400 to 600 | 1,500,000 to 2,500,000 | 200,000 to 350,000 | |

The physical property values for the sodium alginates A-1, A-2, A-3, B-1, B-2, and B-3 were measured by the methods described below. The measurement methods are not limited to these, and the physical property values may differ from those given above depending on the measurement method.

[Measuring Viscosity of Sodium Alginate]

This was measured by the rotational viscometer method (using a cone plate rotational viscometer) according to the viscosity measurement methods of the Japanese Pharmacopoeia (16th Edition). The specific measurement conditions are as follows. The sample solution was prepared using MilliQ water. A cone plate rotational viscometer (RS600 RheoStress rheometer (Thermo Haake GmbH) sensor: 35/1) was used as the measurement equipment. The rotation was set at 1 rpm when measuring a 1 w/w % sodium alginate solution. For the read time, the solution was measured for 2 minutes and the average value from 1 to 2 minutes after starting was used. The average of three measured values was used as the measurement value. The measurement temperature was 20° C.

[Measuring Weight-Average Molecular Weight of Sodium Alginate]

This was measured by two measurement methods, (1) gel permeation chromatography (GPC) and (2) GPC-MALS. The measurement conditions are as follows

[Pre-Treatment Methods]

An eluent was added to dissolve the sample, which was then filtered through an 0.45-micron membrane filter to obtain a measurement solution.

(1) Gel Permeation Chromatography (GPC) Measurement

[Measurement Conditions (Relative Molecular Weight Distribution Measurement)]

Columns: TSKgel GMPW-XL×2+G2500PW-XL (7.8 mm I.D.×300 mm×3 columns)

Eluent: 200 mM sodium nitrate aqueous solution

Flow rate: 1.0 mL/min

Concentration: 0.05%

Detector: RI detector

Column temperature: 40° C.

Injection volume: 200 μL

Molecular weight standards: Standard pullulan, glucose (2) GPC-MALS Measurement

[Refractive Index Increment (dn/dc) Measurement (Measurement Conditions)]

Differential refractometer: Optilab T-rEX

Measurement wavelength: 658 nm

Measurement temperature: 40° C.

Solvent: 200 mM sodium nitrate aqueous solution

Sample concentration: 0.5 to 2.5 mg/mL (5 concentrations)

[Measurement Conditions (Absolute Molecular Weight Distribution Measurement)]

Columns: TSKgel GMPW-XL×2+G2500PW-XL (7.8 mm I.D.×300 mm×3 columns)

Eluent: 200 mM sodium nitrate aqueous solution

Flow rate: 1.0 mL/min

Concentration: 0.05%

Detectors: RI detector, light scattering detector (MALS)

Column temperature: 40° C.

Injection volume: 200 μL

The molecular weights of alginic acid, alginic acid derivatives, crosslinked alginic acids and crosslinked alginic acids as used herein may be given in units of Da (Daltons).

The constituent ratio of D-mannuronic acid and L-guluronic acid (M/G ratio) in an alginic acid mainly differs principally according to the seaweed or the like from which it is derived, and may also be affected by the organism's habitat and season, with a wide range from high-G (M/G ratio about 0.2) to high-M alginic acid (M/G ratio about 5). The gelling ability of the alginic acid and the properties of the resulting gel are affected by the M/G ratio, and in general, the gel strength is known to be greater the higher the G proportion. The M/G ratio also affects the hardness, fragility, water absorption, flexibility and the like of the gel. The M/G ratio of the alginic acid and/or salt thereof used is normally from 0.2 to 4.0, or preferably from 0.4 to 3.0, or still more preferably from 0.5 to 3.0.

When numerical ranges are indicated with "from" and "to" herein, the numbers after "from" and "to" are the minimum and maximum values of the range, respectively.

When used herein, an "alginic acid ester" or "alginic acid salt" is not particularly limited, but because it will react with a crosslinking agent, it must have no functional groups that would impede the crosslinking reaction. Desirable examples of alginic acid esters include propylene glycol alginate and the like.

Examples of alginic acid salts herein include monovalent salts and divalent salts of alginic acid. Preferred examples of monovalent alginic acid salts include sodium alginate, potassium alginate and ammonium alginate, of which sodium alginate and potassium alginate are more preferred, and sodium alginate is especially preferred. Preferred examples of divalent alginic acid salts include calcium alginate, magnesium alginate, barium alginate, strontium alginate and the like.

Alginic acid is a high-molecular-weight polysaccharide, and its molecular weight is hard to determine accurately, but generally its weight-average molecular weight is in the range of 1,000 to 10,000,000, or preferably 10,000 to 8,000,000, or more preferably 20,000 to 3,000,000. It is known that in molecular weight measurement of naturally derived high-molecular-weight substances, values may differ depending on the measurement method.

For example, the weight-average molecular weight as measured by gel permeation chromatography (GPC) or gel filtration chromatography (which together are also called size exclusion chromatography) is preferably at least 100,000, or more preferably at least 500,000, and is preferably not more than 5,000,000, or more preferably not more than 3,000,000. The preferred range is 100,000 to 5,000,000, or more preferably 150,000 to 3,000,000.

The absolute weight-average molecular weight can also be measured by the GPC-MALS method. The weight-average molecular weight (absolute molecular weight) as measured by the GPC-MALS method is preferably at least 10,000, or more preferably at least 50,000, or still more preferably at least 60,000, and is preferably not more than 1,000,000, or more preferably not more than 800,000, or still more preferably not more than 700,000, or especially not more than 500,000. The preferred range is 10,000 to 1,000,000, or more preferably 50,000 to 800,000, or still more preferably 60,000 to 700,000, or especially 60,000 to 500,000.

When the molecular weight of a high-molecular-weight polysaccharide is measured by such methods, a measurement error of 10% to 20% is normal. Thus, for example, a value of 400,000 may vary in the range of 320,000 to 480,000, a value of 500,000 may vary in the range of 400,000 to 600,000, and a value of 1,000,000 may vary in the range of 800,000 to 1,200,000.

The molecular weight of the alginic acid can be measured by ordinary methods.

Typical conditions for molecular weight measurement using gel filtration chromatography are described in the examples of this Description below. A Superose 6 Increase 10/300 GL column (GE Health Care Sciences) may be used as the column, a 10 mmol/L phosphoric acid buffer containing 0.15 mol/L NaCl (pH 7.4) may be used as the development solvent for example, and blue dextran, thyroglobulin, ferritin, aldolase, conalbumin, ovalbumin, ribonuclease A, and aprotinin may be used as molecular weight standards.

The viscosity of the alginic acid used herein is not particularly limited, but when measured in a 1 w/w % aqueous solution of the alginic acid, it is preferably 10 mPa s to 1,000 mPa s, or more preferably 50 mPa s to 800 mPa s.

The viscosity of an aqueous solution of the alginic acid can be measured by ordinary methods. For example, it can be measured by rotational viscometry using a coaxial double cylindrical rotational viscometer, single cylindrical rotary viscometer (Brookfield viscometer), conical plate rotational viscometer (cone plate viscometer) or the like. Preferably it is measured following the viscosity measurement methods of the Japanese Pharmacopoeia (16th Edition). More preferably, a cone plate viscometer is used.

When first extracted from brown algae, alginic acids have a high molecular weight and a high viscosity, but the molecular weight and viscosity are reduced by the processes of heat drying, purification and the like. Alginic acids with different molecular weights can be manufactured by methods such as controlling the temperature and other conditions during the manufacturing process, selecting the brown algae used as raw materials, and fractioning the molecular weights in the manufacturing process. An alginic acid having the desired molecular weight can also be obtained by mixing alginic acids from different lots having different molecular weights or viscosities.

Some embodiments of the alginic acid used herein have been subjected to low endotoxin treatment, while others have not been subject to low endotoxin treatment. "Low endotoxin" means that the level of endotoxins is so low that there is no effective risk of inflammation or fever. An alginic acid that has been subjected to low endotoxin treatment is preferred.

Low endotoxin treatment can be performed by known methods or analogous methods. For example, it can be performed by the methods of Kan et al for purifying sodium hyaluronate (see for example Japanese Patent Application Publication No. H 09-324001, etc.), the methods of Yoshida et al for purifying β1,3-glucan (see for example Japanese Patent Application Publication No. H 08-269102), the methods of William et al for purifying biopolymer salts such as alginate and gellan gum (see for example Japanese Translation of PCT Application Publication No. 2002-530440), the methods of James et al for purifying polysaccharides (see for example WO 93/13136, pamphlet), the methods of Lewis et al (see for example U.S. Pat. No. 5,589,591), and the methods of Herman Frank for purifying alginate (see for example Appl. Microbiol. Biotechnol. (1994) 40:638-643, etc.) and the like or analogous methods. Low endotoxin treatment is not limited to these methods, and may also be performed by known methods such as washing, filtration with a filter (endotoxin removal filter, charged filter or the like), ultrafiltration, column purification (using an endotoxin adsorption affinity column, gel filtration column, ion-exchange resin column or the like), adsorption by a hydrophobic substance, resin, activated carbon or the like, organic solvent treatment (organic solvent extraction, deposition/sedimentation with an organic solvent or the like), surfactant treatment (see for example Japanese Patent Application Publication No. 2005-036036) or the like, or by a suitable combination of these methods. Known methods such as centrifugation may also be combined with the steps of such treatment. The treatment is preferably selected appropriately according to the type of alginic acid.

The endotoxin level can be confirmed by known methods, such as limulus reagent (LAL) methods or methods using an Endospecy (registered trademark) ES-24S set (SEIKAGAKU CORPORATION).

There are no particular limitations on the endotoxin treatment method used, but the resulting endotoxin content of the alginic acid is preferably not more than 500 endotoxin units (EU)/g, or more preferably not more than 100 EU/g, or still more preferably not more than 50 EU/g, or especially not more than 30 EU/g when measured with a limulus reagent (LAL). Low endotoxin treated sodium alginate is available as a commercial product such as Sea Matrix (registered trademark) (MOCHIDA PHARMACEUTICAL CO., LTD.) or PRONOVA (trademark) UP LVG (FMC BioPolymer).

2. Alginic Acid Derivatives

Novel alginic acid derivatives are provided in this Description. The alginic acid derivatives in this Description have a reactive group or a reactive group complementary to that reactive group in a Michael addition reaction introduced via an amide bond and a divalent linker into any one or more carboxyl groups of alginic acid.

More specifically, these are an alginic acid derivative represented by the following formula (I):

[C88]

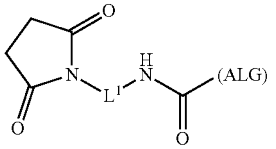

(I)

[in formula (I), (ALG), —CONH— and -$L^1$- are defined as in the Embodiment [1] or the Embodiment [2]], and an alginic acid derivative represented by the following formula (II):

[C89]

(II)

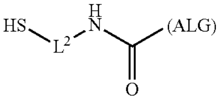

[in formula (II), (ALG), —CONH— and $-L^2-$ are defined as in the Embodiment [1] or the Embodiment [5]]

The reactive group of the alginic acid derivative represented by formula (I) is an acrylic acid residue, while the reactive group of the alginic acid derivative represented by formula (II) (reactive group complementary to the reactive group of the alginic acid derivative represented by formula (I)) is a thiol residue. The acrylic acid residue and the thiol residue are two reactive groups that easily form covalent bonds by a Michael addition reaction.

The acrylic acid residue may be a residue capable of forming an adduct by a Michael addition reaction with a thiol residue, and specific examples include acryloyl, acrylic, maleyl, maleimide and fumal groups, of which an acryloyl or maleimide group is preferred, and a maleimide group is more preferred.

The thiol residue may be a residue capable of forming an adduct by a Michael addition reaction with an acrylic acid residue, and specific examples include benzylthiol, thiophenol and alkylthio groups (for example, residues in which the thiol group is substituted with a $C_{1-6}$ alkyl group, such as methanethiol, ethanethiol and cysteine residues) and the like, of which a benzylthiol or alkylthiol group is preferred, and an alkylthiol group is more preferred.

For the divalent linker ($-L^1-$ or $-L^2-$), any linear group may be used so as to maintain a certain distance between the alginic acid and the reactive group or complementary reactive group, as long as this does not impede the reaction between the reactive group and the reactive group complementary to that reactive group. Examples of divalent linkers include, but are not limited to, linear alkylene groups ($-(CH_2)_n-$, n=1 to 30) (in which a $-CH_2-$ of the alkylene group may be substituted with multiple (such as 1 to 10, or 1 to 5) groups such as —C(═O)—, —CONH—, —O—, —NH—, —S—, or a benzene ring or heterocyclic ring (a 5- or 6-membered aromatic heterocycle or 5- or 6-membered non-aromatic heterocycle such as a pyridine ring, piperidine ring or piperazine ring); and a hydrogen atom of a $-CH_2-$ may be substituted with multiple (such as 1 to 10, or 1 to 5) groups selected from an oxo group (═O), a halogen atom, a hydroxyl group, a $C_{1-6}$ alkyl group, a hydroxy $C_{1-6}$ alkyl group, a thiol $C_{1-6}$alkyl group, a $C_{1-6}$ alkylthio $C_{1-6}$alkyl group, a —COOH group, a —COOM group (in which M is Li, Na, K or ½ Ca), a —COO ($C_{1-6}$ alkyl) group, a $-NR^aR^b$ group, $(R^aR^bN)-C_{1-6}$ alkyl group or $(R^aR^bN)C(=O)-C_{1-6}$ alkyl group (in which each of $R^a$ and $R^b$ in the $-NR^aR^b$ group, $(R^aR^bN)-C_{1-6}$ alkyl group and $(R^aR^bN)C(=O)-C_{1-6}$ alkyl group is independently a group selected from a hydrogen atom, $C_{1-6}$alkyl group, $C_{2-7}$ alkanoyl group or $C_{1-6}$alkylsulfonyl group), a guanidino $C_{1-6}$ alkyl group, a $C_{7-16}$ aralkyl group, a hydroxy $C_{6-10}$ aryl $C_{1-6}$alkyl group or a heteroaryl $C_{1-6}$alkyl group, and when two hydrogen atoms of the same $-CH_2$ are both substituted with $C_{1-6}$alkyl groups, the alkyl groups may bind together to form a $C_{3-8}$ cycloalkyl ring).

Specifically, $-L^1-$ may be one of the divalent linkers described in the Embodiment [1] or [2], and $-L^2$ may be one of the divalent linkers described in the Embodiment [1] or [5].

In this Description, the linker $-L^1-$ in the formula (I) encompasses all optical isomers when there is an asymmetric carbon in the equation in the formulae (L1-1) to (L1-4).

For example, this means that when $-L^1-$ in the formula (I) is the following formula (L1-3-1-a) (excluding the parts outside broken lines at both ends of the formula):

[C90]

(L1-3-1-a)

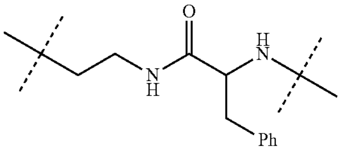

the linkers represented by the following formula (L1-3-1aS) in which the carbon substituted by the benzyl group has an S configuration and the following formula (L1-3-1aR) in which the carbon substituted by the benzyl group has an R configuration (excluding the parts outside broken lines at both ends in both cases) are included:

[C91]

(L1-3-1-a)

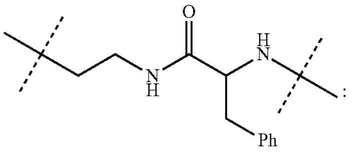

(L1-3-1-aS)

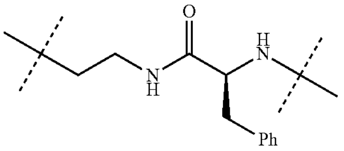

(L1-3-1-aR)

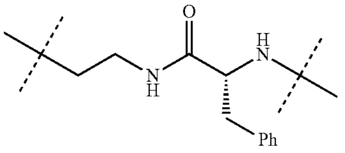

Similarly, this means that the linker $-L^2-$ (formula (L2-1) to formula (L2-6)) in the formula (II) or (II-P) encompasses all optical isomers when there is an asymmetric carbon in the equation.

For example, this means that when the linker $-L^2-$ in the formula (II) or (II-P) is the following formula (L2-6-1-a) (excluding the parts outside broken lines at both ends of the formula):

[C92]

(L2-6-1-a)

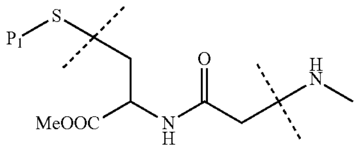

the linkers represented by the following formula (L2-6-1-aS) in which the carbon substituted by the benzyl group has an S configuration and the following formula (L2-6-1-aR) in which the carbon substituted by the benzyl group has an R configuration (excluding the parts outside broken lines at both ends in both cases) are included:

[C93]

(L2-6-1-a)

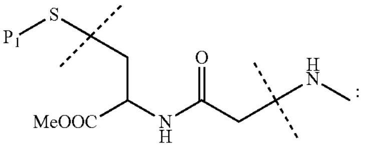

(L2-6-1-aS)

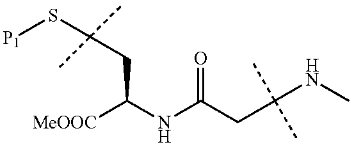

(L2-6-1-aR)

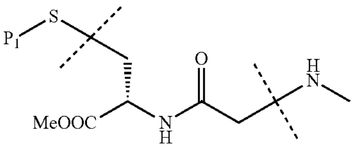

When there is an asymmetric carbon in the linker -$L^1$- in the formula (I) in this Description (when it has optically active forms), the optically active forms can be separated by ordinary optical resolution means (separation methods) from the racemic form in the step of synthesizing an amine derivative (AM-1) corresponding to the formula (I), or else each optically active form can be synthesized by selectively synthesizing one of the optical isomers using asymmetric synthesis in the step of synthesizing an amine derivative (AM-1) corresponding to formula (I). Each of the resulting optically active amine derivatives can then be used to synthesize an (optically active) alginic acid derivative of formula (I) having asymmetric carbon. When there is an asymmetric carbon in the linker -$L^2$- in the formula (II) or (II-P) in this Description, moreover, the optically active forms and (optically active) alginic acid derivatives of formula (II) or (II-P) having asymmetric carbon can synthesized by similar methods in the step of synthesizing an derivative (AM-2) corresponding to formula (II) or formula (II-P).

Such separation methods include such optical separation methods as fractional recrystallization, the diastereomer method and the chiral column method. Each separation method is explained below.

Fractional recrystallization: this is a method in which an optically pure compound is obtained by first ionically bonding an optical resolution agent to the racemic form to obtain crystalline diastereomers, further separating the crystalline diastereomers by fractional recrystallization, and finally removing the optical resolution agent as desired. The optical resolution agent may be for example (+)-mandelic acid, (−)-mandelic acid, (+)-tartaric acid, (−)-tartaric acid), (+)-1-phenethylamine, (−)-1-phenethylamine, cinchonine, (−)-cinchonine, brucine or the like.

Diastereomer method: this is a reaction in which an optically pure optical isomer is obtained by covalently bonding an optical resolution agent to a racemic mixture to obtain a mixture of diastereomers, separating this into optically pure diastereomers by normal separation methods (such as fraction recrystallization, silica gel column chromatography or HPLC), and finally removing the optical resolution agent by a chemical reaction (hydrolysis reaction or the like).

For example, when a compound or intermediate compound in this Description has a hydroxyl group or a (primary or secondary) amino group, ester or amide diastereomers can be obtained from each by a condensation reaction between the compound and an optically active organic acid (for example, α-methoxy-α-(trifluoromethyl)phenylacetic acid and (−)-menthoxyacetic acid, etc.). When a compound in this Description has a carboxy group, on the other hand, amide or ester diastereomers can be obtained from each by a condensation reaction between the compound and an optically active amine or optically active alcohol. The diastereomers obtained from the condensation reaction can then be separated and converted to optically pure optical isomers of the original compound by subjecting each diastereomer to a hydrolysis reaction with an acid or base.

Chiral column method: This is a method of direct optical resolution by subjecting the racemic form or a salt thereof to chromatography with a chiral column (optical isomer separation column).

Using high performance liquid chromatography (HPLC) for example, a mixture of optical isomers can be added to a chiral column (such as the Daicel Corp. Chiral series), and developed with an elution solvent (a single solvent such as water, various buffers (such as phosphate buffer) or an organic solvent (such as ethanol, methanol, isopropanol, acetonitrile, trifluoroacetic acid, diethylamine or the like) or a mixture of these) to separate the optical isomers. In the case of gas chromatography, on the other hand, the optical isomers can be separated using a chiral column such as CP-Chirasil-DeX CB (manufactured by GL Sciences Inc.) or the like. In the case of supercritical fluid chromatography (SFC) for example, a mixture of optical isomers can be added to a chiral column (such as the Daicel Corp. Chiral series), and the optical isomers can then be separated using carbon dioxide and a suitable organic solvent (such as methanol, ethanol, isopropanol, trifluoroacetic acid or diethylamine) as the elution solvent.

Examples of asymmetric synthesis methods for selectively synthesizing one of the optical isomers include (1) asymmetric synthesis reactions for deriving optically active forms by enantioselectively reacting the racemic compound, and (2) methods of diastereo-selective synthesis from optically actively compounds (sugars, amino acids, etc.) present in nature.

The alginic acid derivatives represented by formula (I) and formula (II) that are the novel alginic acid derivatives in this Description can be manufactured by the methods of the following formulae for example (for details, see the general manufacturing methods discussed below).

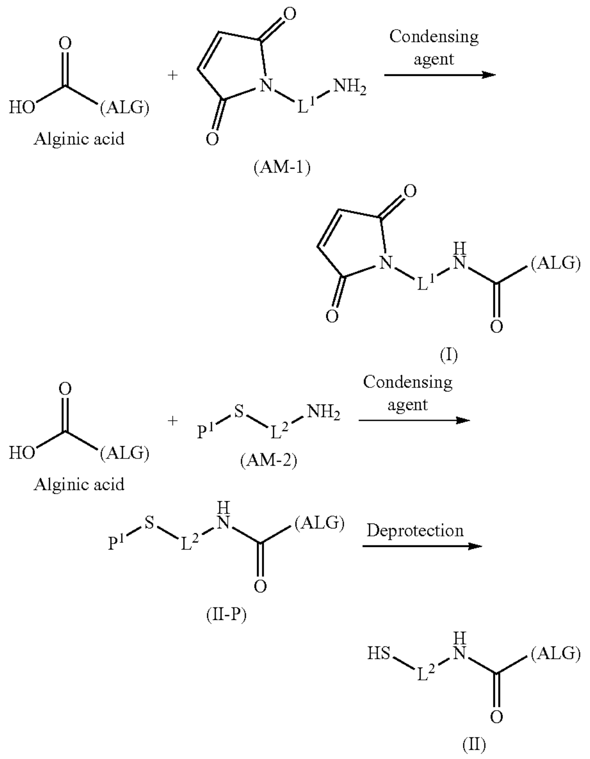

The weight-average molecular weight of an alginic acid derivative represented by formula (I), formula (II) or formula (II-P) in this Description is from 100,000 Da to 3,000,000 Da, or preferably from 300,000 Da to 2,5000,000 Da, or more preferably from 500,000 Da to 2,000,000 Da. The molecular weights of both alginic acid derivatives can be determined by the methods discussed below.

In this Description, the group represented by the following formula (BR-1) in the alginic acid derivative represented by formula (I) need not be attached to all of the carboxyl groups of the alginic acid structural units.

[C95]

(BR-1)

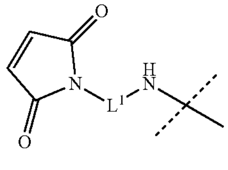

Similarly, the group represented by the following formula (BR-2) in the alginic acid derivative represented by formula (II) need not be attached to all of the carboxyl groups of the alginic acid structural units:

[C96]

(BR-2)

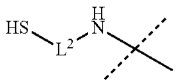

Furthermore, the group represented by the following formula (BR-2-P) in the alginic acid derivative represented by formula (II-P) need not be attached to all of the carboxyl groups of the alginic acid structural units.

[C97]

(BR-2-P)

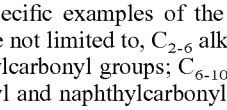

When the group of formula (BR-1) in the alginic acid derivative of formula (I) in this Description is called a reactive group, this means that it is a reactive group complementary to the group of formula (BR-2) in the alginic acid derivative of formula (II). Conversely, when the group of formula (BR-2) in the alginic acid derivative of formula (II) is called a reactive group, this means that it is a reactive group complementary to the group of formula (BR-1) in the alginic acid derivative of formula (I).

The introduction rate of a reactive group or complementary reactive group in this Description is 0.1% to 30% or 1% to 30% of each for example, or preferably from 2% to 20%, or more preferably from 3% to 10%.

The introduction rate of the reactive group or complementary reactive group is the number of uronic acid monosaccharide units having each introduced reactive group out of the uronic acid monosaccharide units that are repeating units of the alginic acid, represented as a percentage. Unless otherwise specified, "%" used as the introduction rate of a reactive group or complementary reactive group in an alginic acid derivative (formula (I) or formula (II)) means mol %. The introduction rate of each reactive group or complementary reactive group can be determined by the methods described in the examples below.

A protective group that is easy to protect and deprotect may be selected appropriately as the protective group $P^1$ of the thiol group in the alginic acid derivative represented by formula (II-P). For example, a known protective group can be selected appropriately from those described in the literature, such as for example in Greene et al, "Protective Groups in Organic Synthesis", 5th Edition, 2014, John Wiley & Sons. More specific examples of the protective group $P^1$ include, but are not limited to, $C_{2-6}$ alkanoyl groups such as acetyl and ethylcarbonyl groups; $C_{6-10}$ arylcarbonyl groups such as benzoyl and naphthylcarbonyl groups; trityl (triphenylmethyl) and diphenylmethyl groups; and N—$C_{1-6}$ alkylcarbamoyl groups such as methylaminocarbonyl and ethylaminocarbonyl groups and the like.

In this Description, crosslinking occurs when the maleimide group in the formula (BR-1) group of the alginic acid derivative of formula (I) and the thiol (HS—) group in the alginic acid derivative of formula (II) form covalent bonds by a Michael addition reaction.

3. Methods for Synthesizing Alginic Acid Derivatives

In this Description, the alginic acid derivative represented by formula (I) can be manufactured by a condensation reaction between the amine derivative represented by formula (AM-1) (in which $-L^1-$ is defined as in the Embodiment [1] or [2]) or a salt thereof and any carboxyl group of an alginic acid. The alginic acid derivative represented by formula (II) can be manufactured by performing a condensation reaction between the amine derivative represented by formula (AM-2) (in which $-L^2-$ and $P^1$ are defined as in the Embodiment [1] or [5]) or a salt thereof and any carboxyl group of alginic acid to obtain the alginic acid derivative represented by formula (II-P), and then deprotecting the protective group $P^1$.

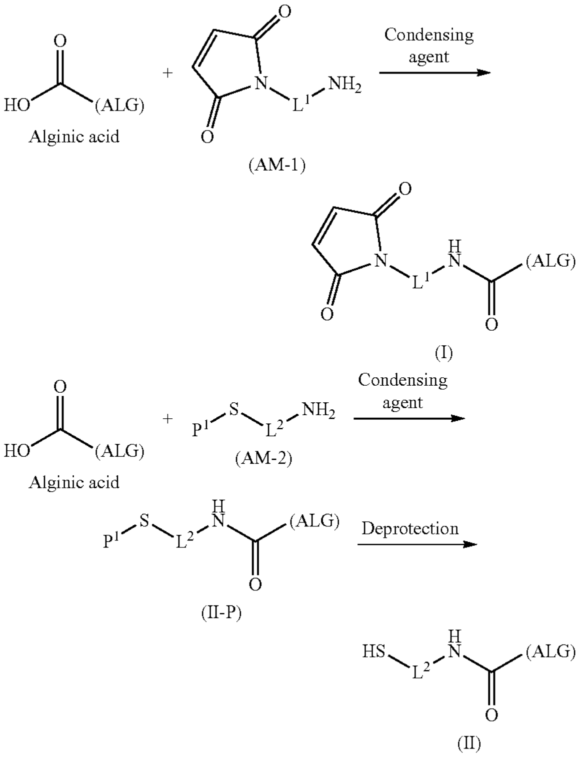

Specifically, an alginic acid derivative represented by formula (I) or formula (II-P) can be manufactured by methods known in the literature (such as the methods described in "Experimental Chemistry Course 5th Edition, Vol. 16, Synthesis of Organic Compounds IV. Carboxylic acids, derivatives, acid amides and acid imides", pp. 118-154, "Amino acids and peptides", pp. 258-283, 2007 (Maruzen)) by reacting a 0.5 wt % to 1 wt % aqueous alginic acid solution and an amine derivative represented by formula (AM-1) or formula (AM-2) or a salt thereof at temperatures from 0° C. to 50° C. with or without an inorganic base such as sodium hydrogen carbonate or sodium carbonate or an organic base such as triethylamine or pyridine in water, an ether solvent such as 1,4-dioxane, an alcohol solvent such as methanol or ethanol, a polar solvent such as N,N-dimethylformamide or a mixed solvent of these (provided that the mixed solvent must be such that the alginic acid does not precipitate) in the presence of a condensing agent such as 1,3-dicyclohexyl carbodiimide (DCC), 1-ethyl-3-(3-dimethylaminopropyl) carbodiimide hydrochloride (WSC·HCl), benzotriazol-1-yloxytris(dimethylamino) phosphonium hexafluorophosphate (BOP reagent), bis(2-oxo-3-oxazolidinyl) phosphinic chloride (BOP-Cl), 2-chloro-1,3-dimethylimidazolinium hexafluorophosphate (CIP) or 4-(4,6-dimethoxy-1,3,5-triazin-2-yl)-4-methyl morpholinium chloride (DMT-MM). Further, the alginic acid derivative represented by formula (II) can be manufactured by deprotecting the protective group $P^1$ in the formula (II-P).

When the protective group $P^1$ in the formula (II-P) is a $C_{2-6}$ alkanoyl group or benzoyl group such as an acetyl group or benzoyl group, it can be deprotected by the following methods. An inorganic base such as sodium hydroxide or potassium hydroxide is added to an aqueous solution (for example, 0.5 wt % to 1 wt %) of the alginic acid derivative of formula (II-P) in an excess amount relative to the introduced formula (BR-2-P):

[C99]

(BR-2-P)

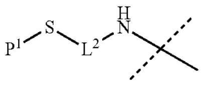

and the mixture is hydrolyzed at a reaction temperature of from 0° C. to 30° C. to manufacture a salt of the alginic acid derivative of formula (II). The reaction solution is then neutralized, and the resulting solution of the alginic acid derivative of formula (II) can then be used as is in a crosslinking reaction.

In the above methods for manufacturing the alginic acid derivative of formula (I) or the alginic acid derivative of formula (II-P), the introduction rate of the amine derivative of formula (AM-1) or formula (AM-2) can be adjusted by appropriately selecting and combining the following reaction conditions (i) to (v) and the like considering the properties and the like of the amine: (i) increasing or decreasing the equivalent amount of the condensing agent, (ii) increasing or decreasing the reaction temperature, (iii) increasing or decreasing the reaction time, (iv) adjusting the concentration of the alginic acid of the reaction substrate, (v) adding an organic solvent miscible with water to increase the solubility of the amine derivative of formula (AM-1) or formula (AM-2).

Methods for manufacturing the amine derivative represented by formula (AM-1) or (AM-2) are shown below.

[Manufacturing Method A] <Method for Synthesizing Amine Derivative of Formula (AM-1) and Salt Thereof>

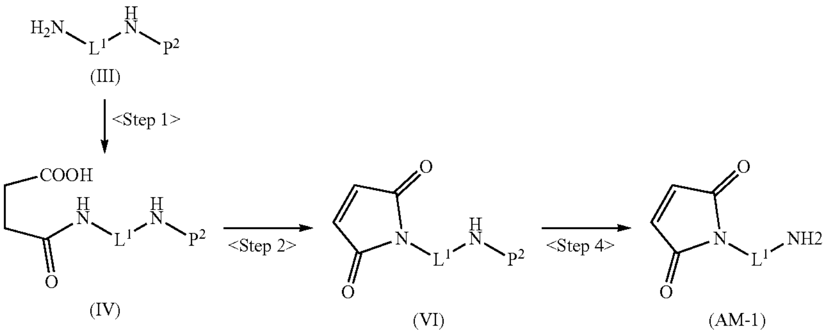

-continued

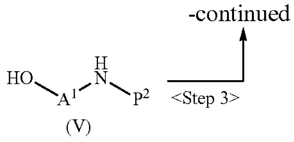

[Manufacturing Method A] <Step 1>

Using the amine represented by formula (III) (the compound of formula (III) is a commercial compound or a compound that can be manufactured from a commercial compound by manufacturing methods known in the literature; $P^2$ in the formula is an amino protecting group, and may be selected appropriately) and maleic acid and following methods described in known literature (such as "Experimental Chemistry Course 5th Edition, Vol. 16, Synthesis of Organic Compounds IV: Carboxylic acids, derivatives, acid amides and imides, 146-154, 2007 (Maruzen)), the compound of formula (IV) can be manufactured by performing a reaction at a temperature from 0° C. to 50° C. with or without a base selected from the inorganic bases such as sodium hydrogen carbonate, sodium carbonate and potassium carbonate and the organic bases such as triethylamine, N,N-diisopropylethylamine and pyridine in a solvent selected from the ether solvents such as tetrahydrofuran and 1,4-dioxane, the halogen solvents such as methylene chloride and 1,2-dichloroethane and the polar solvents such as N,N-dimethylformamide and the like in the presence of a condensing agent selected from 1,3-dicyclohexyl carbodiimide (DCC), 1-ethyl-3-(3'-dimethylaminopropyl) carbodiimide hydrochloride (WSC·HCl), benzotriazol-1-yloxytris (dimethylamino) phosphonium hexafluorophosphate (BOP reagent), bis(2-oxo-3-oxazolidinyl) phosphinic chloride (BOP-Cl), 2-chloro-1,3-dimethylimidazolinium hexafluorophosphate (CIP), 4-(4,6-dimethoxy-1,3,5-triazin-2-yl)-4-methyl morpholinium chloride (DMT-MM) and the like.

The compound of formula (IV) can also be manufactured by reacting maleic anhydride and the amine represented by formula (III) in a solvent such as an alcohol solvent such as methanol or ethanol with or without a base such as triethylamine, N,N-diisopropylethylamine or pyridine.

[Manufacturing Method A] <Step 2>

The compound of formula (VI) can be manufactured by reacting the compound represented by formula (IV) and a base such as sodium acetate in a solvent selected from the ether solvents such as tetrahydrofuran, 1,4-dioxane and 1,2-dimethoxyethane, the hydrocarbon solvents such as toluene, benzene and xylene, the halogen solvents such as 1,2-dichloroethane, methylene chloride and chloroform, or anhydrous acetic acid or the like at a temperature from 40° C. to the reflux temperature of the solvent.

The compound of formula (VI) can also be manufactured by performing a reaction in anhydrous acetic acid using the crude compound of formula (IV) obtained in <Step 1> of the [Manufacturing Method A] and a base such as sodium acetate.

The compound of formula (VI) can also be manufactured by first reacting the compound or crude compound of formula (IV) obtained in <Step 1> of the [Manufacturing Method A] with a suitable condensing agent to derive an active ester, and then subjecting this to a cycloaddition reaction.

[Manufacturing Method A] <Step 3>

The compound of formula (VI) can be manufactured by reacting the compound represented by formula (V) [the compound of formula (V) is a commercial compound or a compound that can be manufactured from a commercial compound by methods known in the literature] and maleimide at a temperature from −78° C. to the reflux temperature of the solvent in a solvent selected from the ether solvents such as tetrahydrofuran and 1,4-dioxane and the hydrocarbon solvents such as toluene, benzene, xylene and the like in the presence of a phosphine reagent such as triphenylphosphine and a Mitsunobu reagent such as diethyl azodicarbonate or diisopropyl azodicarbonate.

[Manufacturing Method A] <Step 4>

The amine derivative of formula (AM-1) can be manufactured by deprotecting the compound of formula (VI) according to the type of protective group $P^2$ using methods known in the literature for deprotecting amino protecting groups, such as for example the methods described in Greene et al, "Protective Groups in Organic Synthesis", 5th Edition, 2014, John Wiley & Sons.

The amine derivative of formula (AM-1) may be obtained as necessary in the form of a salt, such as a hydrochloride salt, trifluoroacetate salt or the like.

$P^2$ in the [Manufacturing Method A] represents an amine protecting group and may for example be selected appropriately from the protective groups described in Greene et al, "Protective Groups in Organic Synthesis", 5th Edition, 2014, John Wiley & Sons. Examples of $P^2$ include, but are not limited to, such protective groups as —C(O)O-tert Bu, —C(O)O-Bn, —C(O)O—$CH_2$—CH=$CH_2$, —C(O)$CH_3$, —C(O)$CF_3$, —$SO_2$Ph, —$SO_2$PhMe and —$SO_2$Ph($NO_2$) groups and the like.

When $P^2$ is a —C(O)O-tert Bu group for example, it can be deprotected using an acid (such as hydrogen chloride (which may be a solution of 1,4-dioxane, cyclopentyl methyl ether, ethyl acetate or the like containing hydrogen chloride) or trifluoroacetic acid or the like). More particularly, the deprotection method can be selected according to the type of protective group with reference to methods known in the literature, such as those of Greene et al, "Protective Groups in Organic Synthesis", 5th Edition, 2014, John Wiley & Sons for example.

[Manufacturing Method B] Methods for Synthesizing Amine Derivative of Formula (AM-2) and Salt Thereof (Reaction Formula B)

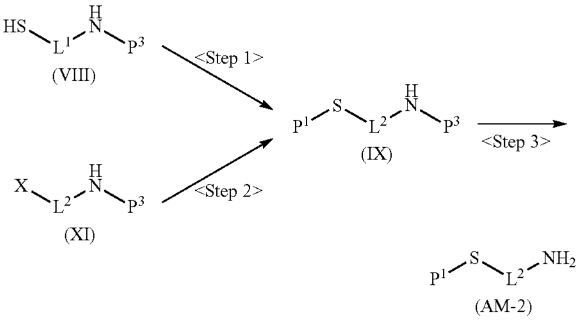

[Manufacturing Method B] <Step 1>

The compound of formula (IX) can be manufactured using the compound represented by formula (VIII) [the compound of formula (VIII) is a commercial compound or a compound that can be manufactured from a commercial compound by methods known in the literature; $P^3$ is an amino protecting group, which can be selected appropriately] by introducing the protective group $P^1$ following methods known in the literature (such as those described in "Protective Groups in Organic Synthesis", 3rd Edition, Protection for the Thiol Group, pp. 457-486, 1999). For example, the protective group can be introduced using acetyl chloride when $P^1$ is an acetyl group, using benzoyl chloride when it is a benzoyl group, using triphenyl methyl chloride when it is a trityl group, and using ethyl isocyanate when it is an EtNHCO— group.

The compound of formula (IX) can also be manufactured by performing a condensation reaction using the compound represented by formula (VIII) and a carboxylic acid derivative of acetic acid, benzoic acid or the like in accordance with the methods of

[Manufacturing Method A] <Step 1>.

[Manufacturing Method B] <Step 2>

The compound of formula (IX) can be manufactured using the compound represented by formula (XI) [the compound of formula (XI) is a commercial compound or a compound that can be manufactured from a commercial compound by methods known in the literature; $P^3$ is an amino protecting group, which can be selected appropriately; X is a halogen atom, which may be selected from a chlorine atom, bromine atom or iodine atom for example] and thiobenzoic acid, thioacetic acid or an acylthio derivative such as potassium thioacetate in a solvent selected from acetonitrile, methylene chloride, N,N-dimethylformamide and the like with or without a base such as potassium carbonate.

[Manufacturing Method B] <Step 3>

The amine derivative represented by formula (AM-2) can then be manufactured by deprotecting the compound of formula (IX) according to the type of protective group $P^3$ using methods known in the literature for deprotecting amino protecting groups, such as for example the methods described in Greene et al, "Protective Groups in Organic Synthesis", 5th Edition, 2014, John Wiley & Sons or the like.

The amine derivative of formula (AM-2) may be obtained as necessary in the form of a salt, such as a hydrochloride salt, trifluoroacetate salt or the like.

$P^3$ in the [Manufacturing Method B] represents an amine protecting group and may for example be selected appropriately from the protective groups described in Greene et al, "Protective Groups in Organic Synthesis", 5th Edition, 2014, John Wiley & Sons. Examples of $P^3$ include, but are not limited to, such protective groups as —C(O)O-tert Bu, —C(O)O-Bn, —C(O)O—$CH_2$—CH═$CH_2$, —C(O)$CH_3$, —C(O)$CF_3$, —$SO_2$Ph, —$SO_2$PhMe and —$SO_2$Ph($NO_2$) groups and the like.

When $P^3$ is a —C(O)O-tert Bu group for example, it can be deprotected using an acid (such as hydrogen chloride (which may be a solution of 1,4-dioxane, cyclopentyl methyl ether, ethyl acetate or the like containing hydrogen chloride) or trifluoroacetic acid or the like). More particularly, the deprotection method can be selected according to the type of protective group with reference to methods known in the literature, such as those of Greene et al, "Protective Groups in Organic Synthesis", 5th Edition, 2014, John Wiley & Sons for example.

The amine derivative (amino compound) represented by formula (AM-1) or (AM-2) (including subordinate formulae of each formula), as used herein, may sometimes form a pharmaceutically acceptable salt (such as an acid addition salt). This salt is not particularly limited as long as it is a pharmaceutically acceptable salt, and examples include salts with inorganic acids, salts with organic acids, and salts with acidic amino acids and the like. Preferred examples of salts with inorganic acids include salts with hydrochloric acid, hydrobromic acid, hydroiodic acid, nitric acid, sulfuric acid and phosphoric acid. Preferred examples of salts with organic acids include salts with aliphatic monocarboxylic acids such as formic acid, acetic acid, trifluoroacetic acid, propionic acid, butyric acid, valeric acid, enanthic acid, capric acid, myristic acid, palmitic acid, stearic acid, lactic acid, sorbic acid and mandelic acid, salts with aliphatic dicarboxylic acids such as oxalic acid, malonic acid, succinic acid, fumaric acid, maleic acid, malic acid, and tartaric acid, salts with aliphatic tricarboxylic acids such as citric acid, salts with aromatic monocarboxylic acids such as benzoic acid and salicylic acid, salts with aromatic dicarboxylic acids such as phthalic acid, salts with organic carboxylic acids such as cinnamic acid, glycolic acid, pyruvic acid, oxylic acid, salicylic acid, and N-acetylcystein, salts with organic sulfonic acids such as methanesulfonic acid, benzenesulfonic acid and p-toluenesulfonic acid, and acid addition salts with acidic amino acids such as aspartic acid and glutamic acid. Preferred examples of salts with acidic amino acids include salts with aspartic acid, glutamic acid, and the like. Of these, a pharmaceutically acceptable salt is preferred.

When an amine derivative (amino compound) represented by formula (AM-1) or formula (AM-2) (including subordinate expressions of each expression) is substituted with a carboxyl group in this Description, it sometimes forms a pharmacologically acceptable salt (such as a base addition salt). Such a salt is not limited as long as it is pharmacologically acceptable, but examples include metal salts, ammonium salts and salts with organic bases and the like. Desirable examples of metal salts include alkali metal salts such as lithium salts, sodium salts, potassium salts and cesium salts, alkali earth metal salts such as calcium salts, magnesium salts and barium salts, and aluminum salts and the like. Desirable examples of salts with organic bases include salts with methylamine, ethylamine, t-butylamine, t-octylamine, diethylamine, trimethylamine, triethylamine, cyclohexylamine, dicyclohexylamine, dibenzylamine, ethanolamine, diethanolamine, triethanolamine, piperidine, morpholine, pyridine, picoline, lysine, arginine, ornithine, ethylenediamine, N-methylglucamine, glucosamine, phenylglycine alkyl ester, guanidine, 2,6-lutidine, ethanolamine, diethanolamine, triethanolamine and N,N'-dibenzylethylenediamine.

This salt can be obtained by ordinary methods, such as for example by mixing a solution containing the compound of the invention and a suitable amount of an acid or base to form the target salt, and then either performing separation filtration or distilling the mixed solution. General information on salts is published in Stahl & Wermuth, "Handbook of Pharmaceutical Salts: Properties, Selection and Use" (Wiley-VCH, 2002), and details are described in this handbook.

The amine compound represented by formula (AM-1) or (AM-2) or a salt thereof as used herein may form a solvate with a solvent such as water, ethanol, glycerol or the like.

4. Michael Addition Reaction

As shown in the reaction formula below, a Michael addition reaction is a reaction whereby covalent bonds are formed by a 1,4-addition (conjugated addition) reaction of a carbanion, organic metal compound, amine, alkoxide or thioalkoxide to an electron-deficient double bond (such as an acryloyl, cinnamic acid or maleimide group) coupled with an electron withdrawing group.

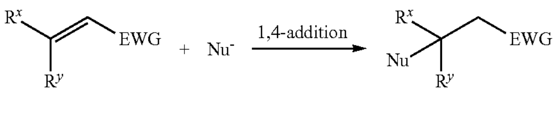

(In the reaction formula above, EWG represents an electron withdrawing group (for example, COOR or CONHR), Nu represents a nucleophilic reagent selected form a carbanion (R-M), R—$NH_2$ (or R—NH—), R—OH (or R—O—), R—SH (or R—S—) or the like; R represents various substituents such as $C_{1-6}$alkyl groups; $R^x$ and $R^y$ represent various substituents such as hydrogen atoms or $C_{1-6}$alkyl groups; and M represents a metal such as Li or Na).

More specifically, the Michael addition reaction in this Description is a reaction whereby a thiol compound is subjected to a 1,4-addition (conjugated addition) reaction with the maleimide compound represented by the following reaction formula to form covalent bonds.

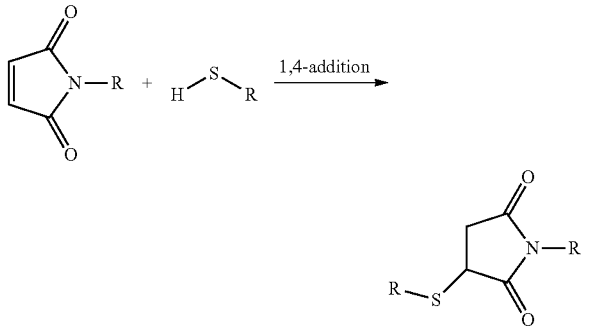

(In the reaction formula above, R represents various substituents such as $C_{1-6}$ alkyl groups.

In certain embodiments, the Michael addition reaction can easily, efficiently and quickly form crosslinks by covalent bonding between alginic acid molecules without causing undesirable by-products.

In a preferred embodiment of the method for crosslinking alginic acid derivatives, almost no undesirable by-products are formed by the Michael addition reaction. In this case, various bioactive molecules can be incorporated when using alginic acid to prepare novel forms of biocompatible materials and when forming alginic acid hydrogels, or cellular materials can be incorporated into alginic acid hydrogels for reconstructive surgery or gene therapy.

5. Crosslinked Alginic Acid

Crosslinked alginic acids include those that are crosslinked via (i) divalent metal ion bonds, (ii) chemical bonds, and (iii) both divalent metal ion bonds and chemical bonds. All these kinds of crosslinked alginic acid have the property of forming gels or semi-solids, or in some cases sponge-like forms.

When a crosslinked alginic acid is crosslinked via divalent metal ion bonds, the reaction progresses ultra-rapidly and is reversible, while when a crosslinked alginic acid is crosslinked via chemical bonds, the reaction progresses slowly under relatively mild conditions, and is irreversible. The physical properties of a crosslinked alginic acid can be adjusted by such methods as changing the concentration of the aqueous solution (such as a calcium chloride aqueous solution) containing the divalent metal ion or changing the introduction rate of the reactive group introduced into the alginic acid or the like.

A variety of alginic acid structures can be prepared using the above crosslinking reaction. For example, a specific structure can be prepared instantaneously from an alginic acid solution by an ionic crosslinking reaction, and a crosslinking reaction via chemical bonds can then be used to structurally reinforce the resultant structure (to give it long-term stability for example). Alternatively, in a crosslinked alginic acid structure crosslinked via both divalent metal ion bonds and chemical bonds, the divalent metal ions incorporated by ionic crosslinking can be reversibly released, leaving a structure having only crosslinking via chemical bonds.

A crosslinked alginic acid of a certain embodiment can be obtained by mixing the alginic acid derivatives of formula (I) and formula (II) above and performing a Michael addition reaction.

In this Description, performing a crosslinking reaction means performing a Michael addition reaction using the alginic acid derivative represented by formula (I) above and the alginic acid derivative represented by formula (II) above to thereby form chemical crosslinks (chemical bonds) between the alginic acid derivative represented by formula (I) above and the alginic acid derivative represented by formula (II) above, or combining a divalent metal ion with the alginic acid derivative represented by formula (I) above and the alginic acid derivative represented by formula (II) above to thereby form ionic crosslinks (ionic bonds) between the alginic acid derivative represented by formula (I) above and/or the alginic acid derivative represented by formula (II) above, or else forming both chemical crosslinks by the Michael addition reaction and ionic crosslinks by a divalent metal ion.

In this Description, chemical crosslinking (chemical bonding) can be accomplished by adding a deprotection agent so as to deprotect the protective group $P^1$ in the alginic acid derivative of the formula (II-P) (for example, a base such as a sodium hydroxide aqueous solution when $P^1$ is an acyl-type protective group such as an acetyl group or benzoyl group; the deprotection agent can be selected appropriately according to the protective group $P^1$) to a mixed solution comprising the alginic acid derivative of formula (I) and the alginic acid derivative of formula (II-P) (in which $P^1$ is not a hydrogen atom in formula (II-P)) or to a solution of a composition comprising the alginic acid derivative of formula (I) and the alginic acid derivative of formula (II-P) (in which $P^1$ is not a hydrogen atom in formula (II-P).

A crosslinked alginic acid of a certain embodiment forms a three-dimensional mesh structural via chemical crosslinking (crosslinking by covalent bonds formed from maleimide groups and thiol groups). Preferred alginic acid derivatives provide improved stability of the crosslinked alginic acid after crosslinking.

A crosslinked alginic acid of certain embodiments is a crosslinked alginic acid in which any carboxyl group of a first alginic acid and any carboxyl group of a second alginic acid are amide bonded via the following formula (LK-1):

[C104]

(LK-1)

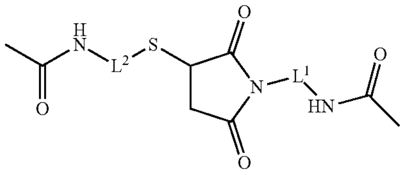

[in formula (LK-1), the —CONH— and —NHCO— at either end represent amide bonds via any carboxyl group of alginic acid; and -$L^1$- and -$L^2$- are defined as in the Embodiment [1]].

In certain embodiments, the mixing ratio of the alginic acid derivative of formula (I) and the alginic acid derivative of formula (II) when preparing the crosslinked alginic acid is for example from 1:1 to 1.5:1, or preferably from 1.2:1 to 1.5:1, or from 1:1 to 1.2:1, or more preferably 1:1 based on the weight ratio of the derivative of formula (I) to the derivative of formula (II).

In certain embodiments, the mixing ratio of the alginic acid derivative of formula (II) and the alginic acid derivative of formula (I) when preparing the crosslinked alginic acid is for example from 1:1 to 4.0:1, or preferably from 1.5:1 to 4.0:1, or 1.2:1 to 1.5:1, or 1:1 to 1.2:1, or more preferably 1:1 based on the weight ratio of the derivative of formula (II) to the derivative of formula (I).

In certain embodiments, the mixing ratio of the alginic acid derivative of formula (I) and the alginic acid derivative of formula (II) when preparing the crosslinked alginic acid is more preferably such that the ratio of the introduction rates (mol %) of the reactive groups of the alginic acid derivative of formula (I) and the alginic acid derivative of formula (II) is for example from 1:1 to 1.5:1, or preferably from 1.2:1 to 1.5:1, or 1:1 to 1.2:1, or more preferably 1:1.

In certain embodiments, the mixing ratio of the alginic acid derivative of formula (II) and the alginic acid derivative of formula (I) when preparing the crosslinked alginic acid is more preferably such that the ratio of the introduction rates (mol %) of the reactive groups of the alginic acid derivative of formula (II) and the alginic acid derivative of formula (I) is for example from 1:1 to 4.0:1, or preferably from 1.5:1 to 4.0:1, or 1.2:1 to 1.5:1, or 1:1 to 1.2:1, or more preferably 1:1.

In these mixing ratios, the alginic acid derivative of formula (II) may be substituted for the alginic acid derivative of formula (I), and the alginic acid derivative of formula (I) may be substituted for the alginic acid derivative of formula (II).

It is not necessary for all of the carboxyl groups of the constituent units of alginic acid to have the crosslink of the formula (LK-1) in the crosslinked alginic acid. The introduction rate of the crosslink represented by the formula (LK-1) in the crosslinked alginic acid (also called the crosslinking rate) is for example in the range of from 0.1 to 80%, or from 0.3 to 60%, or from 0.5 to 30%, or from 1.0 to 10%.

The concentration of the alginic acid derivative of formula (I) or formula (II) in the Michael addition reaction for obtaining the crosslinked alginic acid is normally from 1 to 500 mg/mL, or preferably in the range of 5 to 100 mg/mL.

The reaction temperature in the Michael addition reaction is normally an external temperature of from 4° C. to 60° C., or preferably an external temperature in the range of 15° C. to 40° C.

The stirring time for forming the crosslinked alginic acid (hydrogel) is for example from a few seconds to 24 hours, or from a few seconds to 12 hours, or from a few seconds to 30 minutes, or from a few seconds to 10 minutes.

The reaction solvent or reaction solution used in the Michael addition reaction is not particularly limited, but examples include tap water, pure water (such as distilled water, deionized water, RO water or RO-EDI water), ultrapure water, cell culture medium, phosphate buffered saline (PBS) and physiological saline, and ultrapure water is preferred.

A crosslinked alginic acid of certain embodiments is a crosslinked alginic acid comprising as crosslinks both chemical crosslinks formed by covalent bonding by a Michael addition reaction and ionic crosslinks partially formed by a divalent metal ion (such as a calcium ion).

6. Composition

Provided is a composition comprising the alginic acid derivative represented by formula (I) above and the alginic acid derivative represented by formula (II) above. In each formula, (ALG), —NHCO—, -$L^1$- and -$L^2$- are as described in the embodiments above.

[C105]

(I)

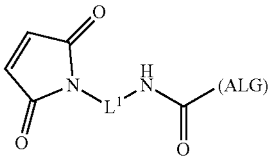

(II)

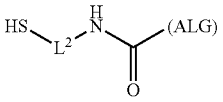

In a composition of certain embodiments, the weight ratio of the alginic acid derivative of formula (I) and the alginic acid derivative of formula (II) (alginic acid derivative of formula (I):alginic acid derivative of formula (II)) is for example from 1:1 to 1:1.5, or preferably from 1:1.2 to 1:1.5, or 1:1 to 1:1.2, or more preferably 1:1.

In a composition of certain embodiments, the weight ratio of the alginic acid derivative of formula (II) and the alginic acid derivative of formula (I) (alginic acid derivative of formula (II):alginic acid derivative of formula (I)) is for example from 1:1 to 1:1.5, or preferably from 1:1.2 to 1:1.5, or from 1:1 to 1:1.2, or more preferably 1:1.

In a composition of certain embodiments, the mixing ratio of the alginic acid derivative of formula (I) and the alginic acid derivative of formula (II) is such that the ratio of the introduction rates (mol %) of the formula (BR-1) group in the alginic acid derivative of formula (I) and the formula (BR-2) group in the alginic acid derivative of formula (II) is for example from 1:1 to 1:1.5, or preferably from 1:1.2 to 1:1.5, or from 1:1 to 1:1.2, or more preferably 1:1.

In a composition of certain embodiments, the mixing ratio of the alginic acid derivative of formula (II) and the alginic acid derivative of formula (I) is such that the ratio of the introduction rates (mol %) of the formula (BR-2) group in the alginic acid derivative of formula (II) and the formula (BR-1) group in the alginic acid derivative of formula (I) is for example from 1:1 to 1:1.5, or preferably from 1:1.2 to 1:1.5, or from 1:1 to 1:1.2, or more preferably 1:1.

A composition comprising the alginic acid derivative represented by the formula (I) and the alginic acid derivative represented by the formula (II-P) is provided. In each formula, (ALG), —NHCO—, $P^1$, $-L^1-$ and $-L^2-$ are as described in the embodiments above.

[C106]

(I)

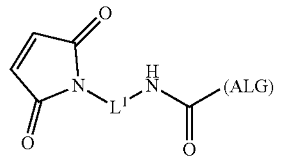

(II-P)

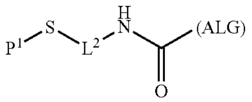

In a composition of certain embodiments, the weight ratio of the alginic acid derivative of formula (I) and the alginic acid derivative of formula (II-P) (alginic acid derivative of formula (I):alginic acid derivative of formula (II-P)) is for example from 1:1 to 1:1.5, or preferably from 1:1.2 to 1:1.5, or from 1:1 to 1:1.2, or more preferably 1:1.

In a composition of certain embodiments, the weight ratio of the alginic acid derivative of formula (II-P) and the alginic acid derivative of formula (I) (alginic acid derivative of formula (II-P):alginic acid derivative of formula (I)) is for example from 1:1 to 1:1.5, or preferably from 1:1.2 to 1:1.5, or from 1:1 to 1:1.2, or more preferably 1:1.

In a composition of certain embodiments, the mixing ratio of the alginic acid derivative of formula (I) and the alginic acid derivative of formula (II-P) is such that the ratio of the introduction rates (mol %) of the formula (BR-1) group in the alginic acid derivative of formula (I) and the formula (BR-2-P) group in the alginic acid derivative of formula (II-P) is for example from 1:1 to 1:1.5, or preferably from 1:1.2 to 1:1.5, or from 1:1 to 1:1.2, or more preferably 1:1.

In a composition of certain embodiments, the mixing ratio of the alginic acid derivative of formula (II-P) and the alginic acid derivative of formula (I) is such that the ratio of the introduction rates (mol %) of the formula (BR-2-P) group in the alginic acid derivative of formula (II-P) and the formula (BR-1) group in the alginic acid derivative of formula (I) is for example from 1:1 to 1:1.5, or preferably from 1:1.2 to 1:1.5, or from 1:1 to 1:1.2, or more preferably 1:1.

7. Crosslinked Alginic Acid Structure

The crosslinked alginic acid structure can be obtained by a method that includes subjecting the above alginic acid derivatives to a crosslinking reaction. Examples of specific crosslinked alginic acid structures include fibrous structures, fibers, beads, gels and substantially spherical gels. A preferred crosslinked alginic acid structure has improved stability. The crosslinked alginic acid structure may also have the ability to hold contents within itself (content retention ability). The crosslinked alginic acid structure can be prepared by the following methods for example but is not limited to these.

[Mixing Method (1)]

A mixed solution of alginic acid derivatives obtained by mixing the alginic acid derivative of formula (I) with the alginic acid derivative of formula (II), or a solution of a composition comprising the alginic acid derivative represented by formula (I) and the alginic acid derivative represented by formula (II), can be dripped into a solution containing a divalent metal ion to obtain a crosslinked alginic acid structure that is a specific structure formed by chemical crosslinking (crosslinking by covalent bonds formed by a Michael addition reaction) and ionic crosslinking (crosslinking partially formed by a divalent metal ion).

[Mixing Method (2)]

A deprotection agent (for example, a base such as a sodium hydroxide aqueous solution when $P^1$ is an acyl-type protective group such as an acetyl group or benzoyl group; the deprotection agent can be selected appropriately according to the protective group $P^1$) can be added to a mixed solution of alginic acid derivatives obtained by mixing the alginic acid derivative of formula (I) with the alginic acid derivative of formula (II-P) (however, $P^1$ in formula (II-P) is not a hydrogen atom), or to a solution of a composition comprising the alginic acid derivative represented by formula (I) and the alginic acid derivative represented by formula (II-P) (however, $P^1$ in formula (II-P) is not a hydrogen atom) so as to deprotect the protective group $P^1$ of the alginic acid derivative of formula (II-P), and this can then be dripped into a solution containing a divalent metal ion to thereby obtain a crosslinked alginic acid structure that is a specific structure formed by chemical crosslinking (crosslinked by covalent bonds formed by a Michael addition reaction) and ionic crosslinking (crosslinking partially formed by a divalent metal ion).

[Coating Method (1)]

A solution comprising the alginic acid derivative of formula (I) can be dripped or the like into a solution containing a divalent metal ion to thereby obtain a partially crosslinked specific structure. The resulting gel or other structure for example can then be added to a solution comprising the alginic acid derivative of formula (II) above to perform a further crosslinking reaction (Michael addition reaction) on the surface or the like of the structure to obtain a crosslinked alginic acid structure. This method can also be implemented with the alginic acid derivative of formula (II) substituted for the alginic acid derivative of formula (I) and the alginic acid derivative of formula (I) substituted for the alginic acid derivative of formula (II).

[Coating Method (2)]

A solution comprising the alginic acid derivative of formula (I) can be dripped or the like into a solution containing a divalent metal ion to thereby obtain a partially crosslinked specific structure. The resulting gel or other structure for example can then be added to a solution comprising the alginic acid derivative of formula (II-P) above (in which $P^1$ is not a hydrogen atom in formula (II-P)), a deprotection agent (for example, a base such as a sodium hydroxide aqueous solution when $P^1$ is an acyl-type protective group such as an acetyl group or benzoyl group; the deprotection agent can be selected appropriately according to the protective group $P^1$) can then be further added so as to deprotect the protective group $P^1$ of the alginic acid derivative represented by the formula (II-P), and a further crosslinking reaction (Michael addition reaction) can be performed on the surface or the like of the structure to form a crosslinked alginic acid structure.

Alternatively, a solution comprising the alginic acid derivative of formula (II-P) (however, $P^1$ in formula (II-P) is not a hydrogen atom) can also be dripped or the like into a solution containing a divalent metal ion to thereby obtain a partially crosslinked specific structure. The resulting gel or other structure can then be added to a solution comprising the alginic acid derivative of formula (I), a deprotection agent (for example, a base such as a sodium hydroxide aqueous solution when $P^1$ is an acyl-type protective group such as an acetyl group or benzoyl group; the deprotection agent can be selected appropriately according to the protective group $P^1$) can then be further added to deprotect the protective group $P^1$ of the alginic acid derivative represented by the formula (II-P), and a further crosslinking reaction (Michael addition reaction) can be performed on the surface or the like of the structure to form a crosslinked alginic acid structure.

The divalent metal ion used in the above method is not particularly limited: examples include calcium ions, magnesium ions, barium ions, strontium ions, zinc ions and the like, and a calcium ion is preferred.

The solution containing the calcium ion used in this method is not particularly limited: examples include aqueous solutions of calcium chloride, calcium carbonate, calcium gluconate, and the like, and an aqueous calcium chloride solution is preferred.

The calcium ion concentration of the solution containing the calcium ion used in this method is not particularly limited but may be 1 mM to 1 M for example, or preferably 5 mM to 500 mM, or more preferably 10 mM to 300 mM.

The solvent or solution used in this method is also not particularly limited, but examples include tap water, pure water (such as distilled water, deionized water, RO water, RO-EDI water, etc.), ultrapure water, cell culture medium, phosphate buffered saline (PBS), physiological saline, and the like, and ultrapure water is preferred.

The physical properties of the alginic acid gel can be adjusted by adjusting the various physical property values such as hardness, elasticity, repulsive force, rupture force, stress at break, and the like.

8. Biocompatibility of Alginic Acid Derivatives, Crosslinked Alginic Acid and Crosslinked Alginic Acid Structure In this Description, the alginic acid derivatives, crosslinked alginic acid and crosslinked alginic acid structure have biocompatibility. Biocompatibility in this Description means the property of not causing reactions such as interactions between a biomaterial (referring here to the alginic acid derivatives represented by formula (I) and formula (II) and the crosslinked alginic acid and crosslinked alginic acid structure manufactured using both of these alginic acid derivatives) and a living body, local reactions between the biomaterial and adjacent tissue, or systemic reactions or the like.

In this Description, the biocompatibility of the alginic acid derivatives, crosslinked alginic acid and crosslinked alginic acid structure can be confirmed in the examples pertaining to biocompatibility below.

9. Stability of Crosslinked Alginic Acid Structure

The stability of the crosslinked alginic acid structure can be confirmed by measuring gel stability, while permeability can be confirmed by measuring gel permeability and the like.

[Method for Measuring Gel Stability]

Phosphate buffered saline (PBS) is added to a crosslinked alginic acid structure gel in a container, and the concentration (μg/mL) of alginic acid leaked into the PBS is measured. The measured alginic acid concentration is divided into the total alginic acid concentration obtained by decomposing the crosslinked alginic acid structure gel, and the resulting value is given as percentage and used as the gel collapse rate. Gel stability can be determined specifically by the methods described in the Examples below.

The gel collapse rate of the crosslinked alginic acid structure herein is preferably 0% to 90%, or more preferably 0% to 70%, or still more preferably 0% to 50%. The stability of the crosslinked alginic acid structure is greater the lower the concentration of the alginic acid leaked into an aqueous solution, or in other words the lower the gel collapse rate.

[Method for Measuring Gel Permeation Rate]

A crosslinked alginic acid structure gel containing fluorescein isothiocyanate-dextran is prepared, saline is added to the gel in a container, and the concentration of dextran leaking into the saline is measured. The measured dextran concentration is divided into the total dextran concentration obtained by decomposing the crosslinked alginic acid structure gel containing the fluorescein isothiocyanate-dextran, and the resulting value is given as percentage and used as the gel permeation rate. The gel permeation rate can be determined specifically by the methods described in the Examples below.

The gel permeation rate of the crosslinked alginic acid 24 hours after addition of the saline is preferably 0% to 90%, or more preferably 0% to 70%, or still more preferably 0% to 50% when the gel contains dextran with a molecular weight of 2,000,000. When it contains dextran with a molecular weight of 150,000, assuming that the intended use of the crosslinked alginic acid structure gel is releasing and producing proteins and antibodies, the gel permeation rate is preferably 1% to 100%, or more preferably 10% to 100%, or still more preferably 30% to 100%, while if the intended use is as an immune barrier, the gel permeation rate is preferably 0% to 90%, or more preferably 0% to 70%, or still more preferably 0% to 50%.

The lower the permeability of the crosslinked alginic acid structure, the lower the permeation of the gel contents or external substances, while the higher the permeability, the higher the permeation of the gel contents or external substances.

The gel permeation rate can be adjusted by adjusting the molecular weight and concentration of the alginic acid used, the type and introduction rate of the crosslinking group introduced into the alginic acid, the type and concentration of the divalent metal ion used for gelling, or a combination thereof.

[Method for Preparing Crosslinked Alginic Acid Structure Gel Containing Contents]

For example, a crosslinked alginic acid structure gel containing fluorescein isothiocyanate-dextran contents can be prepared by the following methods.

(1) A solution of an alginic acid derivative represented by formula (I) is mixed with a fluorescein isothiocyanate-dextran solution.

(2) The mixed solution obtained in (1) is mixed with a solution of the alginic acid derivative represented by formula (II). (When formula (II) is substituted for formula (I) in (1), formula (I) is substituted for formula (II) in (2)).

(3) The mixed solution obtained in (2) is dripped into a solution containing a calcium ion, and the resulting gel forms chemical crosslinks and ionic crosslinks in the solution, thereby yielding a crosslinked alginic acid structure gel containing fluorescein isothiocyanate-dextran.

10. Use of Alginic Acid Derivative and Crosslinked Alginic Acid Structure

The alginic acid derivative may be used in place of conventional alginic acid in a wide range of fields including foodstuffs, cosmetics, fibers and paper. As preferred uses of the alginic acid derivative or crosslinked alginic acid structure, specific examples include medical materials such as wound dressings, postoperative adhesion prevention materials, sustained drug release materials, cell culture substrates and cell transplant substrates. Examples of conditions for treatment by cell transplantation include diabetes, Parkinson's disease, hemophilia and the like.

When used as a medical material, the crosslinked alginic acid structure may be in the form of a fibrous structure, beads, a gel or a substantially spherical gel or the like; a gel or substantially spherical gel is preferred, and a substantially spherical gel is more preferred.

All publications cited in this Description, such as documents of prior art as well as patent documents including Japanese Patent Application Publications and Japanese Patent Publications, are incorporated by reference in this Description.

Moreover, the objectives, features, advantages and ideas of the present invention are clear to a person skilled in the art from the descriptions of this Description, and the present invention can be easily implemented by a person skilled in the art based on the descriptions of this Description. The best mode and specific examples for implementing the invention are used to illustrate preferred embodiments of the present invention, and the present invention is not limited to these because they are given for purposes of example or explanation. Based on the descriptions of this Description, a person skilled in the art can understand that various modifications are possible within the intention and scope of the present invention as disclosed herein.

EXAMPLES

A JEOL JNM-ECX400 FT-NMR (JEOL) was used for measuring the nuclear magnetic resonance (NMR) spectrum. Liquid chromatography-mass spectrometry (LC-Mass) was performed by the following methods. A Waters ACQUITY UPLC system and a BEH C18 column (2.1 mm×50 mm, 1.7 μm) (Waters) were used with a mobile phase and gradient conditions of acetonitrile:0.05% trifluoroacetic acid aqueous solution=5:95 (0 minutes) to 95:5 (1.0 minute) to 95:5 (1.6 minutes) to 5:95 (2.0 minutes).

In the NMR signal patterns of the $^1$H-NMR data, s means a singlet, d means a doublet, t means a triplet, q means a quartet and m means a multiplet, br means broad, J is a coupling constant, Hz means hertz, $CDCl_3$ is deuterated chloroform, DMSO-$d_6$ is deuterated dimethylsulfoxide, $D_2O$ is deuterium oxide, and $CD_3OD$ is deuterated methanol. In the $^1$H-NMR data, signals that cannot be confirmed because they are broadband, such as protons of hydroxyl (OH), amino ($NH_2$) and carboxyl (COOH) groups, are not described in the data. In the LC-Mass data, M represents molecular weight and $[M+H]^+$ is a molecular ion peak.

"Room temperature" in the examples is normally a temperature from about 0° C. to about 35° C.

For the "introduction rate" in the examples, 1H-NMR measurement was performed in $D_2O$, and the results were given as "mol % (NMR integration ratio)" based on the ratio of the proton integration values of the alginic acid and the maleimide group or aromatic ring of the reactive substituent.

Example 1

Synthesis of alginic acid (AL-EX-1) having introduced 2-(2,5-dioxo-2,5-dihydro-1H-pyrrole-1-yl) ethylamino group

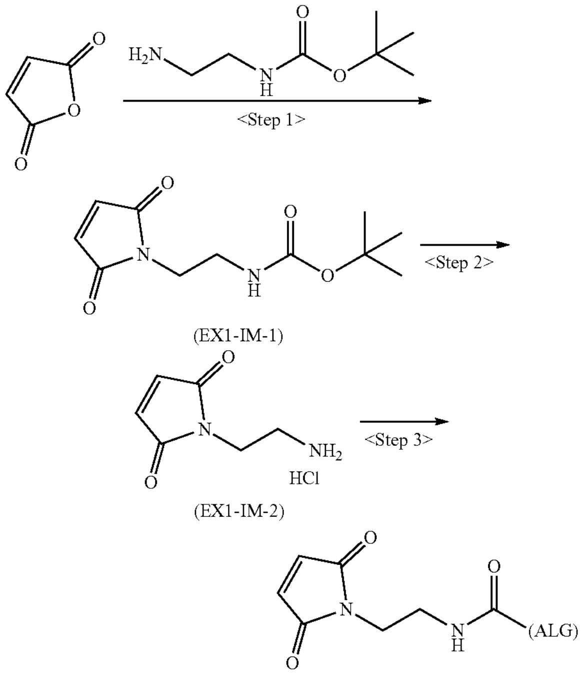

(AL-EX-1)

Step 1

Synthesis of tert-butyl (2-(2,5-dioxo-2,5-dihydro-1H-pyrrole-1-yl)ethyl) carbamate (EX1-IM-1)

600 mg of maleic anhydride was suspended in 6.0 mL of ethanol, and an ethanol (3.0 mL) solution of tert-butyl(2-aminoethyl) carbamate (1.03 g) and triethylamine (0.90 mL) was added under ice water cooling. The reaction solution was stirred for 2 hours at room temperature, and the ethanol was distilled off under reduced pressure. The residue was dissolved in acetic anhydride (6.0 mL), sodium acetate (502 mg) was added, and the mixture was stirred for 1.5 hours at 70° C. This was then separated by addition of ethyl acetate (25 mL) and water (10 mL). The organic layer was washed successively with saturated aqueous sodium bicarbonate (10 mL, 3 times) and brine (10 mL) and then dried with anhydrous sodium sulfate, and the solvent was distilled off under reduced pressure. The residue was purified by silica gel column chromatography (heptane to 50% ethyl acetate/heptane). The resulting oily substance was triturated with heptane (20 mL). The solid was collected, washed with heptane, and dried under reduced pressure to obtain the title compound (1.01 g) as a white solid.

Step 2

Synthesis of 1-(2-aminoethyl)-1H-pyrrole-2,5-dione hydrochloride (EX1-IM-2)

4N-hydrogen chloride in ethyl acetate (5.0 mL) was added to the compound (500 mg) obtained in <Step 1> of (Example 1) and stirred for 1.5 hours at room temperature. Ethyl acetate (5.0 mL) was added, and the precipitate was filtered out and washed with ethyl acetate. The resulting hygroscopic solid was suspended in ethyl acetate and the ethyl acetate was distilled off under reduced pressure, after which the product was dried under reduced pressure to obtain the title compound (328 mg) as a white solid.

Step 3

Synthesis of alginic acid (AL-EX-1) having introduced 2-(2,5-dioxo-2,5-dihydro-1H-pyrrole-1-yl) ethylamino group The compound obtained in <Step 2> of (Example 1) (36 mg), 4-(4,6-dimethoxy-1,3,5-triazin-2-yl)-4-methylmorpholinium chloride (84 mg) and 1-molar aqueous sodium bicarbonate (252 μL) were added to 20 mL of an aqueous solution of sodium alginate (KIMICA Corporation, ALG-2) adjusted to 1 wt %, and the mixture was stirred for 3 hours at 30° C. Sodium chloride (200 mg) was added, followed by ethanol (40 mL), and the mixture was stirred at room temperature for 30 minutes. The resulting precipitate was filtered out, washed with ethanol, and dried under reduced pressure to obtain the title compound (183 mg) as a white solid.

Example 2

Synthesis of alginic acid (AL-EX-2) having introduced 2-(2-(2,5-dioxo-2,5-dihydro-1H-pyrrole-1-yl) ethoxy) ethylamino group

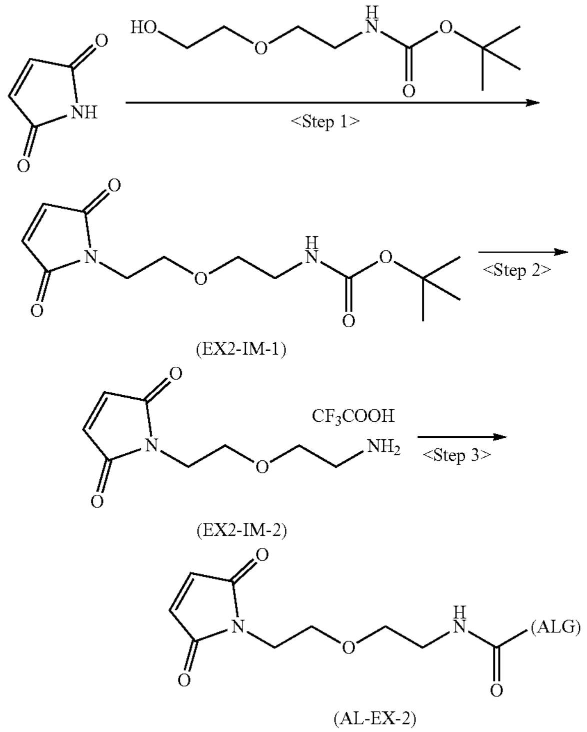

Step 1

Synthesis of tert-butyl (2-(2-(2,5-dioxo-2,5-dihydro-1H-pyrrole-1-yl)ethoxy)ethyl)carbamate (EX2-IM-1)

0.7 g of 1H-pyrrole-2,5-dione, 1.0 g of tert-butyl (2-(2-hydroxyethoxy)ethyl)carbamate and 1.4 g of triphenylphosphine were dissolved in 20 mL of tetrahydrofuran. Diisopropyl azodicarbonate (1.9 mol/L toluene solution, 2.8 mL) was dripped in under salt ice water cooling, and the mixture was stirred for 30 minutes under ice water cooling. This was stirred for 1 hour at room temperature, after which ethyl acetate (20 mL) and water (10 mL) were added to separate the solution. The organic layer was washed with brine and dried with anhydrous sodium sulfate, and the solvent was distilled off under reduced pressure. The residue was purified by silica gel column chromatography (heptane to ethyl acetate) and dried under reduced pressure to obtain the title compound (0.5 g) as a light-yellow oily substance.

Step 2

Synthesis of 1-(2-(2-aminoethoxy)ethyl)-1H-pyrrole-2,5-dione trifluoroacetic acid salt (EX2-IM-2)

2.3 mL of trifluoroacetic acid was added under ice water cooling to 0.5 g of the compound obtained in <Step 1> of (Example 2) and stirred for 1 hour at room temperature. Diisopropyl ether (11.3 mL) was added, the mixture was stirred for 30 minutes at room temperature, and the precipitated solid was collected by filtration and washed with diisopropyl ether. The resulting hygroscopic solid was suspended in diisopropyl ether, the solvent was distilled off, and the product was dried under reduced pressure to obtain the title compound (0.3 g) as a light-yellow solid.

Step 3

Synthesis of alginic acid (AL-EX-2) having introduced 2-(2-(2,5-dioxo-2,5-dihydro-1H-pyrrole-1-yl) ethoxy) ethylamino group The title compound (183 mg) was obtained as a white solid by the same operations as in <Step 3> of (Example 1) using 20 mL of an aqueous solution of sodium alginate (KIMICA Corporation, ALG-2) adjusted to 1 wt % and 60 mg of the compound obtained in <Step 2> of (Example 2).

Example 3

Synthesis of alginic acid (AL-EX-3) having introduced 2-(2-(2-(2,5-dioxo-2,5-dihydro-1H-pyrrole-1-yl)ethoxy)ethoxy) ethylamino group

[C109]

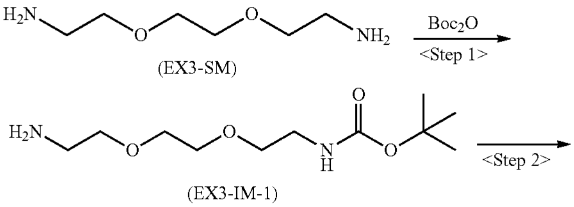

-continued

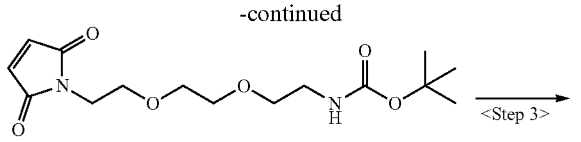

(EX3-IM-2)

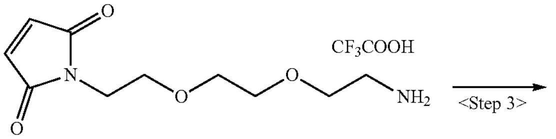

(EX3-IM-3)

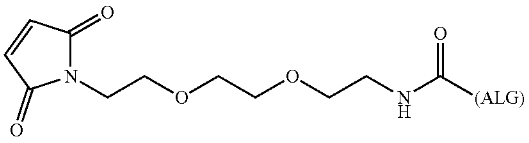

(AL-EX-3)

Step 1

Synthesis of tert-butyl (2-(2-(2-aminoethoxy) ethoxy)ethyl)carbamate (EX3-IM-1)

A methylene chloride (37.5 mL) solution of di-tert-butyl dicarbonate (3.0 g) was dripped over the course of 4.75 hours into a methylene chloride (30.0 mL) solution of 2,2'-(ethane-1,2-diylbis(oxy)) ethane-1-amine (3.2 g) and triethylamine (11.5 mL), and the mixture was stirred for 18.5 hours at room temperature. The reaction solution was concentrated under reduced pressure, methylene chloride (30 mL) was added to the residue, and the insoluble matter was removed by filtration. The filtrate was washed successively with water (10 mL) and brine (10 mL) and dried with anhydrous sodium sulfate, and the solvent was distilled off under reduced pressure. The residue was dried under reduced pressure to obtain the title crude compound (2.7 g) as a colorless oily substance.

Step 2

Synthesis of tert-butyl (2-(2-(2-(2,5-dioxo-2,5-dihydro-1H-pyrrole-1-yl)ethoxy)ethoxy)ethyl)carbamate (EX3-IM-2)

The compound obtained in <Step 1> of (Example 3) (500 mg) and maleic anhydride (217 mg) were suspended in ethanol (5.0 mL) and stirred for 30 minutes at room temperature. The ethanol was distilled off under reduced pressure, and the residue was purified by silica gel column chromatography (heptane to ethyl acetate) to obtain an amide (423 mg). Acetic anhydride (4.2 mL) was added to the resulting colorless oily substance and sodium acetate (100 mg), and the mixture was stirred for 1 hour at 40° C. and then stirred for 1 hour at 60° C., 1.5 hours at 80° C. and 2 hours at 100° C. Ethyl acetate (25 mL) and water (10 mL) were added to separate the reaction solution. The organic layer was washed successively with saturated aqueous sodium bicarbonate (10 mL), water (10 mL) and brine (5 mL), dried with anhydrous sodium sulfate, and concentrated under reduced pressure. The residue was purified by silica gel column chromatography (heptane to 80% ethyl acetate/heptane) to obtain the title compound (275 mg) as a colorless oily substance.

Step 3

Synthesis of 1-(2-(2-(2-aminoethoxy)ethoxy)ethyl)-1H-pyrrole-2,5-dione trifluoroacetic acid salt (EX3-IM-3)

Trifluoroacetic acid (1.9 mL) was added under ice water cooling to 275 mg of the compound obtained in <Step 2> of (Example 3) and stirred for 15 minutes at room temperature. The reaction solution was concentrated under reduced pressure, and the residue was purified by silica gel column chromatography (ethyl acetate to 30% methanol/ethyl acetate) to obtain the title compound (231 mg) as a colorless oily substance.

Step 4

Synthesis of alginic acid (AL-EX-3) having introduced 2-(2-(2-(2,5-dioxo-2,5-dihydro-1H-pyrrole-1-yl)ethoxy)ethoxy) ethylamino group The title compound (145 mg) was obtained as a white solid by the same operations as in <Step 3> of (Example 1) using 20 mL of an aqueous solution of sodium alginate (KIMICA Corporation, ALG-2) adjusted to 1 wt % and 69 mg of the compound obtained in <Step 3> of (Example 3).

Example 4

Synthesis of alginic acid (AL-EX-4) having introduced 2-amino-N-(2-(2,5-dioxo-2,5-dihydro-1H-pyrrole-1-yl)ethyl) acetoamido group

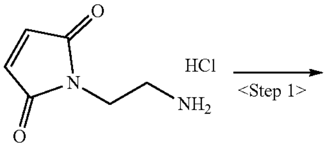

(EX4-SM)

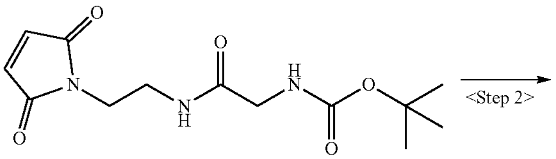

(EX4-IM-1)

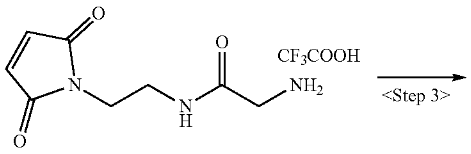

(EX4-IM-2)

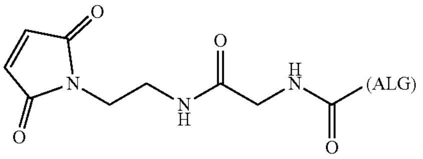

(AL-EX-4)

Step 1

Synthesis of tert-butyl (2-((2-(2,5-dioxo-2,5-dihydro-1H-pyrrole-1-yl)ethyl)amino)2-oxoethyl) carbamate (EX4-IM-1)

1-molar aqueous sodium bicarbonate (578.5 μL) was added at room temperature to a mixture of commercial 1-(2-aminoethyl)-1H-pyrrole-2,5-dione hydrochloride [CAS No. 134272-64-3] (92.43 mg) and water (750 μL). A tetrahydrofuran (1500 μL) solution of commercial 2,5-dioxopyrrolidine-1-yl (tert-butoxycarbonyl) glycinate [CAS: 3392-07-2] (150 mg) was added at room temperature to this mixture, which was then stirred for 30 minutes at that temperature. After completion of the reaction, this was separated by addition of ethyl acetate (10 mL) and water (5 mL). The organic layer was dried with anhydrous sodium sulfate, filtered, and concentrated under reduced pressure. The crude product was purified by silica gel column chromatography (25% ethyl acetate/heptane to 100% ethyl acetate, ethyl acetate to 60% methanol/ethyl acetate) to obtain the title compound (74 mg) as a colorless oily compound.

Step 2

Synthesis of 2-amino-N-(2-(2,5-dioxo-2,5-dihydro-1H-pyrrole-1-yl)ethyl) acetamide trifluoroacetate salt (EX4-IM-2)

Trifluoroacetic acid (0.52 mL) was added under ice cooling and stirring to a mixture of the compound (0.074 g) obtained in <Step 1> of (Example 4) and dichloromethane (0.22 mL), and the mixture was stirred for 2 hours at room temperature. After completion of the reaction, the reaction solution was concentrated, and diisopropyl ether (20 mL) was added. Because a gummy compound was formed, the mixture was concentrated under reduced pressure and dried to obtain the title crude compound (0.097 g) as a light-yellow gummy compound.

Step 3

Synthesis of alginic acid (AL-EX-4) having introduced 2-amino-N-(2-(2,5-dioxo-2,5-dihydro-1H-pyrrole-1-yl)ethyl) acetoamido group 4-(4-(4,6-dimethoxy-1,3,5-triazine-2-yl)-4-methylmorpholinium chloride (68.6 mg) and 1-molar aqueous sodium bicarbonate (68.6 μL) were added at room temperature to 29.7 mL of an aqueous solution of sodium alginate (KIMICA Corporation, ALG-2) adjusted to 1 wt %. A mixture of the compound (21.4 mg) obtained in <Step 2> of (Example 4), water (1 mL) and ethanol (1 mL) was then added gradually at that temperature, and the mixture was stirred for 4 hours at 40° C. Sodium chloride (300 mg) was added, ethanol (59.3 mL) was added, and the mixture was stirred for 30 minutes at room temperature. The resulting precipitate was filtered out, washed with ethanol, and dried under reduced pressure to obtain the title compound (221.3 mg) as a white cottony compound.

Example 5

Synthesis of alginic acid (AL-EX-5) having introduced (S)-2-amino-N-(2-(2,5-dioxo-2,5-dihydro-1H-pyrrole-1-yl)ethyl)-3-phenylpropanamido group

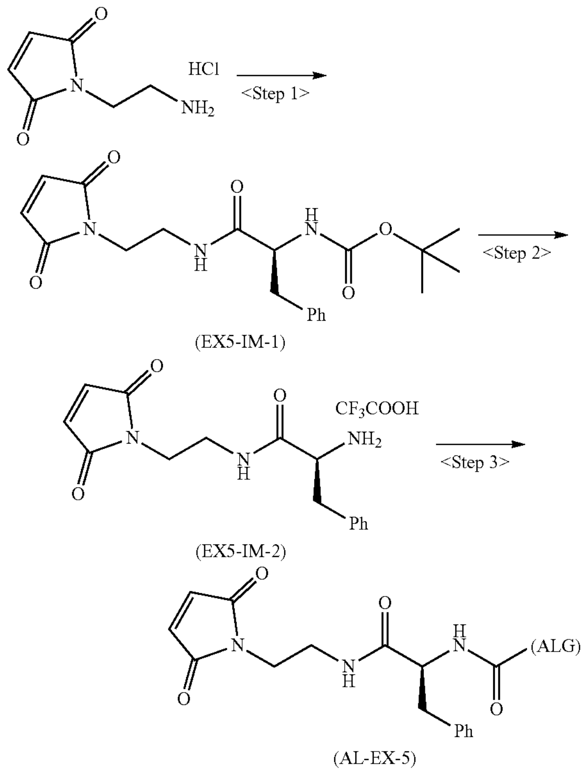

(EX5-IM-1)

(EX5-IM-2)

(AL-EX-5)

Step 1

Synthesis of tert-butyl (S)-(1-((2-(2,5-dioxo-2,5-dihydro-1H-pyrrole-1-yl)ethyl)amino)-1-oxo-3-phenylpropane-2-yl) carbamate (EX5-IM-1)

Triethylamine (78.9 μL) was added under ice cooling and stirring to a mixture of commercial 1-(2-aminoethyl)-1H-pyrrole-2,5-dione hydrochloride [CAS No. 134272-64-3] (100 mg), commercial (tert-butoxycarbonyl)-L-phenylalanine [CAS No. 13734-34-4] (150.23 mg) and dichloromethane (1 mL). N,N'-dicyclohexyl carbodiimide (116.8 mg) was added at that temperature to the mixture, which was then stirred for 30 minutes at room temperature. After completion of the reaction, this was diluted with ethyl acetate (20 mL), and the suspension was filtered. The crude product was purified by silica gel column chromatography (12% ethyl acetate/heptane to 100% ethyl acetate) to obtain the title compound (108 mg) as a white amorphous substance.

Step 2

Synthesis of (S)-2-amino-N-(2-(2,5-dioxo-2,5-dihydro-1H-pyrrole-1-yl)ethyl)-3-phenylpropanamide trifluoroacetic acid salt (EX5-IM-2)

Trifluoroacetic acid (0.7 mL) was added under ice cooling and stirring to a mixture of the compound (0.1 g) obtained in <Step 1> of (Example 5) and dichloromethane (1.3 mL), and the mixture was stirred for 30 minutes at room temperature. After completion of the reaction, the reaction solution was concentrated under reduced pressure, and diisopropyl ether (20 mL) was added. The suspension was then filtered to obtain the title compound (0.12 g) as a white solid.

Step 3

Synthesis of alginic acid (AL-EX-5) having introduced (S)-2-amino-N-(2-(2,5-dioxo-2,5-dihydro-1H-pyrrole-1-yl)ethyl)-3-phenylpropanamido group The title compound (264.8 mg) was obtained as a white cottony substance by the same operations as in <Step 3> of (Example 4) using 29.7 mL of an aqueous solution of sodium alginate (KIMICA Corporation, ALG-2) adjusted to 1 wt % and 27.5 mg of the compound obtained in <Step 2> of (Example 5).

Example 6

Synthesis of alginic acid (AL-EX-6) having introduced (S)-2-(2-aminoacetamido)-N-(2-(2,5-dioxo-2,5-dihydro-1H-pyrrole-1-yl)ethyl)-3-phenylpropanamido group

[C112]

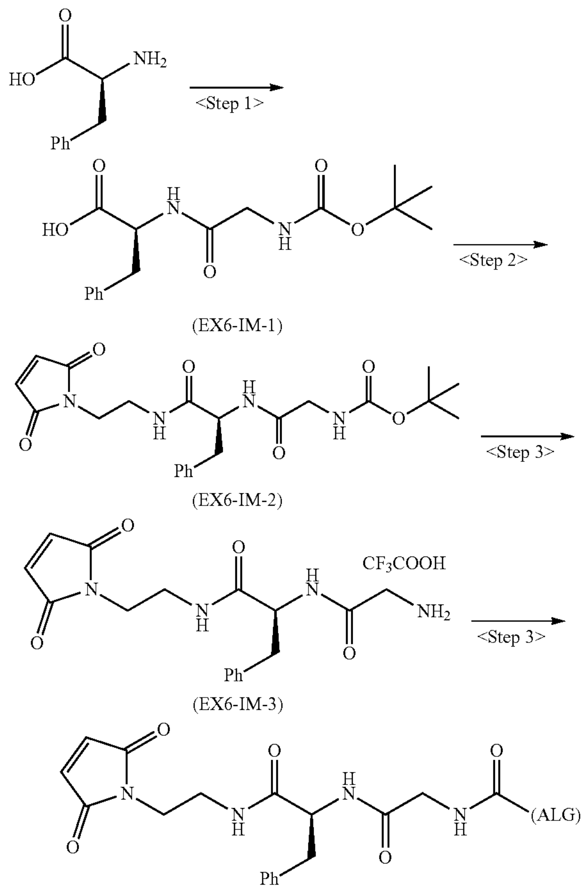

(AL-EX-6)

Step 1

Synthesis of (tert-butoxycarbonyl) glycyl-L-phenylalanine (EX6-IM-1)

1-molar aqueous sodium bicarbonate (0.73 mL) was added at room temperature to a mixture of commercial L-phenylalanine [CAS: 63-91-2] (0.12 g) and water (1 mL). A tetrahydrofuran (4 mL) solution of commercial 2,5-dioxopyrrolidine-1-yl (tert-butoxycarbonyl) glycinate [CAS: 3392-07-2] (0.2 g) was added at room temperature to this mixture, which was then stirred at the same temperature. After 1 hour 30 minutes, more 2,5-dioxopyrrolidine-1-yl (tert-butoxycarbonyl) glycinate (0.02 g) was added, and the mixture was stirred at room temperature for 30 minutes. After completion of the reaction, this was separated by addition of ethyl acetate (10 mL) and 1N-hydrochloric acid (3 mL). The organic layer was washed successively with water (5 mL) and brine (5 mL), dried with anhydrous sodium sulfate, filtered and then concentrated under reduced pressure. The crude product was purified by silica gel column chromatography (25% ethyl acetate/heptane to 100% ethyl acetate, ethyl acetate to 20% methanol/ethyl acetate) to obtain the title compound (0.21 g) as a white amorphous substance.

Step 2

Synthesis of tert-butyl (S)-(2-((1-((2-(2,5-dioxo-2,5-dihydro-1H-pyrrole-1-yl)ethyl)amino)-1-oxo-3-phenylpropane-2-yl)amino)-2-oxoethyl) carbamate (EX6-IM-2)

Triethylamine (90 μL) was added under ice cooling and stirring to a mixture of commercial 1-(2-aminoethyl-1H-pyrrole-2,5-dione hydrochloride [CAS: 134272-64-3] (114 mg), the compound (208 mg) obtained in <Step 1> of (Example 6) and dichloromethane (2080 μL). N,N'-dicyclohexyl carbodiimide (133.1 mg) was added at that temperature to the mixture, which was then stirred for 1 hour and 30 minutes at room temperature. After completion of the reaction, this was diluted with ethyl acetate (20 mL), and the suspension was filtered. The crude product was purified by silica gel column chromatography (25% ethyl acetate/heptane to 100% ethyl acetate, ethyl acetate to 20% methanol/ethyl acetate). The collected fraction was concentrated under reduced pressure and dissolved in tert-butyl methyl ether (20 mL). This solution was washed successively with saturated aqueous sodium bicarbonate (5 mL), water (5 mL, twice) and brine (5 mL), and dried with anhydrous sodium sulfate. The organic layer was concentrated under reduced pressure to obtain the title compound (220 mg) as a white amorphous substance.

Step 3

Synthesis of (S)-2-(2-aminoacetamido)-N-(2-(2,5-dioxo-2,5-dihydro-1H-pyrrole-1-yl)ethyl)-3-phenylpropanamide trifluoroacetic acid salt (EX6-IM-3)

The title compound (0.25 g) was obtained as a white solid by the same operations as in <Step 2> of (Example 5) using the compound (0.22 g) obtained in <Step 2> of (Example 6).

Step 4

Synthesis of alginic acid (AL-EX-6) having introduced (S)-2-(2-aminoacetamido)-N-(2-(2,5-dioxo-2,5-dihydro-1H-pyrrole-1-yl)ethyl)-3-phenylpropanamido group The title compound (485 mg) was obtained as a white cottony substance by the same operations as in <Step 3> of (Example 4) using 49.4 mL of an aqueous solution of sodium alginate (KIMICA Corporation, ALG-2) adjusted to 1 wt % and 52.4 mg of the compound obtained in <Step 3> of (Example 6).

Example 7

Synthesis of Alginic Acid (AL-EX-7) Having Introduced S-(4-(2-Aminoethyl)Carbamoyl)Benzyl) Ethanethioate Group

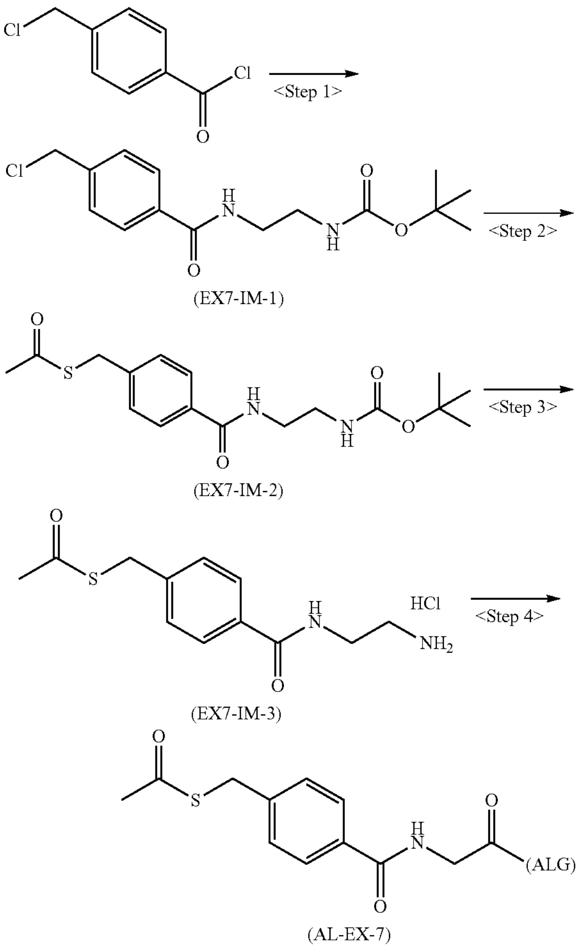

(AL-EX-7)

Step 1

Synthesis of tert-butyl (2-(4-(chloromethyl)benzamido)ethyl) carbamate (EX7-IM-1)

4-(chloromethyl) benzoyl chloride (2.0 g) was dissolved in tetrahydrofuran (10.0 mL), a tetrahydrofuran (10.0 mL) solution of tert-butyl (2-aminoethyl) carbamate (1.7 g) and diisopropylethylamine (3.7 mL) was dripped in under ice water cooling, and the mixture was stirred for 1.5 hours at room temperature. Ethyl acetate (30 mL) and water (10 mL) were added to separate the reaction solution. The organic layer was washed successively with semi-saturated aqueous sodium bicarbonate (10 mL), water (10 mL) and brine (5 mL), dried with anhydrous sodium sulfate, and concentrated under reduced pressure. The residue was triturated with tert-butyl methyl ether, and the resulting solid was filtered out and washed with tert-butyl methyl ether to obtain the title compound (2.9 g) as a white solid.

Step 2

Synthesis of S-(4-((2-((tert-butoxycarbonyl)amino)ethyl) carbamoyl)benzyl) ethanethioate (EX7-IM-2)

The compound (1.20 g) obtained in <Step 1> of (Example 7) was suspended in acetonitrile (24.0 mL). Potassium thioacetate (0.53 g) was added, and the mixture was stirred at room temperature for 30 minutes. Ethyl acetate (50 mL) and water (20 mL) were added to separate the reaction solution. The organic layer was washed successively with water (20 mL) and brine (10 mL), dried with anhydrous sodium sulfate, and concentrated under reduced pressure. The residue was triturated with tert-butyl methyl ether, and a solid was filtered out and washed with tert-butyl methyl ether. The resulting solid was dried under reduced pressure at 40° C. to obtain the title compound (1.27 g) as a white solid.

Step 3

Synthesis of S-(4-((2-aminoethyl)carbamoyl)benzyl) ethanethioate hydrochloride (EX7-IM-3)

4N-hydrogen chloride/1,4-dioxane (4.2 mL) was added under ice water cooling to the compound (0.60 g) obtained in <Step 2> of (Example 7) and stirred for 30 minutes at room temperature. 4N-hydrogen chloride/1,4-dioxane (2.1 mL) was added, and the mixture was further stirred for 30 minutes at room temperature. Diisopropyl ether (12.6 mL) was added to the reaction solution, and the resulting precipitate was filtered out, washed with diisopropyl ether, and dried under reduced pressure to obtain the title compound (0.46 g) as a white solid.

Step 4

Synthesis of Alginic Acid (AL-EX-7) Having Introduced S-(4-((2-Aminoethyl)Carbamoyl) Benzyl) Ethanethioate Group The title compound (189 mg) was obtained as a white solid by the same operations as in <Step 3> of (Example 1) using 20 mL of an aqueous solution of sodium alginate (KIMICA Corporation, ALG-2) adjusted to 1 wt % and 58 mg of the compound obtained in <Step 3> of (Example 7).

Example 7.1

Preparation of Alginic Acid (AL-EX-7.1) Having Introduced 2-(N-(4-(Mercaptomethyl)Benzamido)) Ethylamino Group

[C114]

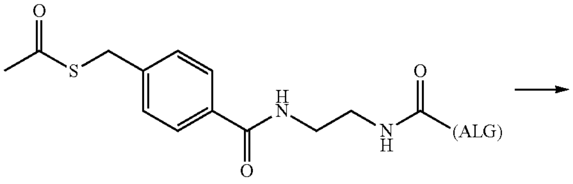

(AL-EX-7)

-continued

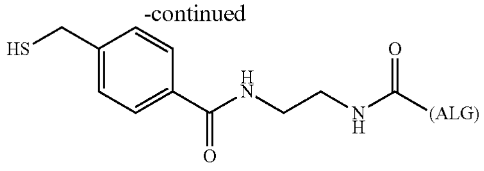

(AL-EX-7.1)

160 mg of the compound obtained in <Step 4> of (Example 7) was dissolved in 8.0 mL of water, 1N-sodium hydroxide aqueous solution (112 μL) was added, and the mixture was stirred for 2 hours at 25° C. to prepare a 2 wt % solution of the title compound. Because ethanol precipitation treatment causes this to gel, the solution was used as is in testing. A part was treated with ethanol, and elimination of acetyl groups was confirmed by NMR.

Example 8

Synthesis of alginic acid (AL-EX-8) having introduced S-(4-(3-((3-aminopropyl)amino)-3-oxopropyl) benzyl) ethanethioate group

[C115]

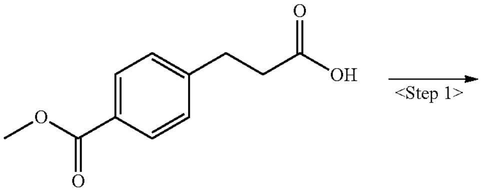

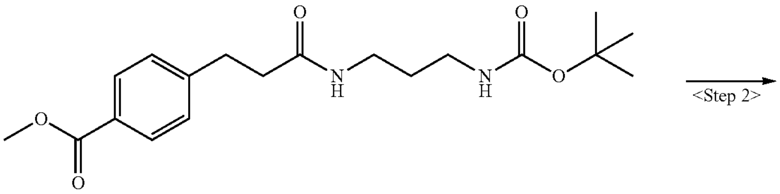

(EX8-IM-1)

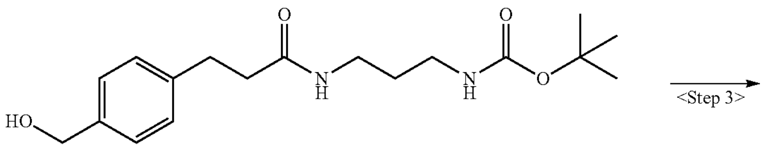

(EX8-IM-2)

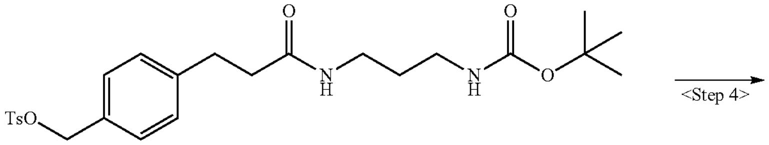

(EX8-IM-3)

-continued

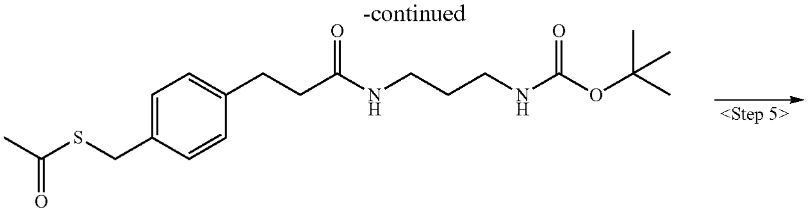

(EX8-IM-4)

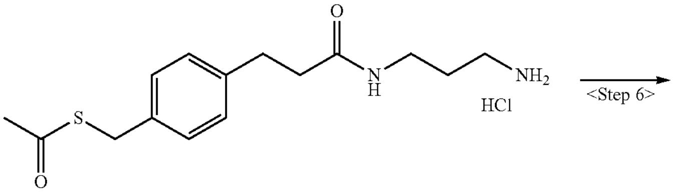

(EX8-IM-5)

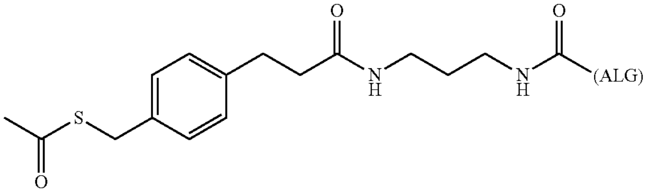

(EX8-IM-6)

Step 1

Synthesis of 4-(3-((3-((tert-butoxycarbonyl)amino) propyl)amino)-3-oxopropyl) methyl benzoate (EX8-IM-1)

3-(4-(methoxycarbonyl)phenyl) propanoic acid (1.15 g) and tert-butyl (3-aminopropyl) carbamate (0.96 g) were dissolved in methanol (11.5 mL). 4-(4,6-dimethoxy-1,3,5-triazine-2-yl)-4-methylmorpholinium chloride (2.14 g) was added, and the mixture was stirred at room temperature for 2 hours and at 40° C. for 1 hour. Ethyl acetate (20 mL) and water (20 mL) were added to separate the reaction solution, and the water layer was extracted with ethyl acetate (10 mL). The organic layers were combined, washed successively with semi-saturated aqueous sodium bicarbonate (10 mL), water (10 mL) and brine (5 mL) and dried with anhydrous sodium sulfate, and the solvent was distilled off under reduced pressure. The residue was purified by silica gel column chromatography (10% ethyl acetate/heptane to ethyl acetate) to obtain the title compound (0.76 g) as a colorless oily substance.

Step 2

Synthesis of tert-butyl (3-(3-(4-(hydroxymethyl) phenyl)propanamido) propyl)carbamate (EX8-IM-2)

The compound (560 mg) obtained in <Step 1> of (Example 8) was dissolved in tetrahydrofuran (11.2 mL). Lithium aluminum hydride (146 mg) was added over the course of 5 minutes, and the mixture was stirred for 1 hour at room temperature. A saturated sodium sulfate aqueous solution (50 drops) was added under ice water cooling, and the mixture was stirred for 1 hour at that temperature. The precipitated insoluble matter was removed by filtration and washed with tetrahydrofuran. The filtrate was concentrated under reduced pressure to obtain the title compound (569 mg) as a colorless oily substance.

Step 3

Synthesis of 4-(3-((3-((tert-butoxycarbonyl)amino) propyl)amino)-3-oxopropyl) benzyl 4-methylbenzenesulfonate (EX8-IM-3)

The compound (400 mg) obtained in <Step 2> of (Example 8) was dissolved in tetrahydrofuran (8.0 mL). p-toluenesulfonyl chloride (272 mg), N,N-dimethyl-4-aminopyridine (15 mg) and triethylamine (0.33 mL) were added, and the mixture was stirred for 6 hours at 70° C. Ethyl acetate (25 mL) and water (10 mL) were added to separate the reaction solution, and the water layer was extracted with ethyl acetate (5 mL). The organic layers were combined, washed successively with semi-saturated aqueous sodium bicarbonate (10 mL), water (10 mL) and brine (5 mL), and dried with anhydrous sodium sulfate, and concentrated under reduced pressure. The residue was triturated with tert-butyl methyl ether/heptane, and the resulting solid was collected by filtration and washed with heptane to obtain the title compound (224 mg) as a light beige solid.

Step 4

Synthesis of S-(4-(3-((3-((tert-butoxycarbonyl) amino)propyl)amino)-3-oxopropyl)benzyl) ethanethioate (EX8-IM-4)

The compound (224 mg) obtained in <Step 3> of (Example 8) was suspended in acetonitrile (4.5 mL). Potassium thioacetate (87 mg) was added, and the mixture was stirred for 30 minutes at room temperature. Ethyl acetate (20 mL) and water (10 mL) were added to separate the reaction solution. The organic layer was washed successively with water (10 mL) and brine (5 mL), dried with anhydrous sodium sulfate, and concentrated under reduced pressure. The residue was purified by silica gel column chromatography (10% ethyl acetate/heptane to ethyl acetate) to obtain the title compound (189 mg) as a white solid.

Step 5

Synthesis of S-(4-(3-((3-aminopropyl)amino)-3-oxopropyl)benzyl) ethanethioate hydrochloride (EX8-IM-5)

The title compound (140 mg) was obtained as a white solid by the same operations as in <Step 3> of (Example 7) using the compound (189 mg) obtained in <Step 4> of (Example 8).

Step 6

Synthesis of alginic acid (AL-EX-8) having introduced S-(4-(3-((3-aminopropyl)amino)-3-oxopropyl)benzyl) ethanethioate group The title compound (189 mg) was obtained as a white solid by the same operations as in <Step 3> of (Example 1) using 20 mL of an aqueous solution of sodium alginate (KIMICA Corporation, ALG-2) adjusted to 1 wt % and 67 mg of the compound obtained in <Step 5> of (Example 8).

Example 9

Synthesis of alginic acid (AL-EX-9) having introduced S-(2-(4-aminobutanamido)ethyl) benzothioate group

[C116]

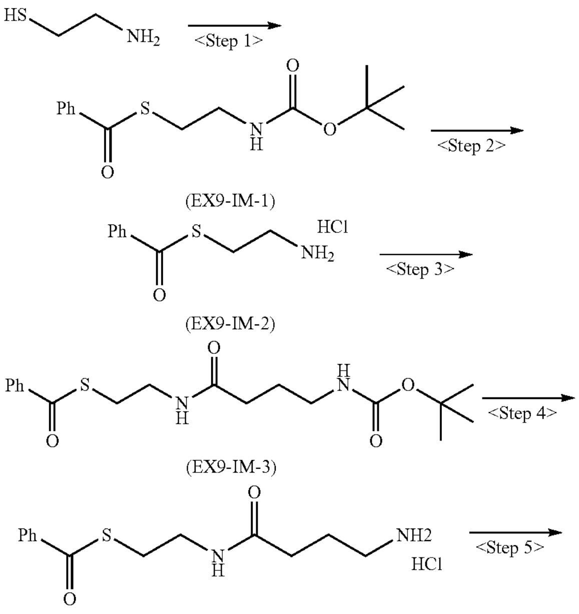

-continued

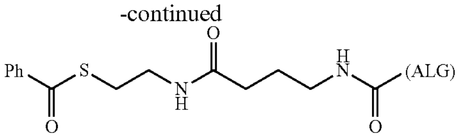

(AL-EX-9)

Step 1

Synthesis of S-(2-((tert-butoxycarbonyl)amino)ethyl) benzothioate (EX9-IM-1)

2-aminoethane-1-thiol hydrochloride (3.0 g) and triethylamine (4.1 mL) were suspended in methylene chloride (20 mL). A methylene chloride (10 mL) solution of di-tert-butyl dicarbonate (6.3 g) was added under ice water cooling, and the mixture was stirred for 2 hours at room temperature. Triethylamine (4.4 mL) and benzoyl chloride (3.7 mL) were added under ice water cooling, and the mixture was stirred for 1 hour at room temperature. Tert-butyl methyl ether (100 mL) and water (50 mL) were added to separate the reaction solution, and the water layer was extracted with tert-butyl methyl ether (50 mL). The organic layers were combined, washed successively with water (50 mL) and brine (20 mL), dried with anhydrous sodium sulfate, and concentrated under reduced pressure. The residue was purified by silica gel column chromatography (heptane to 30% ethyl acetate/heptane) to obtain the title compound (5.2 g) as a colorless oily substance.

Step 2

Synthesis of S-(2-aminoethyl) benzothioate hydrochloride (EX9-IM-2)

4N-hydrogen chloride/1,4-dioxane (5.0 mL) was added to the compound (1.0 g) obtained in <Step 1> of (Example 9) and stirred for 50 minutes at room temperature. 4N-hydrogen chloride/1,4-dioxane (1.0 mL) was added, the mixture was stirred for 1 hour at room temperature, further 4N-hydrogen chloride/1,4-dioxane (1.0 mL) was added, and the mixture was stirred for 1.5 hours at room temperature. Diisopropyl ether (14.0 mL) was added to the reaction solution, and the precipitated solid was collected by filtration, washed with diisopropyl ether, and dried under reduced pressure to obtain the title compound (0.76 g) as a white solid.

Step 3

Synthesis of S-(2-(4-((tert-butoxycarbonyl)amino)butanamido)ethyl) benzothioate (EX9-IM-3)

4-((tert-butoxycarbonyl)amino) butanoic acid (0.50 g) and triethylamine (0.36 mL) were dissolved in tetrahydrofuran (10.0 mL). Isobutyl chlorocarbonate (0.34 mL) was added under ice water cooling, and the mixture was stirred for 20 minutes at the same temperature. The compound (0.64 g) obtained in <Step 2> of (Example 9) and triethylamine (0.75 mL) were added at that temperature, and the mixture was stirred for 1.5 hours at that temperature. Ethyl acetate (20 mL) and water (10 mL) were added to separate the reaction solution. The organic layer was washed successively with semi-saturated aqueous sodium bicarbonate (10 mL), water (10 mL) and brine (5 mL), dried with anhydrous sodium sulfate, and concentrated under reduced pressure. The residue was purified by silica gel column chromatography (heptane to 80% ethyl acetate/heptane) to obtain the title compound (0.74 g) as a white solid.

Step 4

Synthesis of S-(2-(4-aminobutanamido)ethyl) benzothioate hydrochloride (EX9-IM-4)

The title compound (0.59 g) was obtained as a white solid by the same operations as in <Step 3> of (Example 7) using the compound (0.74 g) obtained in <Step 3> of (Example 9)

Step 5

Synthesis of alginic acid (AL-EX-9) having introduced S-(2-(4-aminobutanamido)ethyl) benzothioate group The title compound (198 mg) was obtained as a white solid by the same operations as in <Step 3> of (Example 1) using 20 mL of an aqueous solution of sodium alginate (KIMICA Corporation, ALG-2) adjusted to 1 wt % and the compound (61 mg) obtained in <Step 4> of (Example 9).

Example 9.1

Preparation of alginic acid (EX-ALG-9.1) having introduced 4-((2-mercaptoethyl)amino)-4-oxobutylamino group

[C117]

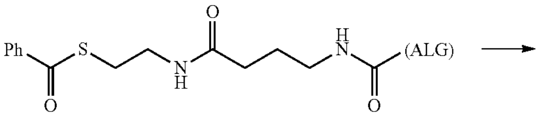

(AL-EX-9)

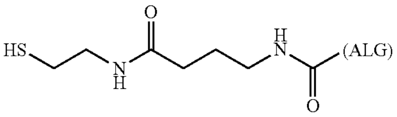

(AL-EX-9.1)

The compound (25 mg) obtained in <Step 5> of (Example 9) was dissolved in water (2.48 mL), 1N-sodium hydroxide aqueous solution (17 μL) was added, and the mixture was stirred for 2 hours at 25° C. to prepare a 1 wt % solution of the title compound.

Example 10

Synthesis of alginic acid (AL-EX-10) having introduced methyl S-benzoyl-N-glycyl-L-cysteinate group

[C118]

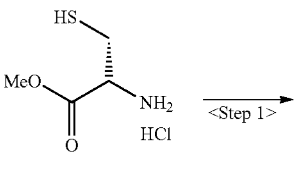

-continued

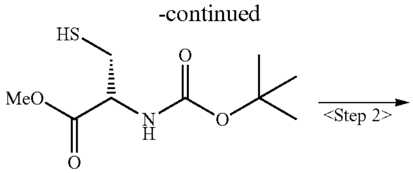

(EX10-IM-1)

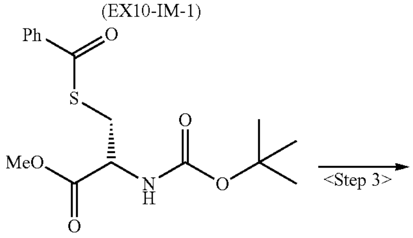

(EX10-IM-2)

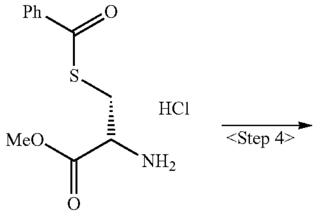

(EX10-IM-3)

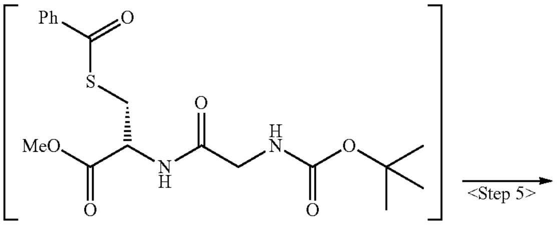

(EX10-IM-4)

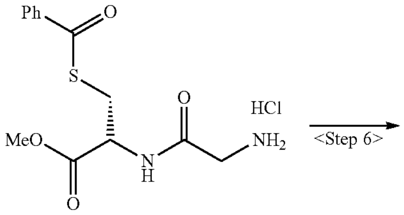

(EX10-IM-5)

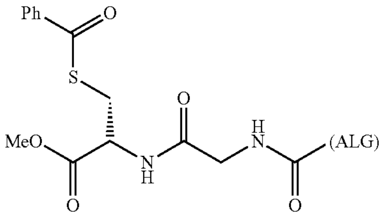

(AL-EX-10)

Step 1

Synthesis of methyl (tert-butoxycarbonyl)-L-cysteinate (EX-10-IM-1)

With reference to methods known in the literature (Chem. Commun. (2012) 48:7310-7312), 2.3-molar aqueous sodium bicarbonate (7.5 mL) was added under ice cooling and stirring to a mixture of commercial L-Cysteine Methyl Ester Hydrochloride [CAS: 18598-63-5] (1 g) and tetrahydrofuran (7.5 mL). Di-tert-butyl dicarbonate (1.29 mL) was then added at that temperature, and the mixture was stirred for 70 hours at room temperature. After completion of the reaction, the solvent was distilled off under reduced pressure, and the distillate was acidified with 1N-hydrochloric acid (10 mL). The solution was extracted twice with ethyl acetate (20 mL) and the organic layer was washed successively with water (10 mL) and brine (10 mL) and dried with anhydrous sodium sulfate. The organic layer was filtered and then concentrated under reduced pressure to obtain the title compound (1.308 g) as a crude product.

Step 2

Synthesis of methyl S-benzoyl-N-(tert-butoxycarbonyl)-L-cysteinate (EX-10-IM-2)

With reference to methods known in the literature (Synthesis (2017) 49:4879-4886), a mixture of the compound EX10-IM-1 (0.4 g) obtained in <Step 1> of (Example 10), triethylamine (0.95 mL) and methylene chloride (4 mL) was added at room temperature to a mixture of benzoyl chloride (0.39 mL) and methylene chloride (4 mL), and stirred for 1 hour and 30 minutes at that temperature. After completion of the reaction, water (5 mL) and 1N-hydrochloric acid (5 mL) were added, and the mixture was extracted 3 times with ethyl acetate (20 mL) and washed with brine (5 mL). The organic layer was dried with anhydrous sodium sulfate, filtered, and then concentrated under reduced pressure. The resulting residue was purified by silica gel column chromatography (5% ethyl acetate/heptane to 40% ethyl acetate/heptane) to obtain the title compound (0.499 g) as a colorless oily substance.

Step 3

Synthesis of methyl S-benzoyl-L-cysteinate hydrochloride (EX-10-IM-3)

4N-hydrogen chloride/1,4-dioxane (3.49 mL) was added under water cooling and stirring to a mixture of the compound EX10-IM-2 (0.499 g) obtained in <Step 2> of (Example 10) and 1,4-dioxane (3.49 mL), and stirred for 8 hours at room temperature. After completion of the reaction, diisopropyl ether (40 mL) was added, and the precipitate was filtered. The collected solid was dried under reduced pressure to obtain the title compound (0.376 g) as a white solid.

Step 4

Synthesis of methyl S-benzoyl-N-((tert-butoxycarbonyl)glycyl)-L-cysteinate (EX-10-IM-4)

Commercial 2,5-dioxopyrrolidine-1-yl (tert-butoxycarbonyl) glycinate [CAS: 3392-07-2] (98.7 mg) and 1-molar aqueous sodium bicarbonate (362.6 μL) were added under ice cooling and stirring to a mixture of the compound EX10-IM-3 (100 mg) obtained in <Step 3> of (Example 10) and tetrahydrofuran (2,000 μL), and the mixture was stirred for 2 hours at room temperature. After completion of the reaction, the mixture was extracted 3 times with ethyl acetate (10 mL) and washed successively with water (5 mL) and brine (5 mL). The organic layer was dried with anhydrous sodium sulfate, filtered, and concentrated under reduced pressure. The crude product was purified by silica gel column chromatography (25% ethyl acetate/heptane to 100% ethyl acetate, ethyl acetate to 20% methanol/ethyl acetate) to obtain a fraction containing the title compound (124 mg).

Step 5

Synthesis of methyl S-benzoyl-N-glycyl-L-cysteinate hydrochloride (EX-10-IM-5)

The title compound (0.08 g) was obtained as a white solid by performing the same deprotection operation as in <Step 4> of (Example 9) using the fraction containing the compound EX10-IM-4 (0.11 g) obtained in <Step 4> of (Example 10).

Step 6

Synthesis of alginic acid (AL-EX-10) having introduced methyl S-benzoyl-N-glycyl-L-cysteinate group 4-(4,6-dimethoxy-1,3,5-triazine-2-yl)-4-methylmorpholinium chloride (45.76 mg) and 1-molar aqueous sodium bicarbonate (45.8 μL) were added at room temperature to an aqueous solution (19.78 mL) of sodium alginate adjusted to 1 wt % (MOCHIDA PHARMACEUTICAL CO., LTD., A-2). A mixture of the compound EX10-IM-5 (15.23 mg) obtained in <Step 5> of (Example 10), water (1 mL) and ethanol (1 mL) was then dripped in at that temperature. The reaction mixture was stirred for 4 hours at 40° C. Sodium chloride (200 mg) was added, ethanol (39.6 mL) was added, and the mixture was stirred for 30 minutes at room temperature. The resulting precipitate was collected by filtration, washed with ethanol, and dried under reduced pressure to obtain the title compound (181 mg) as a white solid.

Example 10.1

Preparation of Alginic Acid (AL-EX-10.1) Having Introduced Methyl Glycyl-L-Cysteinate Group

[C119]

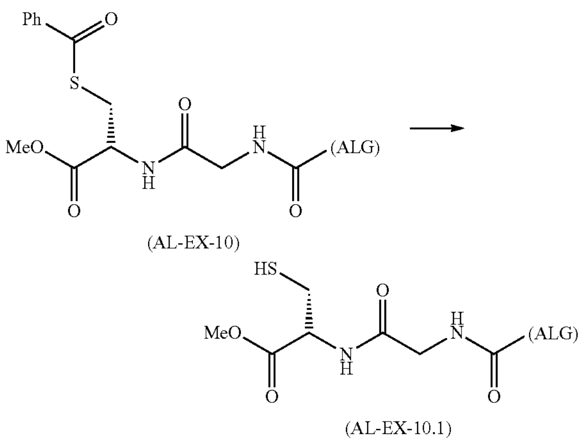

The compound (50 mg) obtained in <Step 6> of (Example 10) was dissolved in water (2.48 mL), 1N-sodium hydroxide aqueous solution (21.2 μL) was added, and the mixture was stirred for 2 hours at room temperature to obtain a 2 wt % solution of the title compound.

Example 11

Synthesis of Alginic Acid (AL-EX-11) Having Introduced N-(L-Phenylalanyl)-S-Benzoyl-L-Cysteine Group

[C120]

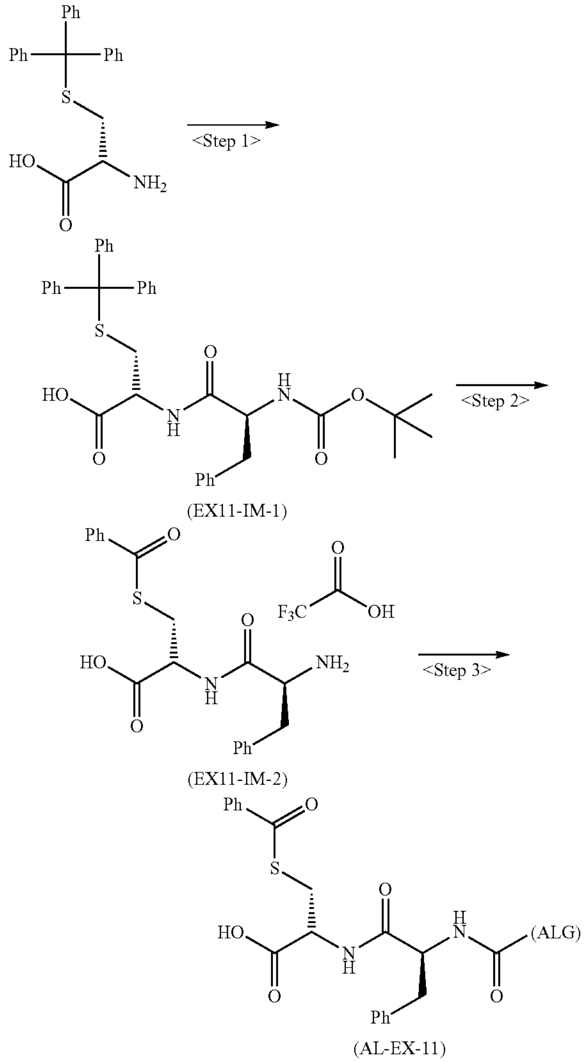

Step 1

Synthesis of N-((tert-butoxycarbonyl)-L-phenylalanyl)-S-trityl-L-cysteine (EX11-IM-1)

Isobutyl chloroformate (99 μL) was added gradually under ice cooling and stirring to a mixture of (tert-butoxycarbonyl)-L-phenylalanine [CAS. 13734-34-4] (200 mg), tetrahydrofuran (4 mL) and N-methylmorpholine (82.9 μL). This mixture was stirred for 30 minutes at the same temperature. Commercial S-trityl-L-cysteine [CAS. 2799-07-7] (274 mg) was then added under ice cooling and stirring, and the mixture was stirred at that temperature for 30 minutes and at room temperature for 30 minutes, after which water (5 mL) and 1N-hydrochloric acid (5 mL) were added to stop the reaction. The reaction solution was extracted 3 times with ethyl acetate (10 mL), and the organic layer was washed successively with water (10 mL) and brine (10 mL) and dried with anhydrous sodium sulfate. The organic layer was filtered and then concentrated under reduced pressure, and the resulting crude product was purified by silica gel column chromatography (25% ethyl acetate/heptane to 100% ethyl acetate, ethyl acetate to 15% methanol/ethyl acetate) to obtain the title compound (397 mg) as a white amorphous substance.

Step 2

Synthesis of N-(L-phenylalanyl)-S-benzoyl-L-cysteine trifluoroacetic acid salt (EX11-IM-2)

Trifluoroacetic acid (1,500 μL) and triisopropylsilane (35.4 μL) were added under ice cooling and stirring to a mixture of the compound (EX11-IM-1) (100 mg) obtained in <Step 1> of (Example 11) and methylene chloride (500 μL), and the mixture was stirred for 30 minutes at room temperature. Benzoyl chloride (38 μL) was dripped into this mixture under ice cooling and stirring. This was stirred for 25 hours at room temperature, after which benzoyl chloride (19 μL) was added at that temperature and the mixture was stirred for a further 5 hours. After completion of the reaction diisopropyl ether (20 mL) was added, and the precipitate was filtered out. Because filtration was insufficient, the filtrate was concentrated, diisopropyl ether (20 mL) was added, and the mixture was stirred for 30 minutes at room temperature. The precipitate was filtered out and dried under reduced pressure to obtain the title compound (27.5 mg) as a light-yellow solid.

Step 3

The title compound (179 mg) was obtained as a white solid by the same operations as in <Step 6> of (Example 10) using an aqueous solution (19.78 mL) of sodium alginate adjusted to 1 wt % (MOCHIDA PHARMACEUTICAL CO., LTD., A-2) and the compound EX10-IM-5 (15.23 mg) obtained in <Step 2> of (Example 11).

Example 11.1

Preparation of Alginic Acid (AL-EX-11.1) Having Introduced Sodium L-Phenylalanyl-L-Cysteinate Group

[C121]

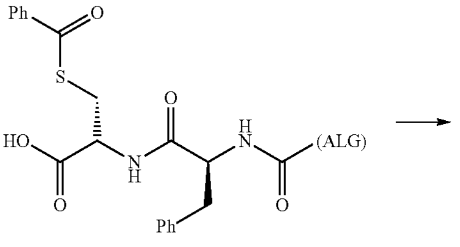

(AL-EX-11)

-continued

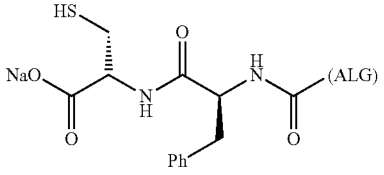

(AL-EX-11.1)

The compound AL-EX-11 (50 mg) obtained in <Step 3> of (Example 11) was dissolved in water (2.48 mL), 1N-sodium hydroxide aqueous solution (18.2 μL) was added, and the mixture was stirred for 2 hours at room temperature to prepare a 2 wt % solution of the title compound.

Example 12

Synthesis of Alginic Acid (AL-EX-12) Having Introduced S-Benzoyl-N-Glycylglycyl-L-Cysteine Group

[C122]

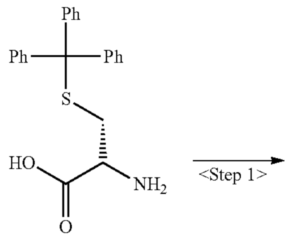

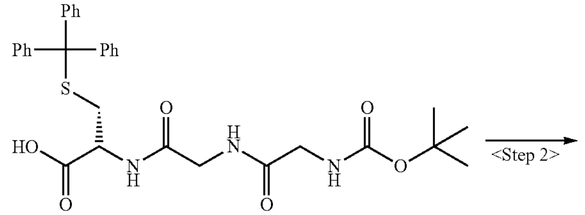

(EX12-IM-1)

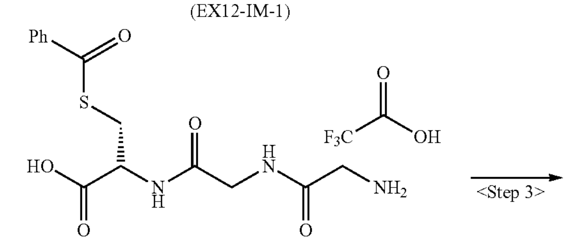

(EX12-IM-2)

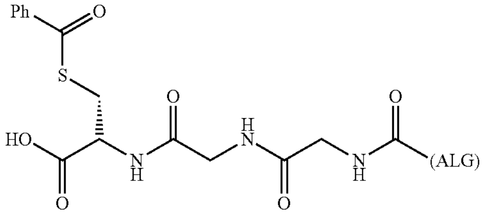

(AL-EX-12)

Step 1

Synthesis of N-(tert-butoxycarbonyl)glycylglycyl-S-trityl-L-cysteine (EX12-IM-1)

Triethylamine (0.2 mL) and isobutyl chloroformate (0.19 mL) were added under ice cooling and stirring to a mixture of commercial (tert-butoxycarbonyl) glycylglycine [CAS: 31972-52-8] (0.3 g) and tetrahydrofuran (6 mL), and stirred for 30 minutes at room temperature. Commercial S-trityl-L-cysteine [CAS: 2799-07-7] (0.52 g) and triethylamine (0.4 mL) were added under ice cooling and stirring to this mixture, which was then stirred for 20 hours at room temperature. The reaction was stopped by addition of water (5 mL) and 1N-hydrochloric acid (5 mL), and the mixture was extracted 3 times with ethyl acetate (10 mL). The organic layer was washed successively with water (5 mL) and brine (5 mL), dried with anhydrous sodium sulfate, filtered, and concentrated under reduced pressure. The crude product was purified by silica gel column chromatography (25% ethyl acetate/heptane to 100% ethyl acetate, ethyl acetate to 20% methanol/ethyl acetate) to obtain the title compound (0.581 g) as a white amorphous substance.

Step 2

Synthesis of S-benzoyl-N-glycylglycyl-L-cysteine trifluoroacetic acid salt (EX12-IM-2)

The compound EX12-IM-1 (200 mg) obtained in <Step 1> of (Example 12) was dissolved in trifluoroacetic acid (4,000 μL), and triisopropylsilane (74.8 μL) was added at room temperature. The reaction mixture was stirred for 10 minutes at room temperature, and benzoyl chloride (80.4 μL) was added at that temperature. This was stirred for 17 hours at room temperature, benzoyl chloride (80.4 μL) was added at that temperature, and the mixture was stirred for a further 4 hours. After completion of the reaction, diisopropyl ether (20 mL) was added under ice cooling and stirring, and the mixture was stirred for 3 days at room temperature. The suspension was filtered, and the collected solid was dried under reduced pressure to obtain the title compound (140 mg) as a light-yellow solid.

Step 3

Synthesis of Alginic Acid (AL-EX-12) Having Introduced S-Benzoyl-N-Glycylglycyl-L-Cysteine Group 4-(4,6-dimethoxy-1,3,5-triazine-2-yl)-4-methyl morpholinium chloride (114.4 mg) and 1-molar aqueous sodium bicarbonate (114.4 μL) were added at room temperature to an aqueous solution (49.44 mL) of sodium alginate adjusted to 1 wt % (MOCHIDA PHARMACEUTICAL CO., LTD., A-2). A mixture of the compound EX12-IM-2 (51.86 mg) obtained in <Step 2> of (Example 12), water (1 mL) and ethanol (1 mL) was then dripped in at that temperature. The reaction mixture was stirred for 17 hours at room temperature. Sodium chloride was added (500 mg), followed by ethanol (98.9 mL), and the mixture was stirred at room temperature for 30 minutes. The resulting precipitate was collected by filtration, washed with ethanol, and dried under reduced pressure to obtain the title compound (480 mg) as a white solid.

Example 12.1

Preparation of Alginic Acid (AL-EX-12.1) Having Introduced Sodium Glycylglycyl-L-Cysteinate Group

[C123]

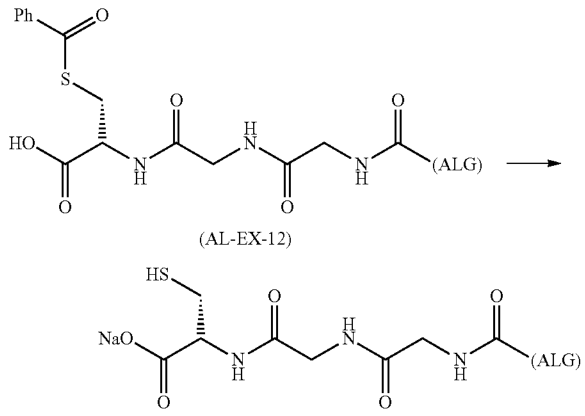

(AL-EX-12)

(AL-EX-12.1)

The compound (AL-EX-12 (50 mg) obtained in <Step 3> of (Example 12) was dissolved in water (2.48 mL), 1N-sodium hydroxide aqueous solution (19.4 μL) was added, and the mixture was stirred for 2 hours at room temperature to prepare a 2 wt % solution of the title compound.

Example 13

Synthesis of Alginic Acid (AL-EX-13) Having Introduced S-Benzoyl-N-Glycyl-L-Cysteine Group

[C124]

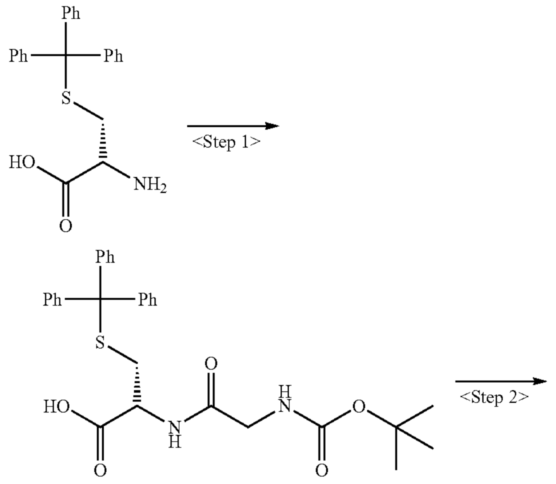

(EX13-IM-1)

-continued

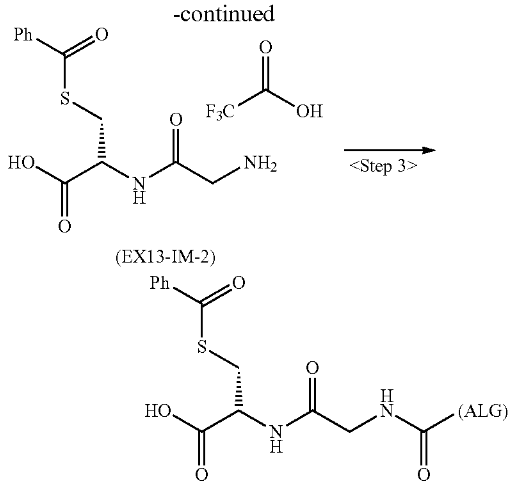

(EX13-IM-2)

(AL-EX-13)

Step 1

Synthesis of N-((tert-butoxycarbonyl)glycyl)-S-trityl-L-cysteine (EX13-IM-1)

A tetrahydrofuran (2 mL) solution of commercial 2,5-dioxopyrrolidine-1-yl (tert-butoxycarbonyl) glycinate [CAS: 3392-07-2] (0.2 g) was added at room temperature to a mixture of commercial S-trityl-L-cysteine [CAS: 2799-07-7] (0.27 g) and water (1 mL), and the mixture was stirred for 1 hour and 30 minutes at that temperature. Additional 2,5-dioxopyrrolidine-1-yl (tert-butoxycarbonyl) glycinate (0.04 g) was then added, and after further stirring for 30 minutes, ethyl acetate (20 mL) and 1N-hydrochloric acid (5 mL) were added to separate the mixture. The organic layer was washed successively with water (5 mL) and brine (5 mL), dried with anhydrous sodium sulfate, filtered, and concentrated under reduced pressure to obtain a crude product of the title compound (0.43 g) as a white amorphous substance.

Step 2

Synthesis of S-benzoyl-N-glycyl-L-cysteine trifluoroacetic acid salt (EX13-IM-2)

Trifluoroacetic acid (2250 μL) and triisopropylsilane (62.2 μL) were added under ice cooling and stirring to a mixture of the compound EX13-IM-1 (150 mg) obtained in <Step 1> of (Example 13) and methylene chloride (750 μL). The mixture was stirred for 30 minutes at room temperature, benzoyl chloride (66.9 μL) was dripped in under ice cooling and stirring, and the mixture was stirred for 20 hours and 30 minutes at room temperature. Benzoyl chloride (133.8 μL) was then added at room temperature, the mixture was stirred for 24 hours at that temperature, and the methylene chloride was concentrated under reduced pressure. Diisopropyl ether (20 mL) was added to the residue, and the suspension was stirred overnight at room temperature, filtered, and dried under reduced pressure to obtain the title compound (47.7 mg) as a light-yellow solid.

Step 3

Synthesis of Alginic Acid (AL-EX-13) Having Introduced S-Benzoyl-N-Glycyl-L-Cysteine Group The title compound (468 mg) was obtained as a white solid by the same operations as in <Step 3> of (Example 12) using an aqueous solution (49.44 mL) of sodium alginate adjusted to 1 wt % (MOCHIDA PHARMACEUTICAL CO., LTD., A-2) and the compound EX13-IM-5 (45.33 mg) obtained in <Step 2> of (Example 13).

Example 13.1

Preparation of Alginic Acid (AL-EX-13.1) Having Introduced Sodium Glycyl-L-Cysteineate Group

[C125]

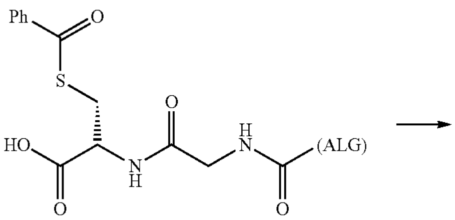

(AL-EX-13)

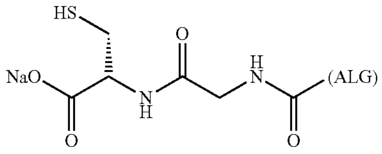

(AL-EX-13.1)

The compound AL-EX-13 (50 mg) obtained in <Step 3> of (Example 13) was dissolved in water (2.478 mL), 1N-sodium hydroxide aqueous solution (21.8 μL) was added, and the mixture was stirred for 2 hours at room temperature to prepare a 2 wt % solution of the title compound.

Example 14

Synthesis of Alginic Acid (AL-EX-14) Having Introduced N-(L-Alanyl)-S-Benzoyl-L-Cysteine Group

[C126]

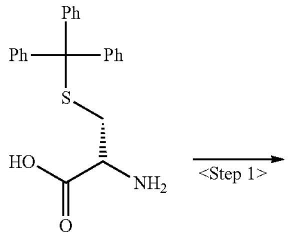

-continued

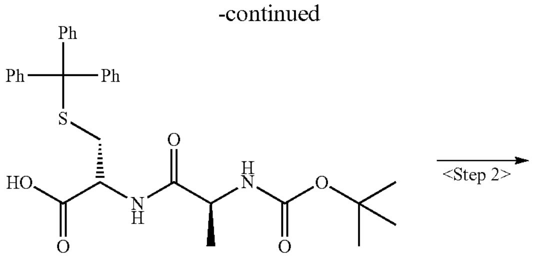

(EX14-IM-1)

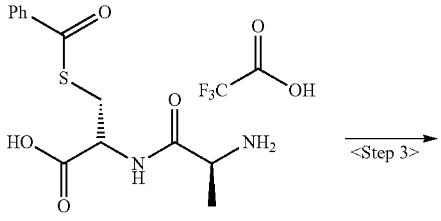

(EX14-IM-2)

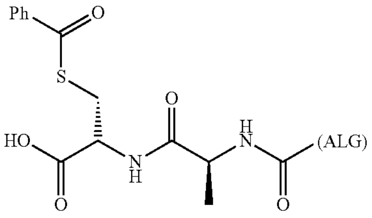

(AL-EX-14)

Step 1

Synthesis of N-((tert-butoxycarbonyl)-L-alanyl)-S-trityl-L-cysteine (EX14-IM-1)

(Tert-butoxycarbonyl)-L-alanine [CAS. 15761-38-3] (260.5 mg) was dissolved in tetrahydrofuran (20 mL). N-methylmorpholine (151 μL) and isobutyl chloroformate (181 μL) were added gradually to this solution under ice cooling and stirring. This mixture was then stirred for 25 minutes at that temperature. Commercial S-trityl-L-cysteine [CAS. 2799-07-7] (500.3 mg) was then added under ice cooling and stirring, and the mixture was stirred for 1 hour at that temperature and for 1 hour and 40 minutes at room temperature, after which water (10 mL) and 1N-hydrochloric acid (10 mL) were added to stop the reaction. The reaction solution was extracted 3 times with ethyl acetate (10 mL), and the organic layer was washed successively with water (5 mL) and brine (5 mL) and dried with anhydrous sodium sulfate. The organic layer was filtered and then concentrated under reduced pressure, and the resulting crude product was purified by silica gel column chromatography (25% ethyl acetate/heptane to 100% ethyl acetate, ethyl acetate to 15% methanol/ethyl acetate) to obtain the title compound (0.674 g) as a white amorphous substance.

Step 2

Synthesis of N-(L-alanyl)-S-benzoyl-L-cysteine trifluoroacetic acid salt (EX14-IM-2)

The compound EX14-IM-1 (0.674 g) obtained in <Step 1> of (Example 14) was dissolved in trifluoroacetic acid (6.1 mL) under ice cooling. The reaction mixture was stirred for 1 hour and 30 minutes at room temperature. Triisopropylsilane (0.26 mL) was added under ice cooling, and the mixture was stirred for 30 minutes at room temperature. Benzoyl chloride (0.335 mL) was then dripped in under ice cooling and stirring, and the mixture was stirred for 17 hours at room temperature. Further benzoyl chloride (0.335 mL) was added under ice cooling and stirring, and the mixture was stirred for 3 hours at room temperature. Diisopropyl ether (80 mL) was added, and the suspension was stirred overnight at room temperature, filtered, and dried under reduced pressure to obtain the title compound (0.271 g) as a beige solid.

Step 3

Synthesis of Alginic Acid (AL-EX-14) Having Introduced N-(L-Alanyl)-S-Benzoyl-L-Cysteine Group 4-(4,6-dimethoxy-1,3,5-triazin-2-yl)-4-methylmorpholinium chloride (121.8 mg) and 1-molar aqueous sodium bicarbonate (91 μL) were added under water cooling and stirring to an aqueous solution (39.5 mL) of sodium alginate adjusted to 1 wt % (MOCHIDA PHARMACEUTICAL CO., LTD., A-2). A mixture of the compound EX14-IM-2 (37.5 mg) obtained in <Step 2> of (Example 14), water (1 mL) and ethanol (1 mL) was then dripped in at that temperature. The reaction mixture was stirred for 66 hours at room temperature. Sodium chloride (400 mg) was added, followed by ethanol (79 mL), and the mixture was stirred at room temperature for 30 minutes. The resulting precipitate was collected by filtration, washed with ethanol, and dried under reduced pressure. The resulting solid was dissolved in water, filtered, and then lyophilized to obtain the title compound (0.325 g) as a white solid.

Example 14.1

Preparation of Alginic Acid Having Introduced Sodium L-Alanyl-L-Cysteinate Group (AL-EX-14.1)

[C127]

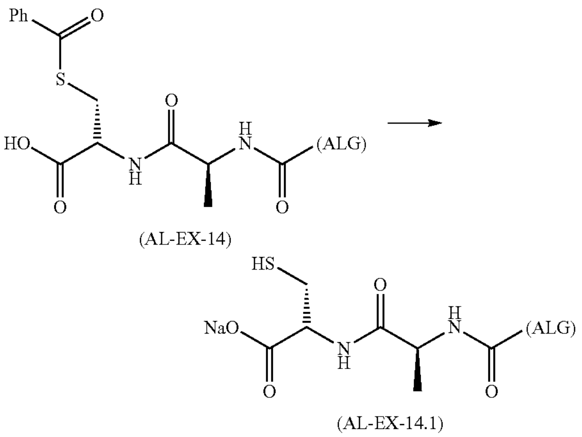

The compound AL-EX-14 (100 mg) obtained in <Step 3> of (Example 14) was dissolved in water (4957 μL), 1N-sodium hydroxide aqueous solution (42 μL) was added, and the mixture was stirred for 2 hours at room temperature to obtain a 2 wt % solution of the title compound.

Example 15

Synthesis of alginic acid (AL-EX-15) having introduced N-(3-aminopropanoyl)-S-benzoyl-L-cysteine group

[C128]

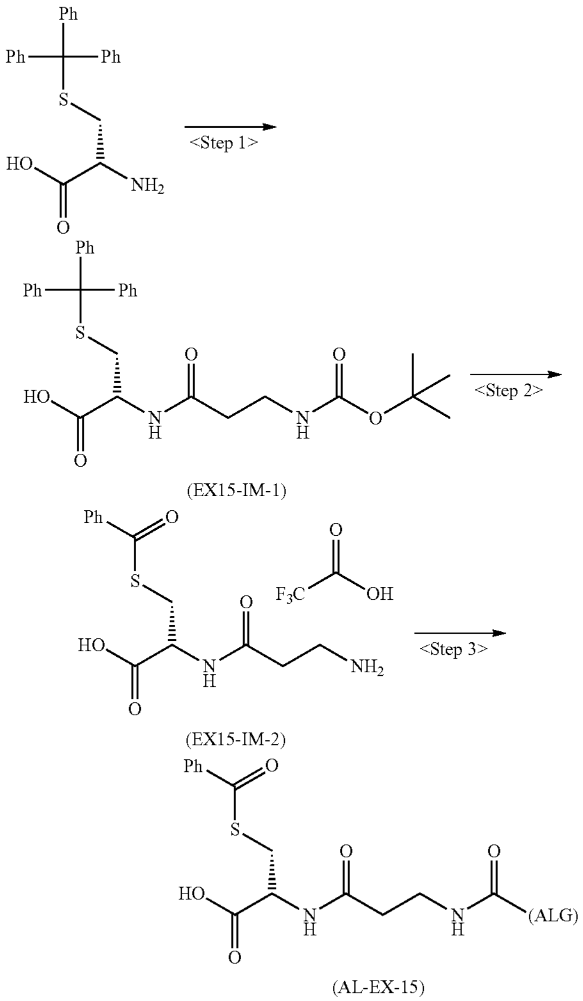

Step 1

Synthesis of N-(3-((tert-butoxycarbonyl)amino)propanoyl)-S-trityl-L-cysteine (EX15-IM-1)

The title compound (0.445 g) was obtained as a white amorphous substance by the same operations as in <Step 1> of (Example 14) using commercial N-(tert-butoxycarbonyl)-beta-alanine [CAS: 3303-84-2] (260.5 mg), tetrahydrofuran (20 mL), N-methylmorpholine (151 μL), isobutyl chloroformate (181 μL) and commercial S-trityl-L-cysteine [CAS: 2799-07-7] (500 mg).

Step 2

Synthesis of N-(3-aminopropanoyl)-S-benzoyl-L-cysteine trifluoroacetic acid salt (EX15-IM-2)

The compound EX15-IM-1 (0.445 g) obtained in <Step 1> of (Example 15) was dissolved in trifluoroacetic acid (8.9 mL) under ice cooling. The reaction mixture was stirred at room temperature for 70 minutes. Triisopropylsilane (0.18 mL) was added under ice cooling, and the mixture was stirred for 20 minutes at room temperature. Benzoyl chloride (0.19 mL) was then added at room temperature, and the mixture was stirred at room temperature for 17 hours and 50 minutes. Further benzoyl chloride (0.095 mL) was then added at room temperature, the mixture was stirred for 4 hours at that temperature, the same amount of benzoyl chloride was added, and the mixture was stirred for 18 hours at room temperature. Benzoyl chloride (0.19 mL) was then added at room temperature, and the mixture was stirred for 2 hours and 40 minutes at that temperature. Diisopropyl ether (50 mL) was added, and the suspension was stirred for 4 hours at room temperature, filtered, and dried under reduced pressure to obtain a mixture of EX15-IM-1 and the title compound (0.445 g). Part of this mixture (0.1876 g) was dissolved in trifluoroacetic acid (1.69 mL). Next, benzoyl chloride (0.18 mL) was added at room temperature, and the mixture was stirred for 3 hours at that temperature. Diisopropyl ether (20 mL) was added, and the suspension was stirred overnight at room temperature, filtered, and dried under reduced pressure to obtain the title compound (0.1055 g) as a white solid.

Step 3

Synthesis of Alginic Acid (AL-EX-15) Having Introduced N-(3-Aminopropanoyl)-S-Benzoyl-L-Cysteine Group The title compound (0.348 g) was obtained by the same operations as in <Step 3> of (Example 14) using an aqueous solution (39.5 mL) of sodium alginate adjusted to 1 wt % (MOCHIDA PHARMACEUTICAL CO., LTD., A-2) and the compound EX15-IM-2 (37.5 mg) obtained in <Step 3> of (Example 15).

Example 15.1

Preparation of Alginic Acid (AL-EX-15.1) Having Introduced Sodium (3-Aminopropanoyl)-L-Cysteinate Group

[C129]

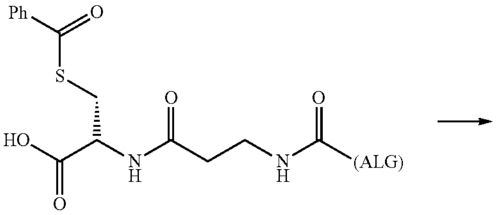

(AL-EX-15)

-continued

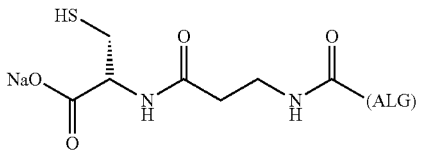

(AL-EX-15.1)

The compound AL-EX-15 (100 mg) obtained in <Step 3> of (Example 15) was dissolved in water (4957 μL), 1N-sodium hydroxide aqueous solution (42 μL) was added, and the mixture was stirred for 2 hours at room temperature to prepare a 2 wt % solution of the title compound.

Example 16

Synthesis of alginic acid (AL-EX-16) having introduced S-benzoyl-N-glycyl-L-prolyl-L-cysteine group

[C130]

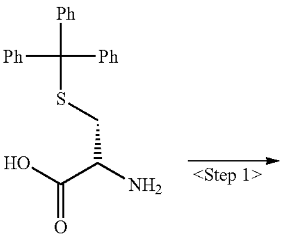

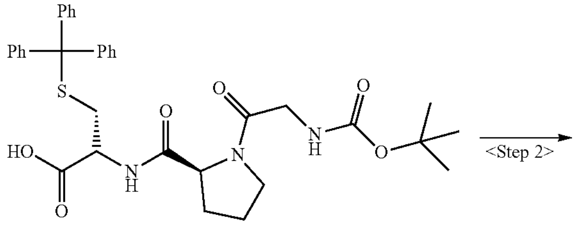

(EX16-IM-1)

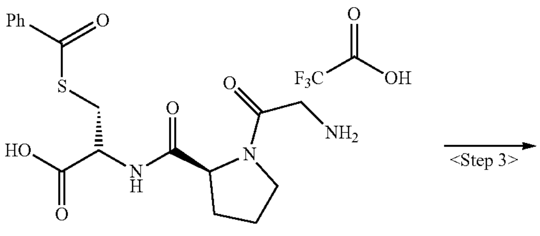

(EX16-IM-2)

-continued

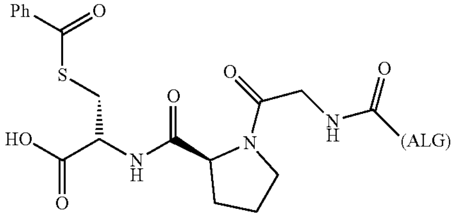

(AL-EX-16)

Step 1

Synthesis of N-(tert-butoxycarbonyl)glycyl-L-prolyl-S-trityl-L-cysteine (EX16-IM-1)

The title compound (0.453 g) was obtained as a white amorphous substance by the same operations as in <Step 1> of (Example 14) using commercial (tert-butoxycarbonyl) glycyl-L-proline [CAS: 14296-92-5] (374.3 mg), tetrahydrofuran (20 mL), N-methylmorpholine (151 μL), isobutyl chloroformate (181 μL) and commercial S-trityl-L-cysteine [CAS: 2799-07-7] (500 mg).

Step 2

Synthesis of S-benzoyl-N-glycyl-L-prolyl-L-cysteine trifluoroacetic acid salt (EX16-IM-2)

The title compound (0.2251 g) was obtained as a beige solid by the same operations as in <Step 2> of (Example 14) using the compound EX16-IM-1 (0.453 g) obtained in <Step 1> of (Example 16), trifluoroacetic acid (4.1 mL), triisopropylsilane (0.15 mL) and benzoyl chloride (0.45 mL).

Step 3

Synthesis of Alginic Acid (AL-EX-16) Having Introduced S-Benzoyl-N-Glycyl-L-Prolyl-L-Cysteine Group The title compound (0.376 g) was obtained as a white solid by the same operations as in <Step 3> of (Example 14) using an aqueous solution (39.5 mL) of sodium alginate adjusted to 1 wt % (MOCHIDA PHARMACEUTICAL CO., LTD., A-2) and the compound EX16-IM-2 (45.1 mg) obtained in <Step 3> of (Example 16).

Example 16.1

Preparation of Alginic Acid (AL-EX-16.1) Having Introduced Sodium Glycyl-L-Prolyl-L-Cysteinate Group

[C131]

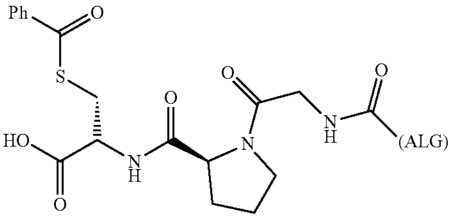

(AL-EX-16)

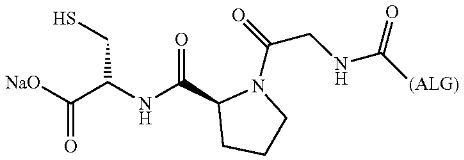

(AL-EX-16.1)

The compound AL-EX-16 (30 mg) obtained in <Step 3> of (Example 16) was dissolved in water (1484 μL), 1N-sodium hydroxide aqueous solution (16 μL) was added, and the mixture was stirred for 2 hours at room temperature to prepare a 2 wt % solution of the title compound.

TABLE 2

Physical property data for alginic acid derivatives

| Compound | Introduction rate of reactive group(mol %) (NMR integration ratio) | Molecular weight(Da) | Weight-average molecular weight(Da) |
|---|---|---|---|
| AL-EX-1 | 5.3 | 2,610,000 to 19,000 | 1,460,000 |
| AL-EX-2 | 4.4 | 2,730,000 to 11,000 | 1,440,000 |
| AL-EX-3 | 3.7 | 2,720,000 to 11,000 | 1,440,000 |
| AL-EX-4 | 4.8 | 2,730,000 to 2,000 | 1 360,000 |
| AL-EX-5 | 6.0 | 2,770,000 to 6,000 | 1,460,000 |
| AL-EX-6 | 5.3 | 2,870,000 to 20,000 | 1,430,000 |
| AL-EX-7 | 5.6 | 2,770,000 to 14,000 | 1,420,000 |
| AL-EX-8 | 4.2 | 2,610,000 to 21,000 | 1,420,000 |
| AL-EX-9 | 5.0 | 2,500,000 to 23,000 | 1,480,000 |
| AL-EX-10 | 3.1 | 2,630,000 to 9,000 | 1,400,000 |
| AL-EX-11 | 1.4 | 2,490,000 to 16,000 | 1,410,000 |
| AL-EX-12 | 2.5 | 2,640,000 to 15,000 | 1,420,000 |
| AL-EX-13 | 3.1 | 2,480,000 to 19,000 | 1,400,000 |
| AL-EX-14 | 1.4 | 2,450,000 to 25,000 | 1,380,000 |
| AL-EX-15 | 1.0 | 2,460,000 to 35,000 | 1,410,000 |
| AL-EX-16 | 3.2 | 2,510,000 to 16,000 | 1,390,000 |

TABLE 3-1

NMR data for intermediate compounds

| Compound | NMR data |
|---|---|
| EX1-IM-1 | (CDCl$_3$) (δ: ppm): 6.71(2H, s), 4.72(1H, brs), 3.66(2H, t, J = 6 Hz), 3.33 (2H, q, J = 6 Hz), 1.40(9H, s) |
| EX1-IM-2 | (D$_2$O) (δ: ppm): 6.86(2H, s), 3.80(2H, t, J = 6 Hz), 3.20(2H, t, J = 6 Hz) |
| EX2-IM-1 | (CDCl$_3$) (δ: ppm): 6.71(2H, s), 4.87(1H, brs), 3.72(2H, t, J = 6 Hz), 3.59 (2H, t, J = 6 Hz), 3.49(2H, t, J = 5 Hz), 3.26(2H, q, J = 5 Hz), 1.44(9H, s) |

TABLE 3-1-continued

| NMR data for intermediate compounds | |
|---|---|
| Compound | NMR data |
| EX2-IM-2 | (DMSO-$d_6$) (δ: ppm): 7.73(3H, brs), 7.04(2H, s), 3.63-3.53(6H, m), 2.98-2.89(2H, m) |
| EX3-IM-1 | ($CDCl_3$) (δ: ppm): 5.15(1H, brs), 3.63-3.60(4H, m), 3.55(2H, t, J = 5 Hz), 3.52(2H, t, J = 5 Hz), 3.32(2H, q, J = 5 Hz), 2.88(2H, t, J = 5 Hz), 1.45 (9H, s) |
| EX3-IM-2 | ($CDCl_3$) (δ: ppm): 6.70(2H, s), 5.01(1H, brs), 3.76-3.72(2H, m), 3.67-3.63 (2H, m), 3.61-3.58(2H, m), 3.57-3.54(2H, m), 3.50(2H, t, J = 5 Hz), 3.29 (2H, q, J = 5 Hz), 1.45(9H, s) |
| EX3-IM-3 | ($CDCl_3$) (δ: ppm): 8.22(3H, brs), 6.74(2H, s), 3.75-3.71(4H, m), 3.64-3.57 (6H, m), 3.19(2H, t, J = 5 Hz) |
| EX4-IM-1 | ($CDCl_3$) (δ: ppm): 6.72(2H, s), 6.59(1H, br s), 5.18(1H, br s), 3.74(2H, d, J = 6 Hz), 3.72- 3.68(2H, m), 3.50-3.46(2H, m), 1.45(9H, s). |
| EX4-IM-2 | (DMSO-$d_6$) (δ: ppm): 8.45(1H, t, J = 6 Hz), 8.00(3H, br s), 7.03(2H, s), 3.48(2H, t, J = 6 Hz), 3.43(2H, q, J = 6 Hz), 3.29(2H, q, J = 6 Hz). |
| EX5-IM-1 | ($CDCl_3$) (δ: ppm): 7.30-7.27(2H, m), 7.23-7.17(3H, m), 6.68(2H, s), 6.19 (H, br s), 4.91(1H, br s), 4.30-4.26(1H, m), 3.66-3.53(2H, m), 3.50-3.41 (1H, m), 3.36-3.30(1H, m), 3.08-2.98(2H, m), 1.39(9H, s) |
| EX5-IM-2 | (DMSO-$d_6$) (δ: ppm): 8.57(1H, t, J = 6 Hz), 8.07(3H, br s), 7.36-7.33 (2H, m), 7.30-7.22(3H, m), 7.05(2H, s), 3.85(1H, dd, J = 8.6 Hz), 3.45-3.40 (3H, m), 3.18-3.13(1H, m), 3.01(1H, dd, J = 14.5 Hz), 2.83(1H, dd, J = 14.9 Hz) |
| EX6-IM-1 | ($CDCl_3$) (δ: ppm): 7.31-7.20(3H, br m), 7.16-7.13(2H, m), 6.65(1H, br s), 5.26(1H, br s), 4.86(1H, br s), 3.88(1H, dd, J = 17.7 Hz), 3.68(1H, dd, J = 17.6 Hz), 3.24-3.05(2H, m), 1.44(9H, s) |
| EX6-IM-2 | ($CDCl_3$) (δ: ppm): 7.29-7.27(2H, m), 7.24-7.16(3H, m), 6.67(2H, s), 6.47 (1H, br s), 6.40(1H, d, J = 8 Hz), 5.14(1H, br s), 4.66-4.60(1H, m), 3.85-3.45(5H, m), 3.29-3.23(1H, m), 3.09(2H, d, J = 7 Hz), 1.44(9H, s) |
| EX6-IM-3 | (DMSO-$d_6$) (δ: ppm) 8.67(1H, d, J = 8 Hz), 8.33(1H, t, J = 6 Hz), 7.89 (3H, br s), 7.29-7.24(2H, m), 7.23-7.17(3H, m), 7.03(2H, s), 4.46-4.40 (1H, m), 3.48-3.41(3H, m), 3.38-3.28(2H, m), 3.17-3.11(1H, m), 2.94(1H, dd, J = 14.4 Hz), 2.67(1H, dd, J = 14.10 Hz) |
| EX7-IM-1 | ($CDCl_3$) (δ: ppm): 7.81(2H, d, J = 8 Hz), 7.44(2H, d, J = 8 Hz), 7.24(1H, brs), 4.96(1H, brs), 4.60(2H, s), 3.56(2H, q, J = 5 Hz), 3.45-3.38(2H, m), 1.43(9H, s) |
| EX7-IM-2 | ($CDCl_3$) (δ: ppm): 7.74(2H, d, J = 8 Hz), 7.33(2H, d, J = 8 Hz), 7.15(1H, brs), 4.96(1H, brs), 4.13(2H, s), 3.54(2H, q, J = 5 Hz), 3.43-3.36(2H, m), 2.36(3H, s), 1.43(9H, s) |
| EX7-IM-3 | (DMSO-$d_6$) (δ: ppm): 8.65(1H, t, J = 6 Hz), 7.85(3H, brs), 7.82(2H, d, J = 8 Hz), 7.38(2H, d, J = 8 Hz), 4.16(2H, s), 3.49(2H, q, J = 6 Hz), 2.97(2H, t, J = 6 Hz), 2.36(3H, s) |
| EX8-IM-1 | ($CDCl_3$) (δ: ppm): 7.95(2H, d, J = 8 Hz), 7.28(2H, d, J = 8 Hz), 6.19(1H, brs), 4.79(1H, brs), 3.90(3H, s), 3.25(2H, q, J = 6 Hz), 3.08-3.01(4H, m), 2.51(2H, J = 8 Hz), 1.57-1.49(2H, m), 1.43(9H, s) |
| EX8-IM-2 | ($CDCl_3$) (δ: ppm): 7.28(2H, d, J = 8 Hz), 7.20(2H, d, J = 8 Hz), 5.95(1H, brs), 4.79(1H, brs), 4.65(2H, s), 3.23(2H, q, J = 6 Hz), 2.99-2.92(4H, m), 2.48(2H, t, J = 7 Hz), 1.54-1.47(2H, m), 1.44(9H, s) |
| EX8-IM-3 | ($CDCl_3$) (δ: ppm): 7.30(2H, d, J = 8 Hz), 7.20(2H, d, J = 8 Hz), 6.13(1H, brs), 4.81(1H, brs), 4.56(2H, s), 3.28-3.21(2H, m), 3.04(2H, q, J = 6 Hz), 2.97(2H, t, J = 8 Hz), 2.48(2H, t, J = 8 Hz), 1.56-1.47(2H, m), 1.43 (9H, s) |
| EX8-IM-4 | ($CDCl_3$) (δ: ppm): 7.19(2H, d, J = 8 Hz), 7.13(2H, d, J = 8 Hz), 6.07(1H, brs), 4.82(1H, brs), 4.08(2H, s), 3.25(2H, q, J = 6 Hz), 3.04(2H, q, J = 6 Hz), 2.94(2H, t, J = 8 Hz), 2.46(2H, t, J = 8 Hz), 2.34(3H, s), 1.56-1.49 (2H, m), 1.43(9H, s) |
| EX8-IM-5 | (DMSO-$d_6$) (δ: ppm): 8.03(1H, t, J = 6 Hz), 7.79(3H, brs), 7.18(2H, d, J = 8 Hz), 7.12(2H, d, J = 8 Hz), 4.07(2H, s), 3.09(2H, q, J = 6 Hz), 2.77 (2H, t, J = 8 Hz), 2.75-2.66(2H, m), 2.38-2.33(2H, m), 2.34(3H, s), 1.68-1.60 (2H, m) |
| EX9-IM-1 | (CDCl3) (δ: ppm): 7.98-7.95(2H, m), 7.60-7.55(1H, m), 7.48-7.43(2H, m), 4.87(1H, brs), 3.40(2H, q, J = 6 Hz), 3.21(2H, t, J = 6 Hz), 1.44(9H, s) |
| EX9-IM-2 | (DMSO-$d_6$) (δ: ppm): 8.17(3H, brs), 7.97-7.92(2H, m), 7.76-7.70(1H, m), 7.63-7.56(2H, m), 3.31(2H, t, J = 7 Hz), 3.06(2H, t, J = 7 Hz) |
| EX9-IM-3 | (CDCl3) (δ: ppm): 7.98-7.94(2H, m), 7.61-7.56(1H, m), 7.48-7.43(2H, m), 6.40(1H, brs), 4.73(1H, brs), 3.55(2H, q, J = 6 Hz), 3.25(2H, t, J = 6 Hz), 3.16(2H, q, J = 6 Hz), 2.21(2H, t, J = 7 Hz), 1.83-1.75(2H, m), 1.43 (9H, s) |
| EX9-IM-4 | (DMSO-$d_6$) (δ: ppm): 8.26(1H, t, J = 6 Hz), 7.94-7.90(2H, m), 7.89(3H, brs), 7.72-7.67(1H, m), 7.59-7.54(2H, m), 3.31(2H, q, J = 6 Hz), 3.14(2H, t, J = 7 Hz), 2.82-2.73(2H, m), 2.19(2H, t, J = 7 Hz), 1.82-1.73(2H, m) |
| EX10-IM-1 | (CDCl3) (δ: ppm): 5.42-5.38(1H, br m), 4.63-4.59(1H, m), 3.79(3H, s), 3.04-2.92(2H, m), 1.46(9H, s) |
| EX10-IM-2 | (CDCl3) (δ: ppm): 7.95(2H, d, J = 7 Hz), 7.61-7.56(1H, m), 7.45(2H, t, J = 7 Hz), 5.31(1H, d, J = 7 Hz), 4.64-4.61(1H, m), 3.77(3H, s), 3.61-3.50 (2H, m), 1.43(9H, s) |

TABLE 3-1-continued

| NMR data for intermediate compounds | |
|---|---|
| Compound | NMR data |
| EX10-IM-3 | (DMSO-$d_6$) (δ: ppm): 8.57(3H, br s), 7.94-7.92(2H, m), 7.76-7.72(1H, m), 7.61-7.58(2H, m), 4.43(1H, t, J = 6 Hz), 3.76(3H, s), 3.64-3.52(2H, m) |
| EX10-IM-5 | (DMSO-$d_6$) (δ: ppm): 9.05(1H, d, J = 7 Hz), 8.56(3H, br s), 7.91(2H, d, J = 7 Hz), 7.72(1H, t, J = 8 Hz), 7.57(2H, t, J = 8 Hz), 4.72-4.68(1H, m), 4.39(3H, s), 3.60-3.67(3H, m), 1H was overlapped with solvent peak. |
| EX11-IM-1 | (CDCl3) (δ: ppm): 7.37-7.34(6H, m), 7.29-7.26(5H, m), 7.25-7.13(10H, m), 6.30(1H, br s), 5.00(1H, br s), 4.34-4.24(2H, m), 3.03(2H, d, J = 6 Hz), 2.72-2.63(2H, br m), 1.38(9H, s) |
| EX11-IM-2 | (DMSO-d) (δ: ppm): 9.01(1H, br s), 7.92(2H, d, J = 7 Hz), 7.73-7.69 (1H, m), 7.57(2H, t, J = 7 Hz), 7.32-7.26(8H, m), 4.57-4.56(1H, br m), 4.04-4.01(1H, br m), 3.14(1H, d, J = 5 Hz), 3.10(1H, d, J = 5 Hz), 2.94(1H, d, J = 8 Hz), 2.91(1H, d, J = 8 Hz) |
| EX12-IM-1 | (CD30D) (δ: ppm): 7.38-7.35(6H, m), 7.30-7.18(9H, m), 4.27(1H, dd, J = 8, 5 Hz), 3.95-3.85(2H, m), 3.74(2H, br s), 2.65-2.59(2H, m), 1.43 (9H, s) |
| EX12-IM-2 | (DMSO-$d_6$) (δ: ppm): 8.61(1H, t, J = 6 Hz), 8.56(1H, d, J = 8 Hz), 8.01 (3H, br s), 7.93-7.90(2H, m), 7.73-7.68(1H, m), 7.59-7.55(2H, m), 4.56-4.51 (1H, m), 3.91-3.78(2H, m), 3.61-3.56(4H, m), 3.28(1H, dd, J = 14.8 Hz) |
| EX13-IM-1 | (CDCl3) (δ: ppm): 7.40-7.38(7H, m), 7.30-7.28(5H, m), 7.23-7.19(3H, m), 6.50(1H, br s), 5.12(1H, br s), 4.34(1H, br s), 3.89-3.82(1H, br m), 3.69(1H, dd, J = 17, 6 Hz), 2.74-2.71(2H, br m), 1.42(9H, s) |
| EX13-IM-2 | (DMSO-$d_6$) (δ: ppm): 8.88(1H, d, J = 8 Hz), 7.92-7.90(2H, m), 7.73-7.68 (1H, m), 7.60-7.55(2H, m), 4.62-4.57(1H, m), 3.65-3.51(3H, m), 3.32(1H, dd, J = 14.8 Hz) |
| EX14-IM-1 | ($CDCl_3$) (δ: ppm): 7.41-7.38 (6H, m), 7.29-7.25 (8H, m), 7.23-7.18 (3H, m), 6.57 (1H, d, J = 7 Hz), 5.01 (1H, s), 4.29 (1H, dd, J = 13, 6 Hz), 3.25-2.70 (4H, m), 1.41 (9H, s), 1.31 (3H, d, J = 7 Hz), 2H was overlapped with solvent peak, |
| EX14-IM-2 | (DMSO-$d_6$) (δ: ppm): 8.98(1H, d, J = 8 Hz), 8.20 (3H, br s), 7.93 (2H, d, J = 9 Hz), 7.75-7.71 (1H, m), 7.61-7.67 (2H, m), 4.55 (1H, td, J = 8, 5 Hz), 3.88-3.87 (1H, br m), 3.63 (1H, dd, J = 14, 5 Hz), 1.38 (3H, d, J = 8 Hz). 1H was overlapped with solvent peak. |
| EX15-IM-1 | ($CDCl_3$) (δ: ppm): 7.42-7.39 (6H, m), 7.30-7.26( 6H, m), 7.23-7.19 (3H, m), 6.10( 1H, d, J = 7 Hz), 5.13 (1H, br s), 4.33 (1H, d, J = 6 Hz), 3.36 (2H, br s), 2.79-2.68 (2H, m), 2.40-2.29 (2H, m), 1.40 (9H, s). |
| EX15-IM-2 | (DMSO-$d_6$) (δ: ppm) 8.67 (1H, d, J = 8 Hz), 7.93-7.90 (2H, m), 7.83 (3H, br s), 7.72-7.68 (1H, m), 7.59-7.55 (2H, m), 4.53 (1H, td, J = 8, 5 Hz), 3.59 (2H, dd, J = 14, 5 Hz), 3.28 (2H, dd, J = 14, 8 Hz), 2.99-2.94 (2H, m). |
| EX16-IM-1 | ($CDCl_3$) (δ: ppm): 7.37-7.33 (7H, m), 7.30-7.26 (4H, m), 7.24-7.18 (5H, m), 5.50 (1H, s), 4.59 (1H, d, J = 7 Hz), 4.20 (1H, dd, J = 12, 7 Hz), 4.02 (1H, dd, J = 18, 6 Hz), 3.72 (1H, dd, J = 17, 4 Hz), 3.51 (1H, t, J = 8 Hz), 3.39 (1H, dd, J = 17, 10 Hz), 2.73-2.63 (2H, m), 2.36-2.30 (1H, m), 2.20-2.08 (1H, m), 2.04-1.86 2H, m), 1.42 (9H, s). |
| EX16-IM-2 | (DMSO-$d_6$) (δ: ppm): 8.52 (1H, d, J = 8 Hz), 8.20-8.14 (3H, br m), 7.95-7.89 (2H, m), 7.73-7.69 (1H, m), 7.59-7.55 (2H, m), 4.53-4.38(2H, m), 3.79 (1H, d, J = 6 Hz), 3.68-3.26 (5H, m), 2.07-2.01 (1H, m), 1.91-1.78 (3H, m). |

TABLE 4

LC-Mass data for intermediate compounds

| Example | MS-ESI (m/z) [M + H]+ | Retention time (minutes) |
|---|---|---|
| EX6-IM-3 | 345 | 0.57 |
| EX7-IM-3 | 253 | 0.58 |
| EX9-IM-4 | 267 | 0.61 |
| EX11-IM-2 | 373 | 0.70 |
| EX12-IM-2 | 340 | 0.59 |
| EX13-IM-2 | 283 | 0.58 |
| EX14-IM-2 | 297 | 0.66 |
| EX15-IM-2 | 297 | 0.66 |
| EX16-IM-2 | 380 | 0.69 |

<Measuring Introduction Rate of Reactive Group>

The introduction rate of a reactive group is the number of reactive groups introduced relative to the uronic acid monosaccharide units that are repeating units of the alginic acid, represented as a percentage.

In the examples of this Description, the introduction rate of a reactive group or complementary reactive group (mol %) was calculated based on the $^1$H-NMR integration ratio. The amount of alginic acid necessary for calculating the introduction rate can be measured by the carbazole-sulfuric acid method using a calibration curve, while the amount of reactive groups or complementary reactive groups can be measured by absorbance measurement using a calibration curve.

<Measuring Molecular Weight)

An alginic acid solid with introduced crosslinking groups obtained in the examples was weighed, and ultrapure water was added to prepare a 1% aqueous solution. This was then diluted to obtain an alginic acid concentration of 0.2% in a 10 mmol/L phosphoric acid buffer solution (pH 7.4) containing 0.15 mol/L of NaCl. This solution was passed through a polyether sulfone Minisart High Flow filter (Sartorius Co.) with a pore diameter of 0.45 μm or 0.22 μm to eliminate insoluble matter, and 200 μL of this was then supplied to a Superose 6 Increase 10/300 GL column (GE Health Care Sciences) and subjected to gel filtration. Gel filtration was performed at room temperature at a flow rate of 0.8 mL/min using a AKTA Explorer 10S as the chromatograph unit and a 10 mmol/L phosphoric acid buffer (pH 7.4) containing 0.15 mol/L NaCl as the development solvent. Chromatograms were prepared from each sample by monitoring absorption at 220 nm, 240 nm or 235 nm. In a different method, absorption was monitored at 215 nm. Peak analysis of the resulting chromatograms was performed with Unicorn 5.31 software (GE Health Care Sciences).

To determine the molecular weights of the alginic acids having introduced crosslinking groups, gel filtration was performed under the same conditions using blue dextran (molecular weight 2,000,000 Da, SIGMA), thyroglobulin (molecular weight 669,000 Da, GE Health Care Sciences), ferritin (molecular weight 440,000 Da, GE Health Care Sciences), aldolase (molecular weight 158,000 Da, GE Health Care Sciences), conalbumin (molecular weight 75,000 Da, GE Health Care Sciences), ovalbumin (molecular weight 44,000 Da, GE Health Care Sciences), ribonuclease A (molecular weight 13,700 Da, GE Health Care Sciences) and aprotinin (molecular weight 6,500 Da, GE Health Care Sciences) as standard substances, and calibration curves were prepared from the liquid volumes and molecular weights at the absorption peaks for each component at 280 nm. Two calibration curves were prepared, one for blue dextran to ferritin and one for ferritin to aprotinin. Using these calibration curves, the molecular weight (Mi) was calculated at elution time i in the chromatogram obtained above. Next, the absorbance at elution time i was read and given as Hi, and the weight-average molecular weight (Mw) was calculated by the following formula from the data.

$$Mw = \frac{\sum_{i=1}^{\infty}(H^{i \times Mi})}{\sum_{i=1}^{\infty} Hi} \quad \text{[Math. 1]}$$

The molecular weight of the sodium alginate before reactive group introduction was determined as follows. Each alginic acid was weighed taking Loss on drying into consideration, and ultrapure water was added to prepare a 1% aqueous solution. This was then diluted to obtain an alginic acid concentration of 0.2% in a 10 mmol/L phosphoric acid buffer solution (pH 7.4) containing 0.15 mol/L of NaCl. Insoluble matter was removed with a hydrophilic PVDF Mylex GV33 filter (Merck-Millipore) with a pore diameter of 0.22 μm, 200 μL of the sample was supplied to gel filtration, and gel filtration was performed under similar conditions as for the alginic acid having introduced crosslinking groups. Detection was performed with a differential refractometer. In a different method, insoluble matter was removed using a polyether sulfone Minisart High Flow filter (Sartorius) with a pore diameter of 0.45 μm.

The weight-average molecular weight of the sodium alginate before crosslinking group introduction was determined by the same methods used to calculate the molecular weight of the alginic acid having crosslinking groups. However, the Hi was calculated from the differential refractometer data.

The sodium alginate before crosslinking group introduction (KIMICA Corporation, ALG-2) used in (Example 1) to (Example 3) and (Example 7) to (Example 9) was eluted broadly at 2,60,000 Da to 145,000 Da, and the weight-average molecular weight was calculated at 1,460,000 Da.

The sodium alginate before crosslinking group introduction (KIMICA Corporation, ALG-2) used in (Example 4) to (Example 6) was eluted broadly at 9,600 Da to 2,510,000 Da, and the weight average molecular weight was calculated at 1,380,000 Da.

The sodium alginate before crosslinking group introduction (MOCHIDA PHARMACEUTICAL CO., LTD., A-2) used in (Example 10) to (Example 16.1) has the molecular weight shown in Table 1 above.

<Measuring Gel Stability (1)>

An alginic acid derivative (AL-EX-2) manufactured by the same methods as in <Step 3> of (Example 2) was dissolved in water to a concentration of 0.5 wt % to obtain an aqueous alginic acid solution (2-1).

3 times the amount of phosphate-buffered saline (PBS) was added to 2 wt % alginic acid derivative solutions (AL-EX-7.1), (AL-EX-10.1), (AL-EX-11.1), (AL-EX-12.1) and (AL-EX-13.1) manufactured by the same methods as in (Example 7), (Example 10), (Example 11), (Example 12) and (Example 13), respectively, to obtain 0.5 wt % aqueous alginic acid solutions (7-1), (10-1), (11-1), (12-1) and (13-1).

250 μL of the aqueous alginic acid solution (2-1) was mixed with an equal amount of the aqueous alginic acid solution (7-1), (10-1), (11-1), (12-1) or (13-1), 40 mL of a 30 mmol/L calcium chloride solution was added, and the mixture was stirred for 5 minutes to obtain an alginic acid gel. This gel was washed once with 10 mL of PBS to obtain a chemically crosslinked alginic acid gel. 19.5 mL of PBS was added to this gel and shaken at 37° C., and the aqueous solution was collected over time and replenished with PBS in the same amount as the collected amount. After completion of testing, 10 μL of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the amount of alginic acid in the aqueous solution at each point in time was corrected by the previously collected amount of alginic acid, the resulting value was divided by the total amount of alginic acid as calculated from the alginic acid concentration at all time points and the alginic acid concentration after completion of testing, and the resulting value represented as a percentage was given as the collapse rate and used as an indicator of gel stability.

The results shown in FIG. 1 were obtained. The crosslinked alginic acid gel (beads) had a collapse rate of not more than 1% after 24 hours and a collapse rate of not more than 40% after 96 hours, confirming the stability of the gel. That is, this suggests that the prepared structure (beads) maintained its structure over a long period of time due to chemical crosslinking formed by a Michael reaction.

<Measuring Gel Stability (2)>

250 μL of the acid aqueous alginic acid solution (2-1) obtained in <Measuring gel stability (1)> was mixed with an equal amount of the aqueous alginic acid solutions (7-1), (10-1), (11-1), (12-1) and (13-1), 40 mL of a 30 mmol/L calcium chloride solution was added, and the mixture was stirred for 5 minutes to obtain an alginic acid gel. This gel was washed once with 10 mL of saline to obtain a chemically crosslinked alginic acid gel. 19.5 mL of 5 mM ethylenediamine tetraacetic acid dipotassium salt dihydrate (EDTA 2K)/saline solution was added and the mixture was shaken for 24 hours at 37° C., after which the aqueous solution was collected and replenished with 5 mM EDTA 2K/saline solution in the same amount as the collected amount. After completion of testing, 10 μL of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the amount of alginic acid in the aqueous solution at each point in time was corrected by the previously collected amount of alginic acid, the resulting value was divided by the total amount of alginic acid as calculated from the alginic acid concentration at all time points and the alginic acid concentration after completion of testing, and the resulting value represented as a percentage was given as the collapse rate and used as an indicator of gel stability.

Figure 2:
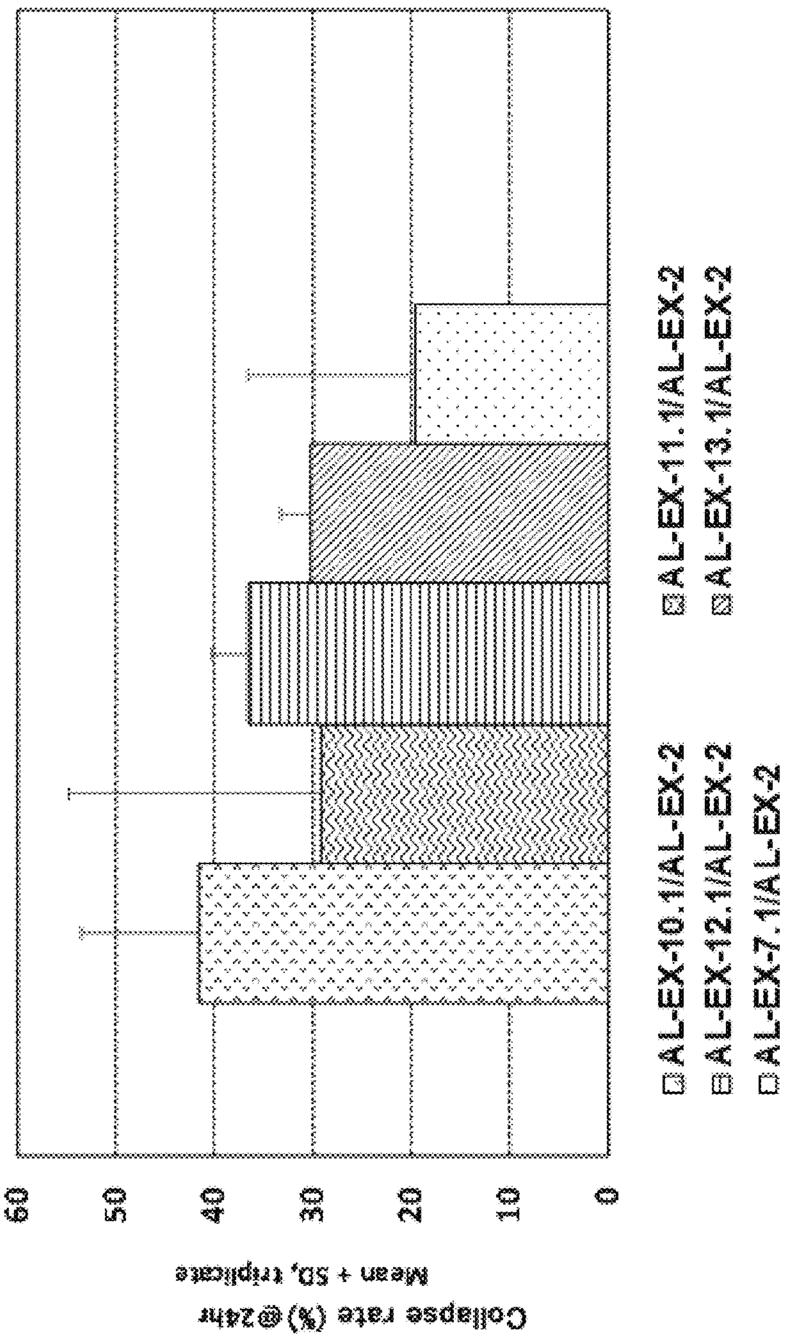
FIG. 2 shows an evaluation of the gel stability of a crosslinked alginic acid structure under EDTA.

The results shown in FIG. 2 were obtained. The crosslinked alginic acid gel (beads) had a collapse rate of about 40% even after 24 hours, confirming the stability of the gel. That is, this suggests that even a structure (beads) prepared under EDTA treatment retains its structure over a long period of time.

<Measuring Gel Stability (3)>

An alginic acid derivative (AL-EX-5) manufactured by the same methods as in <Step 3> of (Example 5) was dissolved in water to a concentration of 1.0 wt % to obtain an aqueous alginic acid solution (5-1). An equal amount of PBS was then added to a 2 wt % alginic acid derivative solution (AL-EX-7.1) manufactured by the same methods as in (Example 7) and to the solutions (AL-EX-10.1), (AL-EX-11.1), (AL-EX-12.1) and (AL-EX-13.1) obtained in (Example 10), (Example 11), (Example 12) and (Example 13) to obtain 1.0 wt % aqueous alginic acid solutions (7-2), (10-2), (11-2), (12-2) and (13-2).

250 μL of the acid aqueous alginic acid solution (5-1) was mixed with an equal amount of the aqueous alginic acid solution (7-2), (10-2), (11-2), (12-2) or (13-2), 40 mL of a 30 mmol/L calcium chloride solution was added, and the mixture was stirred for 5 minutes to obtain an alginic acid gel. This gel was washed once with 10 mL of PBS to obtain a chemically crosslinked alginic acid gel. 19.5 mL of PBS was added to this gel and shaken at 37° C., and the aqueous solution was collected over time and replenished with PBS in the same amount as the collected amount. After completion of testing, 10 μL of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the amount of alginic acid in the aqueous solution at each point in time was corrected by the previously collected amount of alginic acid, the resulting value was divided by the total amount of alginic acid as calculated from the alginic acid concentration at all time points and the alginic acid concentration after completion of testing, and the resulting value represented as a percentage was given as the collapse rate and used as an indicator of gel stability.

Figure 3:
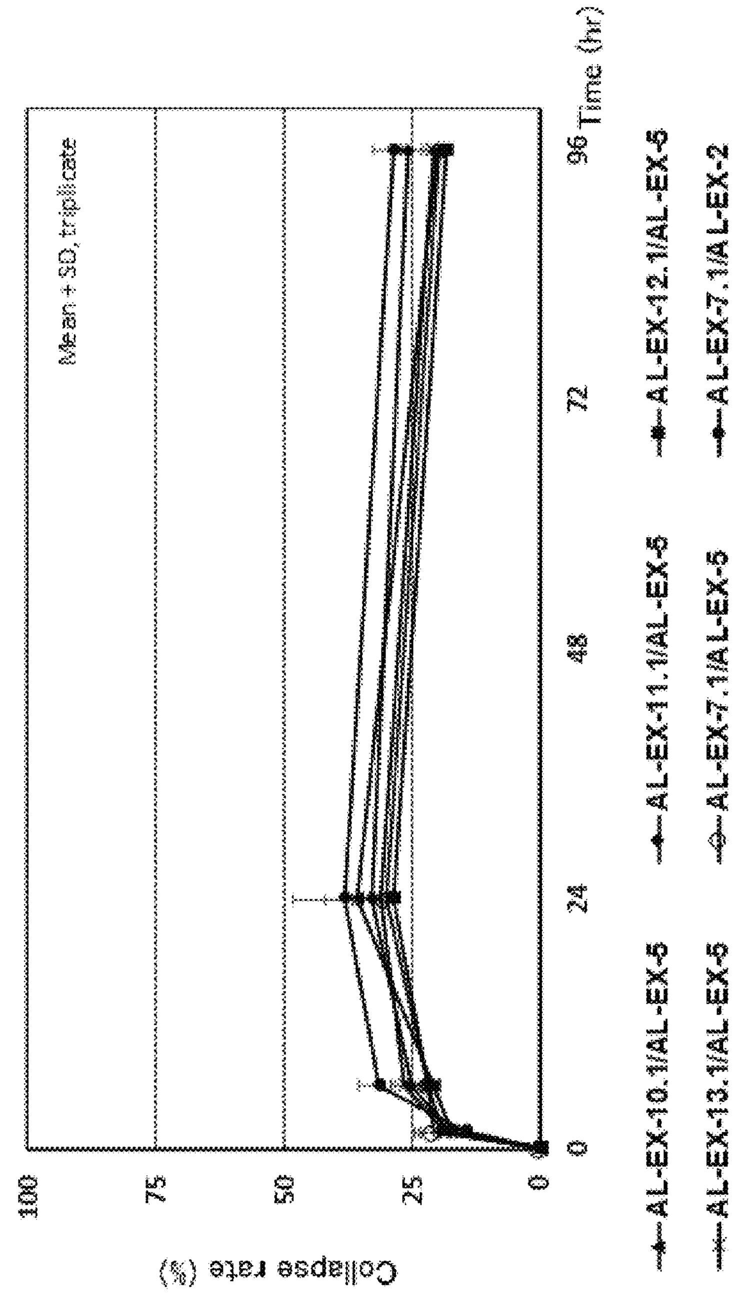
FIG. 3 shows an evaluation of the gel stability of a crosslinked alginic acid structure.

The results shown in FIG. 3 were obtained. Each of the crosslinked alginic acid gels (beads) had a collapse rate of not more than 26% after 96 hours. A crosslinked alginic acid gel prepared from (AL-EX-7.1) and (AL-EX-2) as a control had a collapse rate of 28.8% after 96 hours, suggesting that stability was at least equal to that of the control.

<Measuring Gel Stability (4)>

250 μL of the aqueous alginic acid solution (5-1) obtained in <Measuring gel stability (3)> was mixed with an equal amount of the aqueous alginic acid solution (7-2), (10-2), (11-2), (12-2) or (13-2), 40 mL of a 30 mmol/L calcium chloride solution was added, and the mixture was stirred for 5 minutes to obtain an alginic acid gel. This gel was washed once with 10 mL of physiological saline to obtain a chemically crosslinked alginic acid gel. 19.5 mL of 5 mM EDTA 2K/saline solution was added and shaken for 24 hours at 37° C., after which the aqueous solution was collected and replenished with EDTA 2K/saline solution in the same amount as the collected amount. After completion of testing, 10 μL of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the amount of alginic acid in the aqueous solution at each point in time was corrected by the previously collected amount of alginic acid, the resulting value was divided by the total amount of alginic acid as calculated from the alginic acid concentration at all time points and the alginic acid concentration after completion of testing, and the resulting value represented as a percentage was given as the collapse rate and used as an indicator of gel stability.

Figure 4:
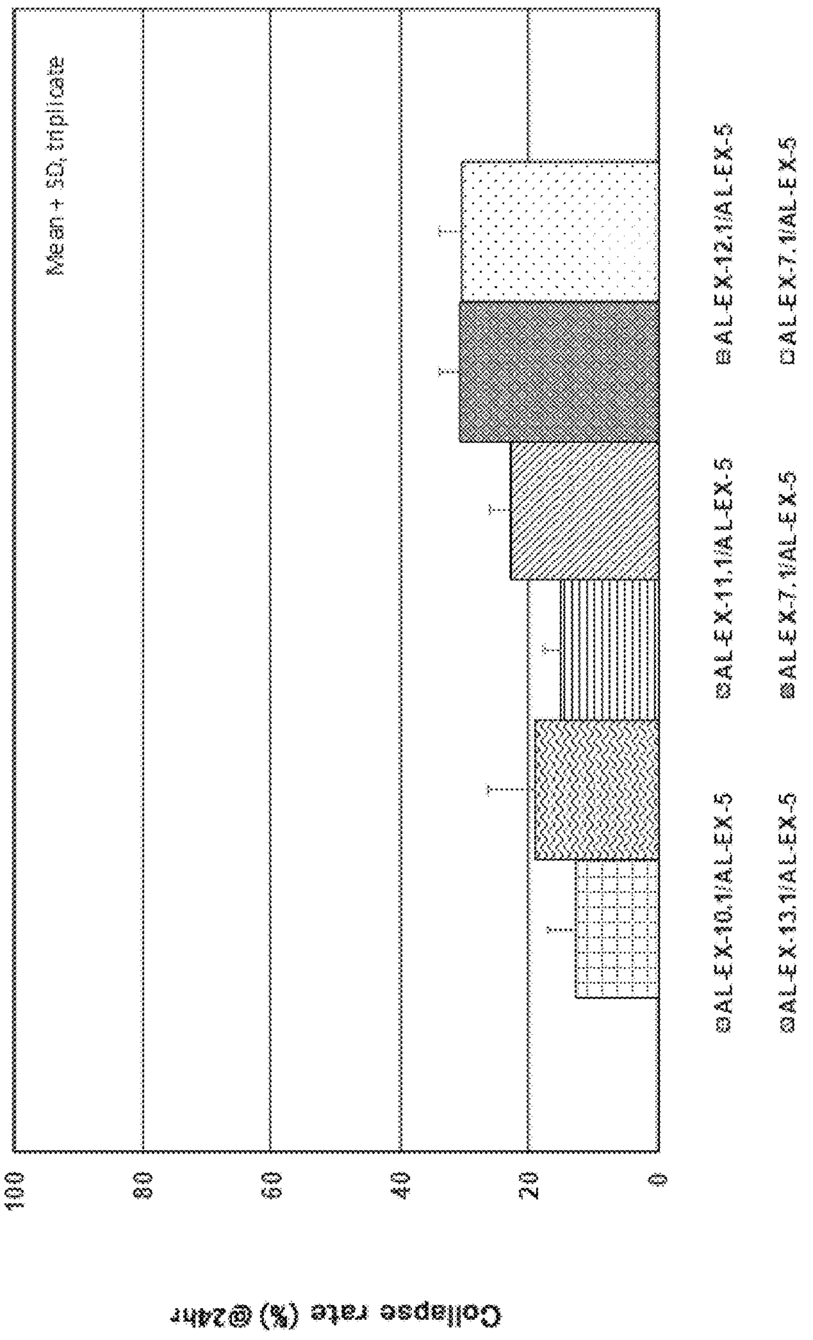
FIG. 4 shows an evaluation of the gel stability of a crosslinked alginic acid structure under EDTA.

The results shown in FIG. 4 were obtained. The crosslinked alginic acid gel (beads) had a collapse rate of about 30% even after 24 hours, confirming the stability of the gel. That is, this suggests that even a structure (beads) prepared under EDTA treatment retains its structure over a long period of time.

<Measuring Gel Stability (5)>

An alginic acid derivative (AL-EX-2) manufactured by the same methods as in <Step 3> of (Example 2) was dissolved in water to a concentration of 1.0 wt % to obtain an aqueous alginic acid solution (2-3).

An equal amount of PBS was then added to a 2 wt % alginic acid derivative solution (AL-EX-7.1) manufactured by the same methods as in (Example 7) and the (AL-EX-16.1) solution to obtain aqueous alginic acid solutions (7-2) and (16-1) with concentrations of 1.0 wt %.

300 μL of the aqueous alginic acid solution (2-3) was mixed with an equal amount of the aqueous alginic acid solution (7-2) or (16-1) and pipetted 3 times. 500 μL of this solution was dispensed into 2.5 mL of 55 mmol/L calcium chloride solution, shaken lightly, and then left standing for 5 minutes. 3.5 mL of calcium chloride solution with the same concentration was added, and the mixture was left standing for 5 minutes. The resulting gel was washed 2 times with 5 mL of saline to obtain a chemically crosslinked alginic acid gel. 19.5 mL of PBS was added to this gel and shaken at 37° C., and the aqueous solution was collected over time and replenished with PBS in the same amount as the collected amount. After completion of testing, 10 μL of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the amount of alginic acid in the aqueous solution at each point in time was corrected by the previously collected amount of alginic acid, the resulting value was divided by the total amount of alginic acid as calculated from the alginic acid concentration at all time points and the alginic acid concentration after completion of testing, and the resulting value represented as a percentage was given as the collapse rate and used as an indicator of gel stability.

Figure 8:
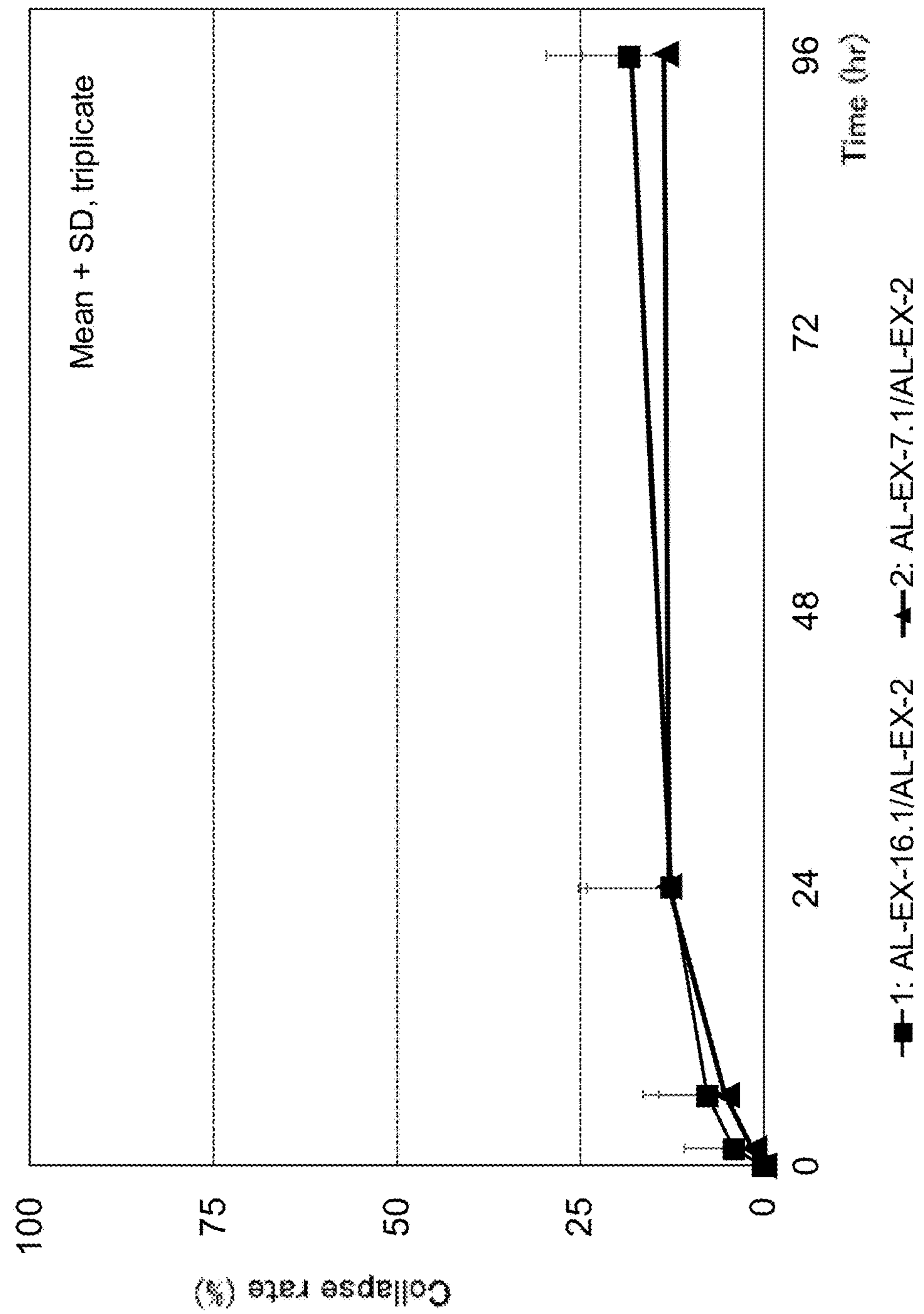
FIG. 8 shows an evaluation of the gel stability of a crosslinked alginic acid structure.

The results shown in FIG. 8 were obtained. The cross-linked alginic acid gel (beads) had a collapse rate of not more than 15% after 24 hours, and a collapse rate of not more than 20% after 96 hours, confirming gel stability. That is, this suggests that the prepared structure (beads) maintained its structure over a long period of time due to chemical crosslinking formed by a Michael reaction.

<Measuring Gel Stability (6)>

Alginic acid derivatives (AL-EX-2) and (AL-EX-5) prepared by the same methods as in <Step 3> of (Example 2) and <Step 3> of (Example 5) were each dissolved in water to a concentration of 1.0 wt % to obtain aqueous alginic acid solutions (2-1) and (5-1). An equal amount of PBS was also added to a 2 wt % alginic acid derivative solution (AL-EX-7.1) manufactured by the same methods as in (Example 7) and to the solutions (AL-EX-14.1), (AL-EX-15.1) and (AL-EX-16.1) obtained in (Example 14), (Example 15) and (Example 16) to obtain 1.0 wt % aqueous alginic acid solutions (7-2), (14-1), (15-1) and (16-1)

300 μL of the aqueous alginic acid solution (2-1) or (5-1) was mixed with an equal amount of the aqueous alginic acid solution (7-2), (14-1), (15-1) or (16-1), and pipetted several times. 500 μL of this solution was dispensed into 2.5 mL of 55 mmol/L calcium chloride solution, shaken lightly, and left standing for 5 minutes. An additional 3.5 mL of calcium chloride solution with the same concentration was added, and the mixture was left standing for 5 minutes. The resulting gel was washed 2 times with 5 mL of saline to obtain a chemically crosslinked alginic acid gel. 19.5 mL of 5 mM ethylenediamine tetraacetic acid dipotassium salt dihydrate (EDTA 2K)/saline solution was added and shaken for 24 hours at 37° C., after which the aqueous solution was collected and replenished with 5 mM EDTA 2K/saline solution in the same amount as the collected amount. After completion of testing, 10 μL of alginate lyase (Nippon Gene, 319-08261) was added to the test solution, which was then shaken overnight at 37° C. to completely collapse the gel, and the aqueous solution was collected. The alginic acid concentration in the collected aqueous solution was measured by the carbazole-sulfuric acid method, the amount of alginic acid in the aqueous solution at each point in time was corrected by the previously collected amount of alginic acid, the resulting value was divided by the total amount of alginic acid as calculated from the alginic acid concentration at all time points and the alginic acid concentration after completion of testing, and the resulting value represented as a percentage was given as the collapse rate and used as an indicator of gel stability.

Figure 9:
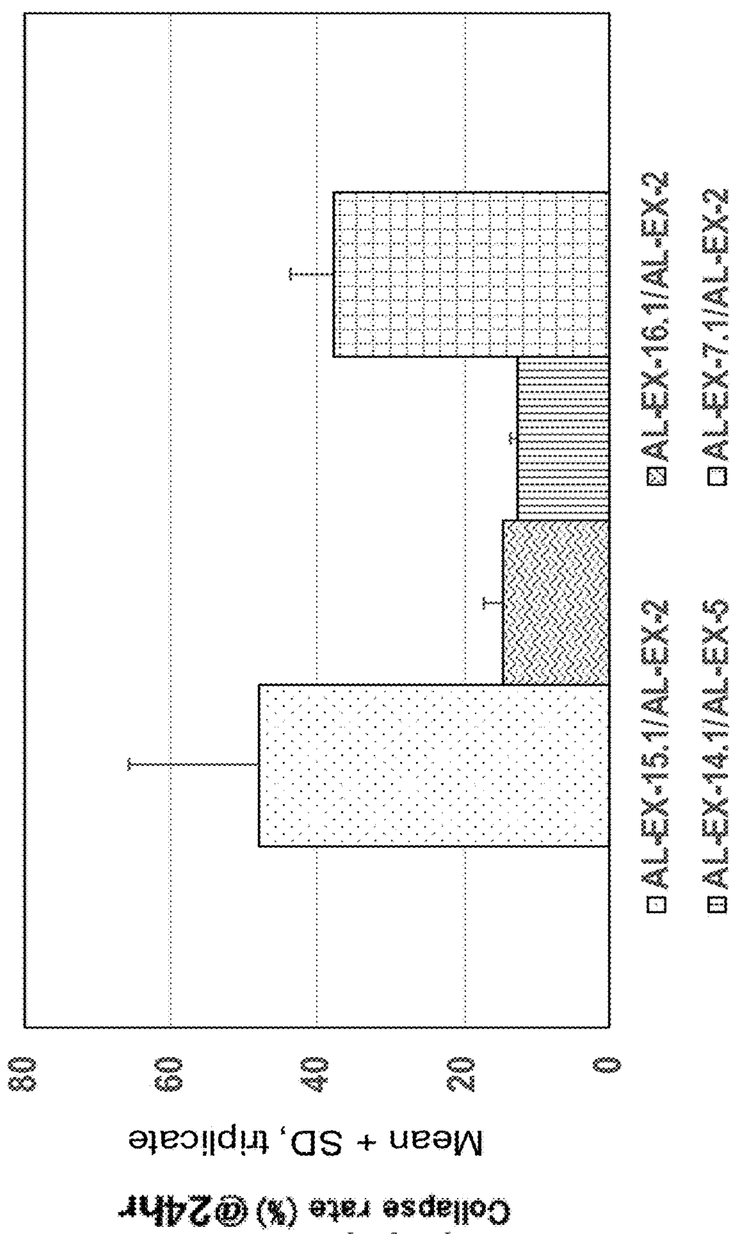
FIG. 9 shows an evaluation of gel stability of a crosslinked alginic acid structure under EDTA.

The results shown in FIG. 9 were obtained. The cross-linked alginic acid gel (beads) had a collapse rate of about 40% even after 24 hours, confirming the stability of the gel. That is, this suggests that even a structure (beads) prepared under EDTA treatment retains its structure over a long period of time.

<Measuring Gel Permeability>

An alginic acid derivative (AL-EX-2) manufactured by the same methods as in <Step 3> of (Example 2) and an alginic acid derivative (AL-EX-5) manufactured by the same methods as in <Step 3> of (Example 5) were each dissolved in water to a concentration of 2.0% to prepare aqueous alginic acid solutions, and 4/5 the volume of fluorescein isothiocyanate-dextran (Sigma-Aldrich, FD150S) with a molecular weight of 150,000 adjusted to a concentration of 1 mg/mL was added together with 2.2 times the volume of PBS to prepare 0.5% aqueous alginic acid solutions (2-2) and (5-2) containing 0.2 mg/mL of fluorescein isothiocyanate-dextran.

3 times the volume of PBS was also added to a 2% alginic acid derivative (AL-EX-7.1) solution, (AL-EX-10.1) solution, (AL-EX-11.1) solution, (AL-EX-12.1) solution and (AL-EX-13.1) solution manufactured by the same methods as in (Example 7), (Example 10), (Example 11), (Example 12) and (Example 13) to adjust the concentrations to 0.5 wt % and obtain aqueous alginic acid solutions (7-1), (10-1), (11-1), (12-1) and (13-1).

250 μL of the aqueous alginic acid solution (2-2) or (5-2) was mixed with an equal amount of the aqueous alginic acid solution (7-1), (10-1), (11-1), (12-1) or (13-1). 40 mL of a 30 mmol/L calcium chloride solution was added, and the mixture was stirred for 5 minutes to obtain an alginic acid gel. This gel was washed once with 10 mL of saline to obtain a chemically crosslinked alginic acid gel containing fluorescein isothiocyanate-dextran. 19.5 mL of saline was added to this gel and shaken at 37° C., and the aqueous solution was collected over time and replenished with PBS in the same amount as the collected amount. After completion of testing, 10 μL of alginate lyase (Nippon Gene, 319-08261) was added to the test solution, which was then shaken for at least 3 hours at 37° C. to completely collapse the gel, and the aqueous solution was collected. The dextran concentration in the collected aqueous solution was measured by fluorescence assay (excitation light: 485 nm, fluorescence: 535 nm), and the amount of dextran at each point in time divided by the amount of dextran after completion of testing was expressed as a percentage and given as the permeation rate.

Figure 5:
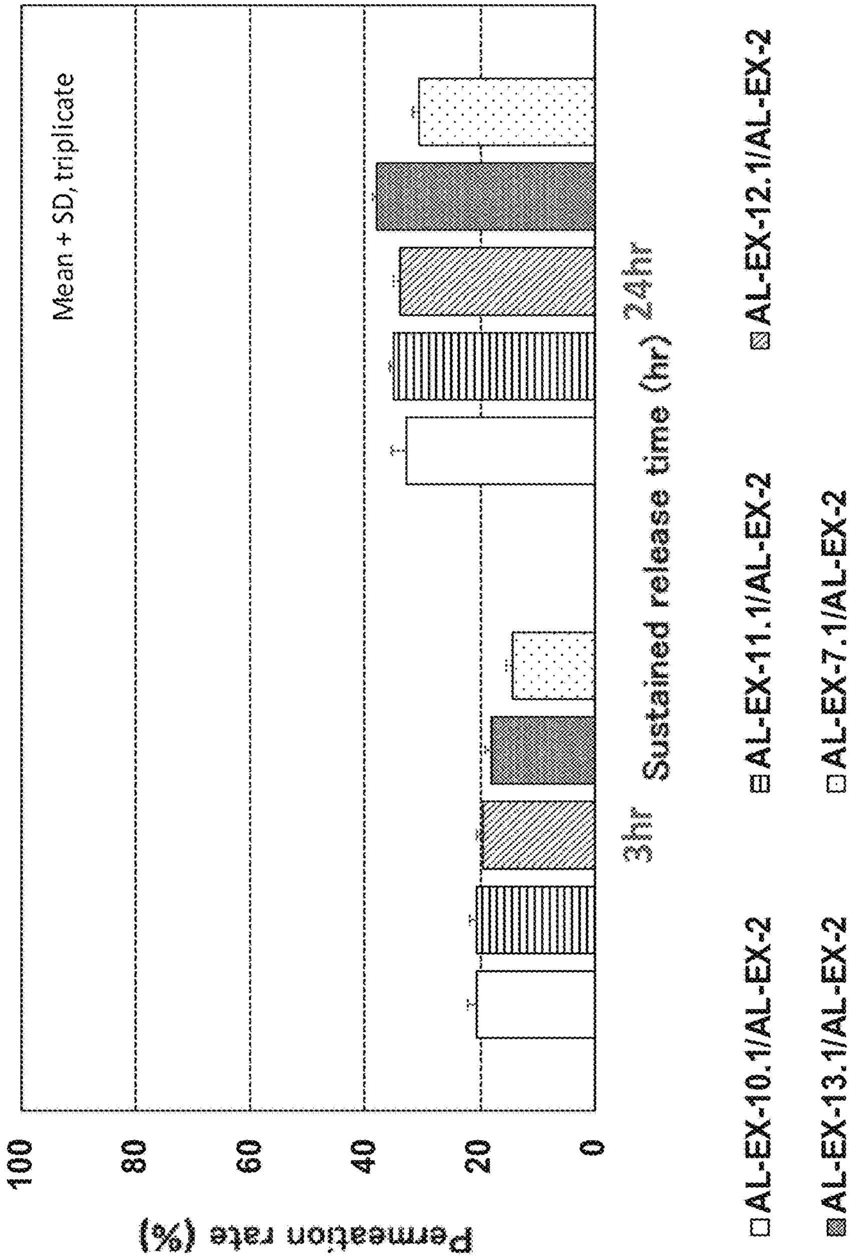
FIG. 5 shows an evaluation of the gel permeability of a crosslinked alginic acid structure.

The results shown in FIG. 5 were obtained. The permeation rate after 3 hours was about 14% to 20%. The permeation rate after 24 hours was about 30% to 37%.

Figure 6:
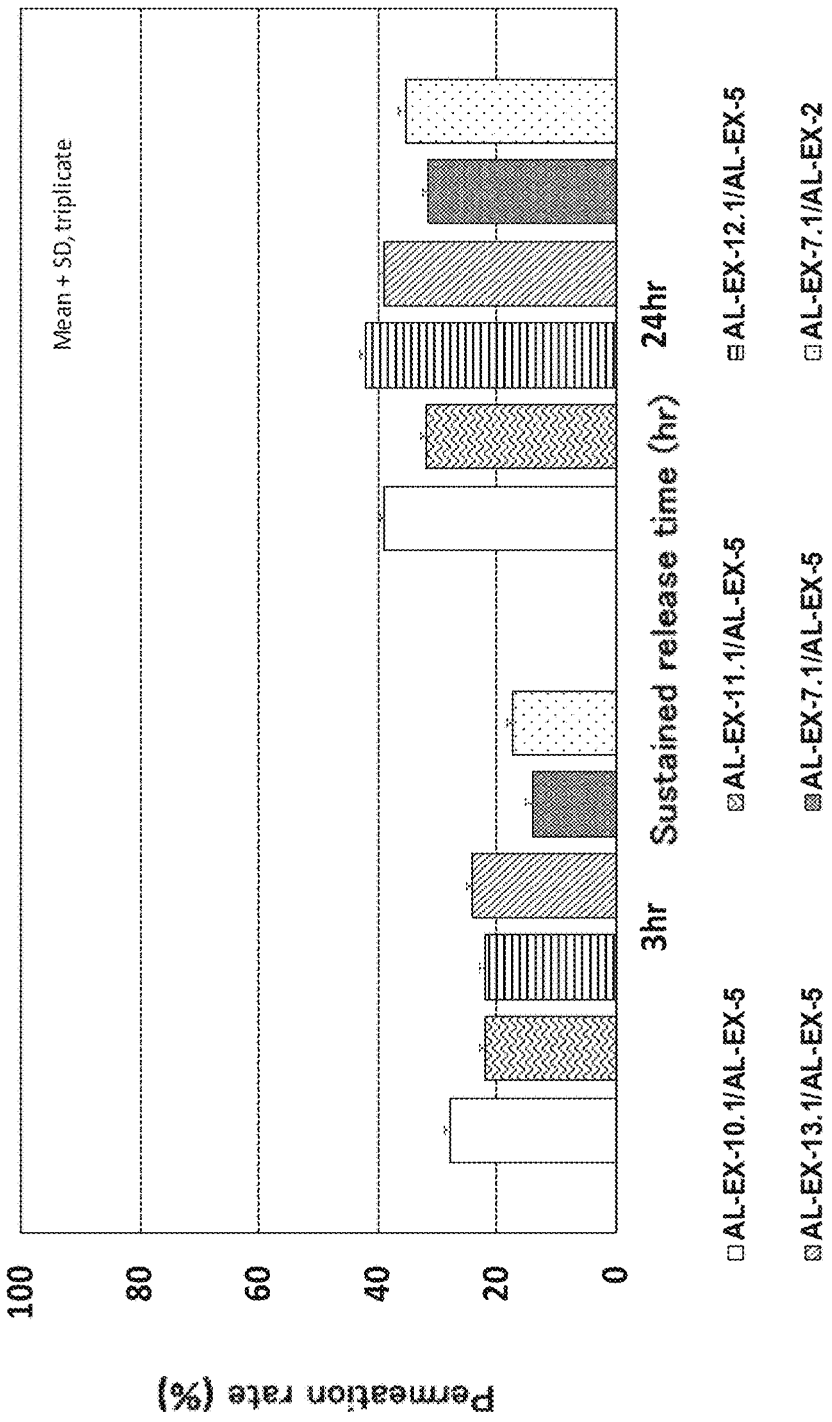
FIG. 6 shows an evaluation of the gel permeability of a crosslinked alginic acid structure.

The results shown in FIG. 6 were also obtained. The permeation rate after 3 hours was about 17% to 27%, and the permeation rate after 24 hours was about 31% to 42%.

<Measuring Gel Permeation Rate (2)>

An alginic acid derivative (AL-EX-2) manufactured by the same methods as in <Step 3> of (Example 2) was dissolved in water to a concentration of 2.0 wt % to prepare an aqueous alginic acid solution. 0.4 mL of fluorescein isothiocyanate-dextran (Sigma-Aldrich, FD150S) with a molecular weight of 150,000 adjusted to a concentration of 1 mg/mL and 0.6 mL of PBS were added to 1.0 mL of this aqueous alginic acid solution to obtain a 1.0% aqueous alginic acid solution (2-4) containing 0.2 mg/mL of fluorescein isothiocyanate-dextran.

Equal amounts of PBS were also added to a 2% alginic acid derivative (AL-EX-7.1) solution and (AL-EX-16.1) solution manufactured as in (Example 7) and (Example 16) to be 1.0 wt % whereby aqueous alginic acid solutions (7-2) and (16-1) were obtained.

300 μL of the aqueous alginic acid solution (2-4) was mixed with an equal amount of the aqueous alginic acid solution (7-2) or (16-1) and pipetted 3 times. 500 μL of this solution was dispensed into 2.5 mL of 55 mmol/L calcium chloride solution, shaken lightly, and left standing for 5 minutes. An additional 3.5 mL of calcium chloride solution with the same concentration was added, and the mixture was left standing for 5 minutes. This gel was washed 2 times with 5 mL of saline to obtain a chemically crosslinked alginic acid gel containing fluorescein isothiocyanate-dextran. 19.5 mL of saline was added to this gel and shaken at 37° C., and the aqueous solution was collected over time and replenished with PBS in the same amount as the collected amount.

After completion of testing, 10 μL of alginate lyase (Nippon Gene, 319-08261) was added to the test solution, which was then shaken for at least 3 hours at 37° C. to completely collapse the gel, and the aqueous solution was collected. The dextran concentration in the collected aqueous solution was measured by fluorescence assay (excitation light: 485 nm, fluorescence: 535 nm), and the amount of dextran at each point in time divided by the amount of dextran after completion of texting was expressed as a percentage and given as the permeation rate.

Figure 10:
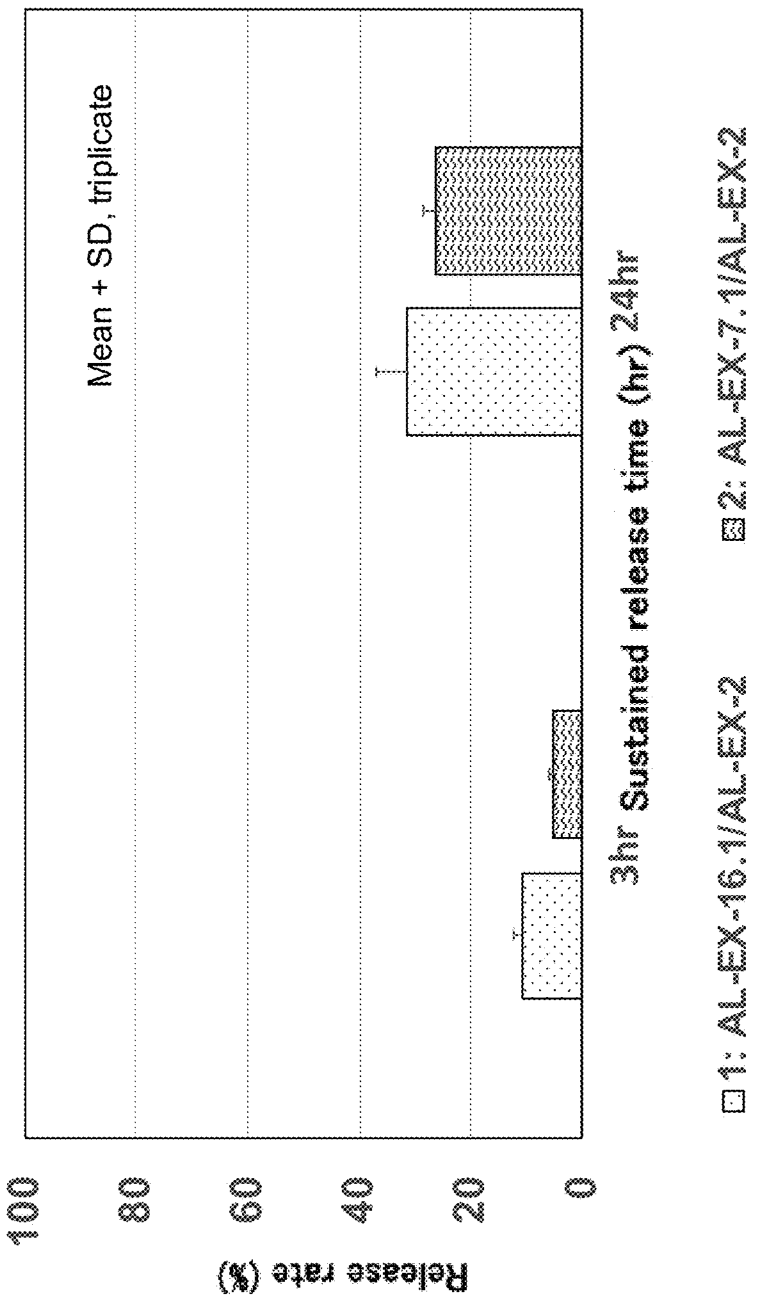
FIG. 10 shows an evaluation of the gel permeability of a crosslinked alginic acid structure.

The results shown in FIG. 10 were obtained. The permeation rate after 3 hours was about 5% to 10%, and the permeation rate after 24 hours was about 26% to 37%.

[Evaluating Biocompatibility]

The alginic acid derivatives (AL-EX-2), (AL-EX-4), (AL-EX-5), (AL-EX-6) and (AL-EX-7.1) obtained in (Example 2), (Example 4), (Example 5), (Example 6) and (Example 7) and solutions (AL-EX-10.1), (AL-EX-11.1), (AL-EX-12.1) and (AL-EX-13.1) manufactured by the same methods as in (Example 10), (Example 11), (Example 12) and (Example 13) were made into PBS solutions with a concentration of 1.0 wt % to obtain aqueous alginic acid solutions.

These were filtered sterilized with a Minisart High Flow (Sartorius 16532GUK) to obtain 1.0% PBS solutions (2), (4), (5), (6), (7), (10), (11), (12) and (13) of alginic acids with introduced crosslinking groups.

HeLa cells were seeded to $5\times10^3$ cells/well on a 96-well plate and cultured for 1 day, the 1.0% PBS solution (2) or (5) of alginic acid with introduced crosslinking groups was added to these cells in combination with the solution (7), (10), (11), (12) or (13) while the solution (4) was also added together with the solution (6) or (7) to a final concentration of 0.1%, and the cells were cultured for 1 day, after which ATP activity was measured with a CellTiter-Glo Luminescent Cell Viability Assay (Promega, G7571) as a measure of cytotoxicity.

Figure 7:
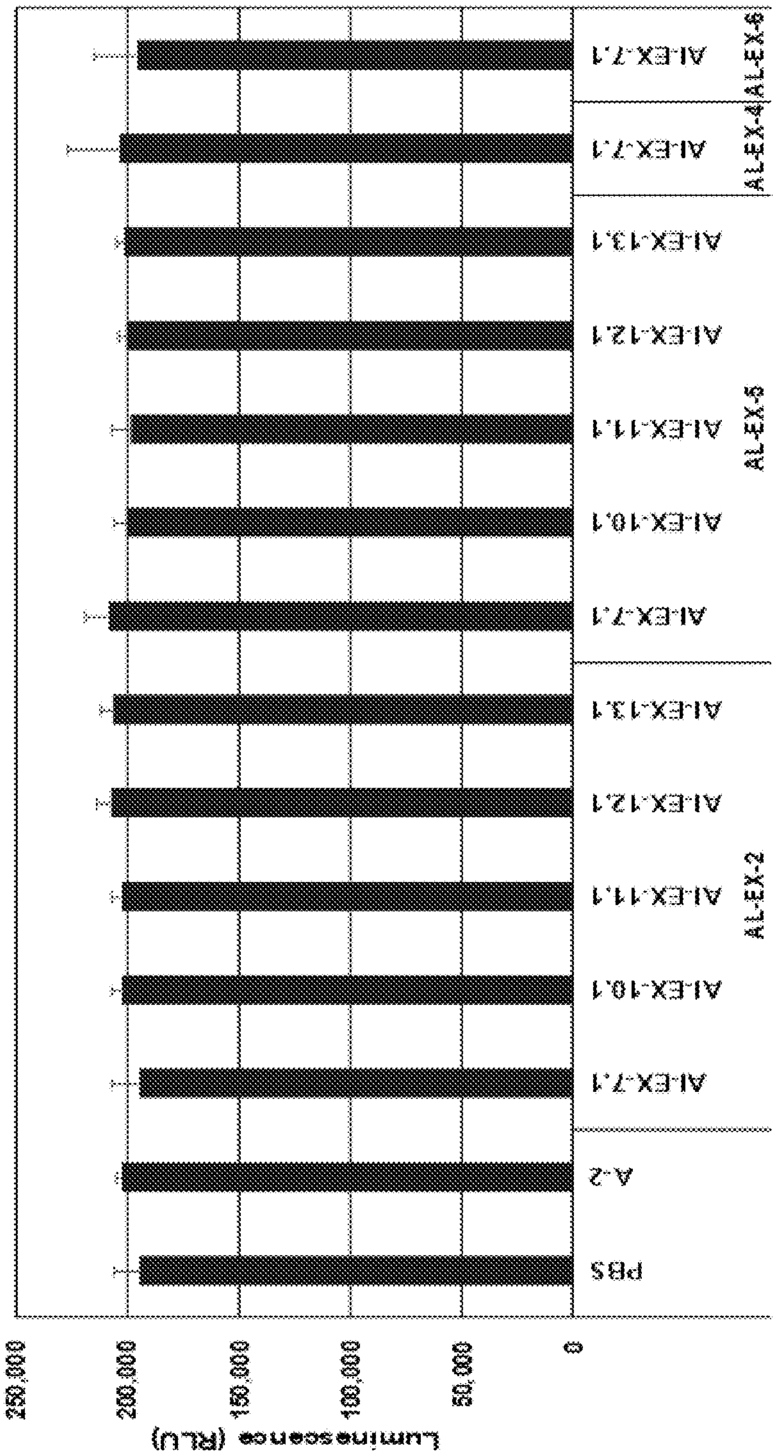
FIG. 7 shows a biocompatibility evaluation of a gel of a crosslinked alginic acid derivative.

The results shown in FIG. 7 were obtained. ATP activity equivalent to that obtained with the PBS and alginic acid (A-2) controls was confirmed with all of the crosslinked alginic acid gels, suggesting that the crosslinked alginic acid gels had no cytotoxicity, and that an alginic acid structure formed with chemical crosslinks by a Michael reaction is biocompatible.

[Evaluating Biocompatibility (2)]

The alginic acid derivatives (AL-EX-2), (AL-EX-5) and (AL-EX-7.1) obtained in (Example 2, (Example 5) and (Example 7) and solutions (AL-EX-14.1), (AL-EX-15.1) and (AL-EX-16.1) manufactured by the same methods as in (Example 14), (Example 15) and (Example 16) were made into PBS solutions with a concentration of 1.0 wt % to obtain aqueous alginic acid solutions.

These were filtered sterilized with a Minisart High Flow (Sartorius 16532GUK) to obtain 1.0% PBS solutions (2), (5), (7), (14), (15) and (16) of alginic acids with introduced crosslinking groups.

HeLa cells were seeded to $5\times10^3$ cells/well on a 96-well plate and cultured for 1 day, the 1.0% PBS solution (2) or (5) of the alginic acid with introduced crosslinking groups was added in combination with the solution (7), (14), (15) or (16) to a final concentration of 0.1%, and the cells were cultured for 1 day, after which ATP activity was measured with a CellTiter-Glo Luminescent Cell Viability Assay (Promega, G7571) as a measure of cytotoxicity.

Figure 11:
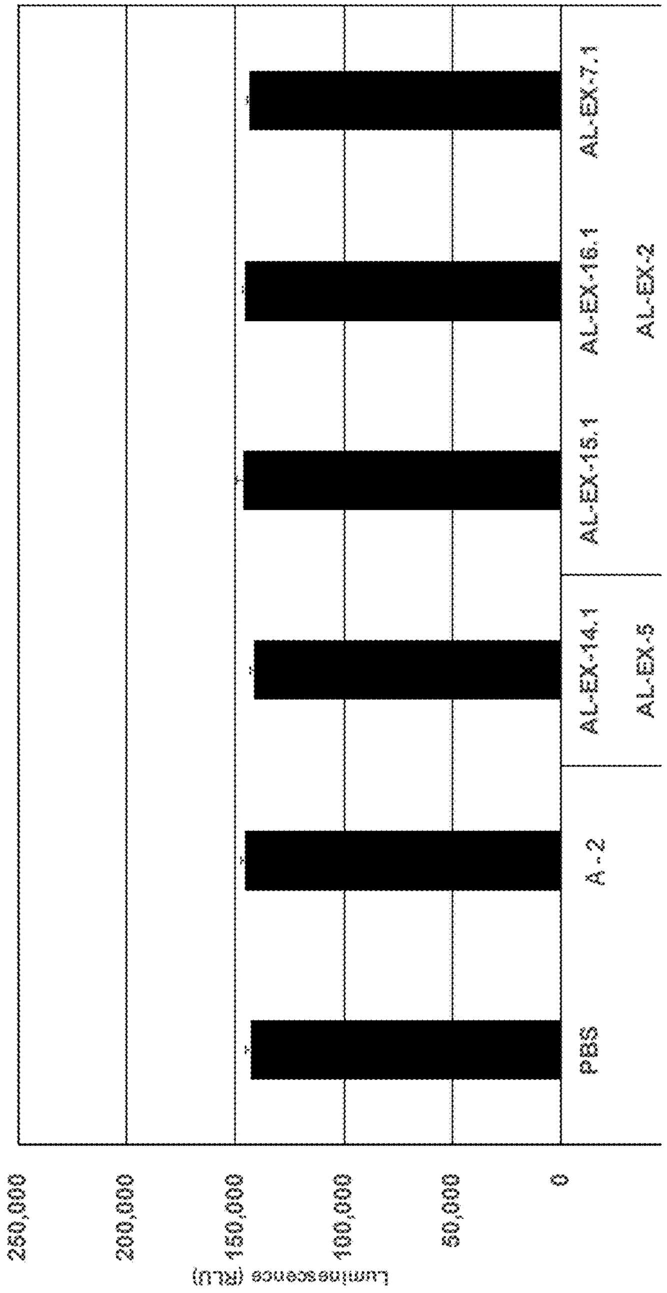
FIG. 11 shows a biocompatibility evaluation of a gel of a crosslinked alginic acid derivative.

The results shown in FIG. 11 were obtained. ATP activity equivalent to that obtained with the PBS and alginic acid (A-2) controls was confirmed with all of the crosslinked alginic acid gels, suggesting that the crosslinked alginic acid gels had no cytotoxicity, and that an alginic acid structure formed with chemical crosslinks by a Michael reaction is biocompatible.

The invention claimed is:

1. A crosslinked alginic acid obtained by performing a crosslinking reaction using an alginic acid derivative represented by formula (I) below:

(I)

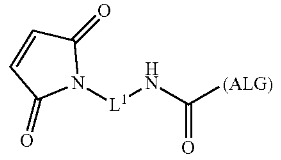

wherein in formula (I), (ALG) represents alginic acid; —NHCO— represents an amide bond via any carboxyl group of alginic acid; and -$L^1$- represents a linker selected from the group consisting of the following partial structural formulae (excluding parts outside broken lines at both ends of each formula):

(L1-1)

(L1-2)

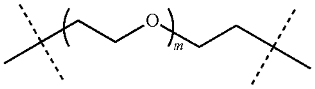

(L1-3)

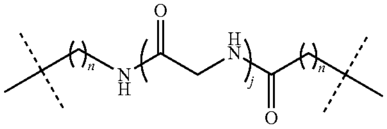

(L1-4)

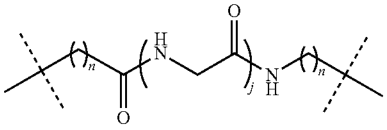

wherein a hydrogen atom of a methylene group (—$CH_2$—) in formulae (L1-1) to (L1-4) may be substituted with multiple groups selected from an oxo group (=O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group, where which M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(=O)—$C_{1-6}$ alkyl group, wherein:

each of $R^a$ and $R^b$ in the above —$NR^aR^b$ group, ($R^aR^b$N)—$C_{1-6}$ alkyl group or ($R^aR^b$N)C(=O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L1-1) to (L1-4) are both substituted with $C_{1-6}$ alkyl groups, the alkyl groups may bind together to form a $C_{3-8}$ cycloalkyl ring;

a —NH— group in formula (L1-3) and formula (L1-4) may form a non-aromatic heterocyclic ring with a substituent binding to an adjacent carbon atom;

n is an integer from 1 to 18;

m is an integer from 1 to 9; and j is an integer from 0 to 9, and the alginic acid derivative represented by formula (II) below:

(II)

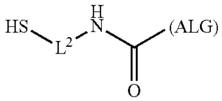

wherein in formula (II), (ALG) represents alginic acid; —NHCO— represents an amide bond via any carboxyl group of alginic acid; and -$L^2$- represents a linker selected from the group consisting of following partial structural formulae (excluding parts outside broken lines at both ends of each formula):

(L2-1)

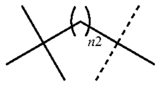

(L2-2)

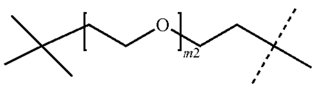

(L2-3)

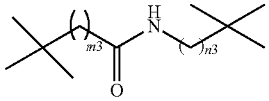

(L2-4)

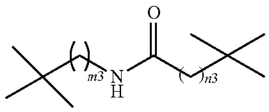

(L2-5)

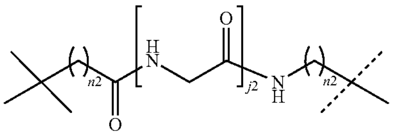

(L2-6)

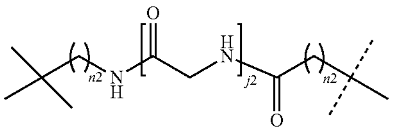

where a hydrogen atom of a methylene group (—$CH_2$—) in formulae (L2-1) to (L2-6) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group, where M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group, wherein:

each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L2-1) to (L2-6) are both substituted with $C_{1-6}$ alkyl groups, the alkyl groups may bind together to form a $C_{3-8}$ cycloalkyl ring;

a —NH— group in formula (L2-3) to formula (L2-6) may form a non-aromatic heterocyclic ring with a substituent binding to an adjacent carbon atom;

m2 is an integer from 1 to 9;

n2 is an integer from 1 to 18;

m3 is an integer from 1 to 10 n3 is an integer from 1 to 10; and j is an integer from 0 to 9.

2. An alginic acid derivative represented by formula (II-P) below:

(II-P)

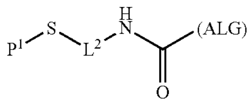

wherein in formula (II-P), (ALG) represents alginic acid; —NHCO— represents an amide bond via any carboxyl group of alginic acid; $P^1$ is a hydrogen atom or a thiol group (—SH group) protecting group; and -$L^2$- represents a linker selected from the group consisting of following partial structural formulae (excluding parts outside broken lines at both ends of each formula):

(L2-1)

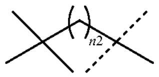

(L2-2)

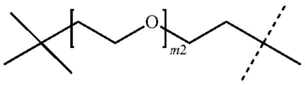

(L2-3)

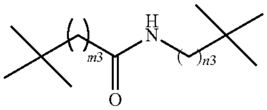

(L2-4)

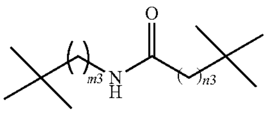

-continued (L2-5)

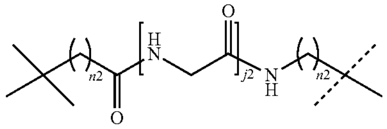

(L2-6)

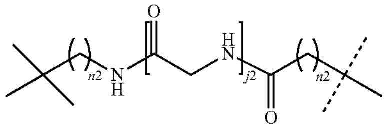

wherein a hydrogen atom of a methylene group (—$CH_2$—) in formulae (L2-1) to (L2-6) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group, where M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group, wherein:

each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L2-1) to (L2-6) are both substituted with $C_{1-6}$ alkyl groups, the alkyl groups may bind together to form a $C_{3-8}$ cycloalkyl ring;

a —NH— group in formula (L2-3) to formula (L2-6) may form a non-aromatic heterocyclic ring with a substituent binding to an adjacent carbon atom;

m2 is an integer from 1 to 9;

n2 is an integer from 1 to 18;

m3 is an integer from 1 to 10 n3 is an integer from 1 to 10; and j is an integer from 0 to 9.

3. The alginic acid derivative according to claim 2, wherein $P^1$ is a hydrogen atom, an acetyl group or a benzoyl group.

4. The alginic acid derivative according to claim 2, wherein -$L^2$- represents a linker selected from the group consisting of following partial structural formulae (excluding parts outside broken lines at both ends of each formula):

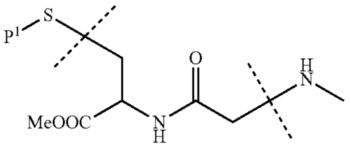

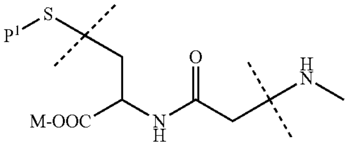

-continued

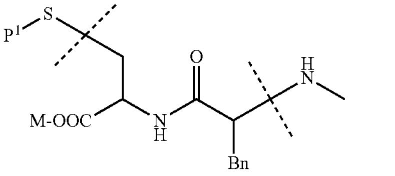

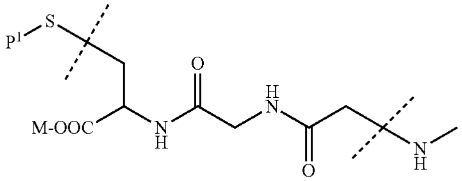

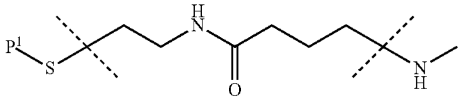

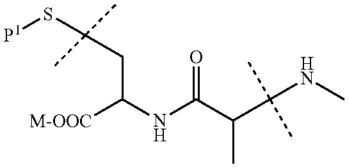

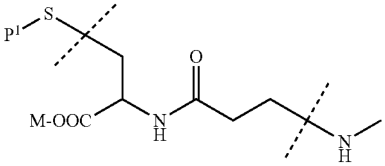

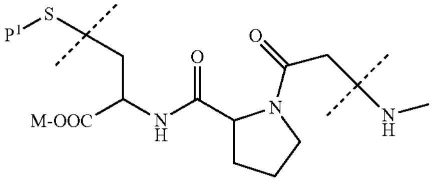

in which M is a hydrogen atom or Na.

5. The alginic acid derivative according to claim 2, wherein a weight-average molecular weight of the alginic acid derivative as measured by gel filtration chromatography is from 100,000 Da to 3,000,000 Da.

6. The crosslinked alginic acid according to claim 1, wherein the chemical crosslink in the crosslinked alginic acid is a structure of following formula (LK-1):

(LK-1)

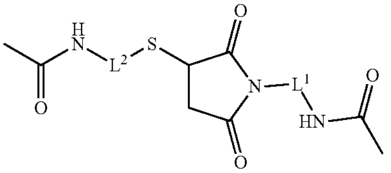

wherein in formula (LK-1), —CONH— and —NHCO— at either end represents amide bonds via any carboxyl group of alginic acid, -L1- represents a linker selected from the group consisting of the following partial structural formulae (excluding parts outside broken lines at both ends of each formula):

-continued (L1-1)

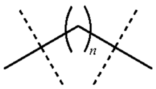

(L1-2)

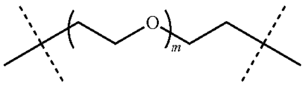

(L1-3)

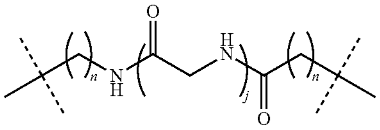

(L1-4)

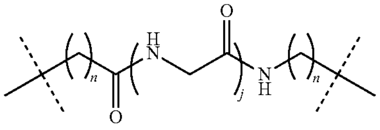

wherein:

a hydrogen atom of a methylene group (—$CH_2$—) in formulae (L1-1) to (L1-4) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group where which M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group, each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L1-1) to (L1-4) are both substituted with $C_{1-6}$ alkyl groups, the alkyl groups may bind together to form a $C_{3-8}$ cycloalkyl ring;

a —NH— group in formula (L1-3) and formula (L1-4) may form a non-aromatic heterocyclic ring with a substituent binding to an adjacent carbon atom;

n is an integer from 1 to 18;

m is an integer from 1 to 9; and j is an integer from 0 to 9, and

-$L^2$- represents a linker selected from the group consisting of following partial structural formulae (excluding parts outside broken lines at both ends of each formula):

(L2-1)

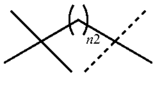

(L2-2)

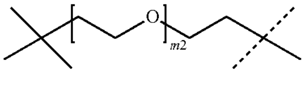

(L2-3)

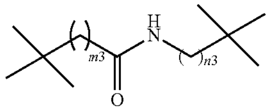

(L2-4)

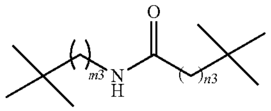

(L2-5)

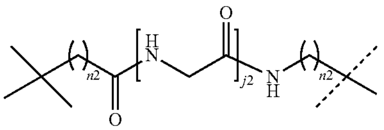

(L2-6)

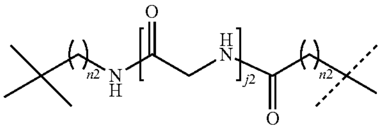

wherein:

a hydrogen atom of a methylene group (—$CH_2$—) in formulae (L2-1) to (L2-6) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group where M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group, wherein:

each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L2-1) to (L2-6) are both substituted with $C_{1-6}$ alkyl groups, the alkyl groups may bind together to form a $C_{3-8}$ cycloalkyl ring;

a —NH— group in formula (L2-3) to formula (L2-6) may form a non-aromatic heterocyclic ring with a substituent binding to an adjacent carbon atom;

m2 is an integer from 1 to 9;

n2 is an integer from 1 to 18;

m3 is an integer from 1 to 10 n3 is an integer from 1 to 10; and j is an integer from 0 to 9.

7. A crosslinked alginic acid according to claim 1 in the form of crosslinked alginic acid structure comprising, as crosslinks, both an ionic crosslink partially formed by a divalent metal ion and a chemical crosslink formed by a Michael addition reaction, obtained by dripping a solution of a composition containing the alginic acid derivative represented by formula (I) and the alginic acid derivative represented by formula (II) into a solution containing a divalent metal ion.

8. The crosslinked alginic acid structure according to claim 7, wherein the chemical crosslink formed by performing a Michael addition reaction using the alginic acid derivative represented by formula (I) and the alginic acid derivative represented by formula (II) is a crosslink structure of following formula (LK-1):

(LK-1)

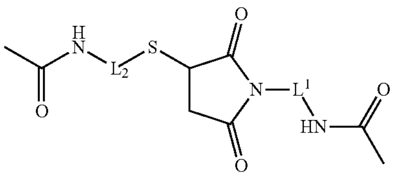

in formula (LK-1), —CONH— and —NHCO— at either end represents amide bonds via any carboxyl group of alginic acid -$L^1$- represents a linker selected from the group consisting of the following partial structural formulae (excluding parts outside broken lines at both ends of each formula):

(L1-1)

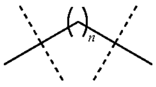

(L1-2)

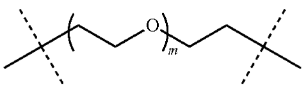

(L1-3)

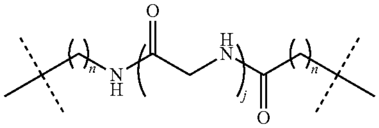

(L1-4)

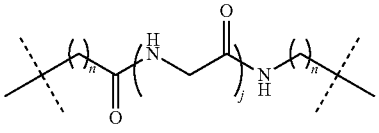

wherein:

a hydrogen atom of a methylene group (—$CH_2$—) in formulae (L1-1) to (L1-4) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group where which M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group, each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L1-1) to (L1-4) are both substituted with $C_{1-6}$ alkyl groups, the alkyl groups may bind together to form a $C_{3-8}$ cycloalkyl ring;

a —NH— group in formula (L1-3) and formula (L1-4) may form a non-aromatic heterocyclic ring with a substituent binding to an adjacent carbon atom;

n is an integer from 1 to 18;

m is an integer from 1 to 9; and j is an integer from 0 to 9, and

-$L^2$- represents a linker selected from the group consisting of following partial structural formulae (excluding parts outside broken lines at both ends of each formula):

(L2-1)

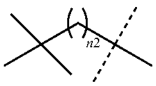

(L2-2)

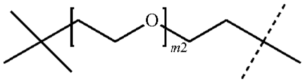

(L2-3)

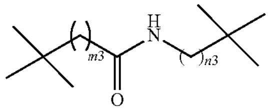

(L2-4)

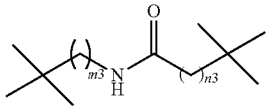

(L2-5)

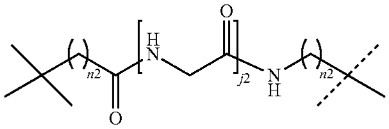

(L2-6)

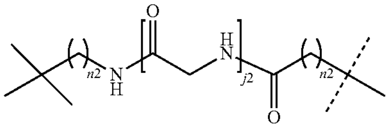

wherein:

a hydrogen atom of a methylene group (—$CH_2$—) in formulae (L2-1) to (L2-6) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group where M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group, wherein:

each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L2-1) to (L2-6) are both substituted with $C_{1-6}$ alkyl groups, the alkyl groups may bind together to form a $C_{3-8}$ cycloalkyl ring;

a —NH— group in formula (L2-3) to formula (L2-6) may form a non-aromatic heterocyclic ring with a substituent binding to an adjacent carbon atom;

m2 is an integer from 1 to 9;

n2 is an integer from 1 to 18;

m3 is an integer from 1 to 10 n3 is an integer from 1 to 10; and j is an integer from 0 to 9.

9. The crosslinked alginic acid structure according to claim 7, wherein said crosslinked alginic acid structure is a fibrous structure, a fiber, beads, a gel or a substantially spherical gel.

10. A medical material comprising the crosslinked alginic acid structure according to claim 7.

11. The medical material according to claim 10, wherein said crosslinked alginic acid structure is a fibrous structure, a fiber, beads, a gel or a substantially spherical gel.

12. A composition comprising an alginic acid derivative represented by formula (I) and an alginic acid derivative represented by formula (II), wherein the alginic acid derivative represented by formula (I) is:

(I)

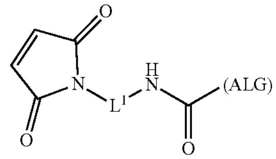

wherein in formula (I), (ALG) represents alginic acid; —NHCO— represents an amide bond via any carboxyl group of alginic acid; and $-L^1-$ represents a linker selected from the group consisting of the following partial structural formulae (excluding parts outside broken lines at both ends of each formula):

(L1-1)

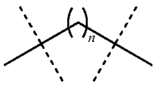

(L1-2)

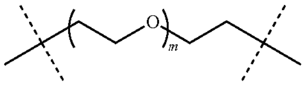

(L1-3)

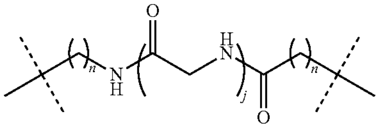

(L1-4)

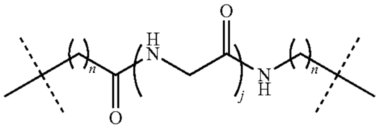

wherein a hydrogen atom of a methylene group ($—CH_2—$) in formulae (L1-1) to (L1-4) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group where which M is Li, Na, K or ½ Ca, a —COO ($C_{1-6}$ alkyl) group, a $—NR^aR^b$ group, $(R^aR^bN)—C_{1-6}$ alkyl group or $(R^aR^bN)C(═O)—C_{1-6}$ alkyl group, wherein:

each of $R^a$ and $R^b$ in the above $—NR^aR^b$ group, $(R^aR^bN)—C_{1-6}$ alkyl group or $(R^aR^bN)C(═O)—C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group ($—CH_2—$) in formulae (L1-) to (L1-4) are both substituted with $C_{1-6}$ alkyl groups, the alkyl groups may bind together to form a $C_{3-8}$ cycloalkyl ring;

a —NH— group in formula (L1-3) and formula (L1-4) may form a non-aromatic heterocyclic ring with a substituent binding to an adjacent carbon atom;

n is an integer from 1 to 18;

m is an integer from 1 to 9; and j is an integer from 0 to 9, and the alginic acid derivative represented by formula (II) is:

(II)

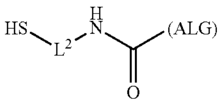

wherein in formula (II), (ALG) represents alginic acid; —NHCO— represents an amide bond via any carboxyl group of alginic acid; and $-L^2-$ represents a linker selected from the group consisting of following partial structural formulae (excluding parts outside broken lines at both ends of each formula):

(L2-1)

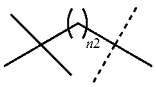

(L2-2)

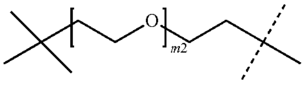

(L2-3)

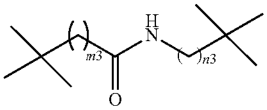

(L2-4)

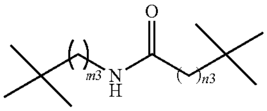

-continued (L2-5)

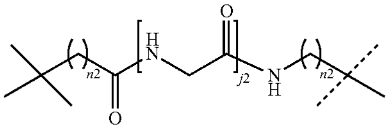

(L2-6)

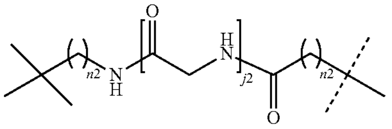

where a hydrogen atom of a methylene group (—$CH_2$—) in formulae (L2-1) to (L2-6) may be substituted with multiple groups selected from an oxo group (═O), a halogen atom, a hydroxyl group, a $C_{1-6}$ alkyl group, a hydroxy $C_{1-6}$ alkyl group, a thiol $C_{1-6}$ alkyl group, a $C_{1-6}$ alkylthio $C_{1-6}$ alkyl group, a —COOH group, a —COOM group where M is Li, Na, K or ½ Ca, a —COO ($C_{1-6}$ alkyl) group, a —$NR^aR^b$ group, ($R^aR^b$N)—$C_{1-6}$ alkyl group or ($R^aR^b$N)C(═O)—$C_{1-6}$ alkyl group, wherein:

each of $R^a$ and $R^b$ in the above —$NR^aR^b$ group, ($R^aR^b$N)—$C_{1-6}$ alkyl group or ($R^aR^b$N)C(═O)—$C_{1-6}$ alkyl group is independently a group selected from a hydrogen atom, $C_{1-6}$ alkyl group, $C_{2-7}$ alkanoyl group or $C_{1-6}$ alkylsulfonyl group), a guanidino $C_{1-6}$ alkyl group, a $C_{7-16}$ aralkyl group, a hydroxy $C_{6-10}$ aryl $C_{1-6}$ alkyl group or a heteroaryl $C_{1-6}$ alkyl group;

when two hydrogen atoms of the same methylene group (—$CH_2$—) in formulae (L2-1) to (L2-6) are both substituted with $C_{1-6}$ alkyl groups, the alkyl groups may bind together to form a $C_{3-8}$ cycloalkyl ring;

a —NH— group in formula (L2-3) to formula (L2-6) may form a non-aromatic heterocyclic ring with a substituent binding to an adjacent carbon atom;

m2 is an integer from 1 to 9;

n2 is an integer from 1 to 18;

m3 is an integer from 1 to 10 n3 is an integer from 1 to 10; and j is an integer from 0 to 9.

13. The crosslinked alginic acid structure according to claim 7, having an ability to hold contents, comprising the crosslinked alginic acid, obtained by subjecting an alginic acid derivative represented by formula (I) and an alginic acid derivative represented by formula (II) to ionic cross-linking by a divalent metal ion and chemical crosslinking by a Michael addition reaction.

14. The crosslinked alginic acid according to claim 1, having biocompatibility.

* * * * *